US008913319B2

United States Patent
Jacobs et al.

(10) Patent No.: US 8,913,319 B2
(45) Date of Patent: *Dec. 16, 2014

(54) CONTINUOUS ADJUSTABLE PULFRICH FILTER SPECTACLES FOR OPTIMIZED 3DEEPS STEREOSCOPIC VIEWING AND ITS CONTROL METHOD AND MEANS

(71) Applicants: Kenneth Martin Jacobs, New York, NY (US); Ronald Steven Karpf, Corvallis, OR (US)

(72) Inventors: Kenneth Martin Jacobs, New York, NY (US); Ronald Steven Karpf, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,293

(22) Filed: Jan. 7, 2014

(65) Prior Publication Data

US 2014/0118492 A1    May 1, 2014

Related U.S. Application Data

(60) Continuation of application No. 13/632,333, filed on Oct. 1, 2012, now Pat. No. 8,657,439, which is a (Continued)

(51) Int. Cl.
| | | |
|---|---|---|
| *G02B 27/22* | (2006.01) | |
| *H04N 13/00* | (2006.01) | |
| *G02B 27/01* | (2006.01) | |
| *G02C 7/10* | (2006.01) | |
| *H04N 13/04* | (2006.01) | |
| *H04N 13/02* | (2006.01) | |

(52) U.S. Cl.
CPC ....... *H04N 13/0007* (2013.01); *H04N 13/0033* (2013.01); *G02B 27/0172* (2013.01); *G02C 7/101* (2013.01); *H04N 13/026* (2013.01); *H04N 13/0438* (2013.01); *H04N 13/0434* (2013.01); *G02B 2027/014* (2013.01); *H04N 2213/008* (2013.01); *G02B 27/2221* (2013.01); *H04N 13/0454* (2013.01); *G02B 27/2264* (2013.01); *H04N 2213/002* (2013.01); *G02B 27/017* (2013.01); *H04N 13/0431* (2013.01); *H04N 13/0497* (2013.01)
USPC .......................................................... 359/464

(58) Field of Classification Search
CPC ............ G02C 7/02; G02B 1/041; G02B 5/32; G02B 5/0252; G02B 26/106; H04N 13/0409; H04N 13/0497
USPC .......................... 351/159.01; 359/15–16, 464
See application file for complete search history.

(56) References Cited

U.S. PATENT DOCUMENTS

| 4,049,339 A | 9/1977 | Ledan |
| 4,429,951 A | 2/1984 | Hirano |

(Continued)

FOREIGN PATENT DOCUMENTS

JP    7287191 A    10/1995

OTHER PUBLICATIONS

Lit, et al., Simple reaction time as a function of luminance for various wavelengths, Perception & Psychophysics, vol. 10(6), pp. 1-7, 1971.

(Continued)

*Primary Examiner* — James Greece
(74) *Attorney, Agent, or Firm* — Lucas & Mercanti, LLP

(57) ABSTRACT

Continuous Adjustable Pulfrich Filter Spectacles are provided with lenses with continuously changeable optical densities, so that viewing of 2D movies is optimized for visualization in natural 3D. Method and means are disclosed for the continuous Adjustable Pulfrich Filter Spectacles to perform two independent optimizations to achieve optimized 3Deeps visual effects on 2D movies. First they compute the optical density setting of the lenses for optimal viewing of 2D movies as 3D. Then they continuously render the lenses of the spectacles to these optical densities optimized for characteristics of the electro-optical material from which the lenses of the spectacles are fabricated. The invention works for both 3DTV and 3D Cinema theater viewing.

4 Claims, 22 Drawing Sheets

Related U.S. Application Data continuation of application No. 13/151,736, filed on Jun. 2, 2011, now Pat. No. 8,303,112, which is a continuation of application No. 12/555,482, filed on Sep. 8, 2009, now Pat. No. 7,967,159, which is a division of application No. 12/274,752, filed on Nov. 20, 2008, now Pat. No. 7,604,348, which is a continuation-in-part of application No. 11/928,152, filed on Oct. 30, 2007, now Pat. No. 7,508,485, and a continuation-in-part of application No. 11/372,723, filed on Mar. 10, 2006, now Pat. No. 7,522,257, and a continuation-in-part of application No. 10/054,607, filed on Jan. 22, 2002, now Pat. No. 7,030,902, and a continuation of application No. 11/373,702, filed on Mar. 10, 2006, now Pat. No. 7,405,801, said application No. 11/928,152 is a continuation of application No. 11/373,702, filed on Mar. 10, 2006.

(60) Provisional application No. 60/664,369, filed on Mar. 23, 2005, provisional application No. 60/263,498, filed on Jan. 23, 2001, provisional application No. 60/661,847, filed on Mar. 15, 2005.

(56) References Cited

U.S. PATENT DOCUMENTS

| | | |
|---|---|---|
| 4,562,463 A | 12/1985 | Lipton |
| 4,597,634 A | 7/1986 | Steenblik |
| 4,705,371 A | 11/1987 | Beard |
| 4,717,239 A | 1/1988 | Steenblik |
| 4,805,988 A | 2/1989 | Dones |
| 4,893,898 A | 1/1990 | Beard |
| 4,907,860 A | 3/1990 | Noble |
| 5,002,364 A | 3/1991 | Steenblik |
| 5,144,344 A | 9/1992 | Takahashi et al. |
| 5,510,831 A | 4/1996 | Mayhew |
| 5,654,786 A | 8/1997 | Bylander |
| 5,717,415 A | 2/1998 | Iue et al. |
| 5,721,692 A | 2/1998 | Nagaya et al. |
| 5,835,264 A | 11/1998 | Tandler et al. |
| 6,115,177 A | 9/2000 | Vossler |
| 6,220,709 B1 | 4/2001 | Heger |
| 6,385,245 B1 | 5/2002 | De Haan et al. |
| 6,392,689 B1 | 5/2002 | Dolgoff |
| 6,449,005 B1 | 9/2002 | Faris |
| 6,456,432 B1 | 9/2002 | Lazzaro et al. |
| 6,496,598 B1 * | 12/2002 | Harman .................. 382/154 |
| 6,510,002 B1 | 1/2003 | Tsang |
| 6,598,968 B1 | 7/2003 | Davino |
| 6,678,091 B2 | 1/2004 | Tropper |
| 6,882,473 B2 | 4/2005 | Geier et al. |
| 7,030,902 B2 | 4/2006 | Jacobs |
| 7,086,735 B1 * | 8/2006 | Provitola .................. 353/10 |
| 7,218,339 B2 | 5/2007 | Jacobs |
| 7,405,801 B2 | 7/2008 | Jacobs |
| 7,508,485 B2 | 3/2009 | Jacobs et al. |
| 7,522,257 B2 | 4/2009 | Jacobs |
| 2007/0147671 A1 | 6/2007 | Di Vincenzo et al. |
| 2011/0007132 A1 | 1/2011 | Redmann et al. |

OTHER PUBLICATIONS

Lit A., The magnitude of the pulfrich stereo-phenomenon as a function of target velocity, Journal of Experimental Psychology, vol. 59(3), pp. 165-175, 1960.

Dipert, B., Video improvements obviate big bit streams, EDN: Information, News, & Business Strategy for Electronics Design Engineers, pp. 83-102, Mar. 15, 2001.

Dipert, B., Video quality: a hands-on view, EDN: Information, News, & Business Strategy for Electronics Design Engineers, pp. 83-96, Jun. 7, 2001.

Philips semiconductors MELZONIC chip-Technology backgrounder, Press Release by NXP, Mar. 3, 1997.

* cited by examiner

| Frame # | Left Lens OD | Right Lens OD | Motion Vector | Direction | Luminance |
|---|---|---|---|---|---|
| ... | | | | | |
| n | | | | | |
| n+1 | | | | | |
| n+2 | | | | | |
| n+3 | | | | | |
| n+4 | | | | | |
| n+5 | | | | | |
| n+6 | | | | | |
| ... | | | | | |

FIG 13

CONTINUOUS ADJUSTABLE PULFRICH FILTER SPECTACLES FOR OPTIMIZED 3DEEPS STEREOSCOPIC VIEWING AND ITS CONTROL METHOD AND MEANS

CROSS REFERENCE OF RELATED APPLICATIONS

This application is a Continuation of U.S. patent application Ser. No. 13/632,333, filed Oct. 1, 2012, now U.S. Pat. No. 8,657,439, which is a continuation of U.S. patent application Ser. No. 13/151,736 filed on Jun. 2, 2011, now U.S. Pat. No. 8,303,112, which is a continuation application of U.S. patent application Ser. No. 12/555,482, now U.S. Pat. No. 7,967,159 filed Sep. 8, 2009, which is a divisional application of U.S. patent application Ser. No. 12/274,752 filed on Nov. 20, 2008, now U.S. Pat. No. 7,604,348, which is a Continuation-In-Part (CIP) application of U.S. patent application Ser. No. 11/928,152, now U.S. Pat. No. 7,508,485, filed on Oct. 30, 2007 and U.S. patent application Ser. No. 11/372,723 filed on Mar. 10, 2006, now U.S. Pat. No. 7,522,257, which claims priority of U.S. Provisional Application No. 60/664,369 filed on Mar. 23, 2005 and is a continuation-in-part application of the U.S. patent application Ser. No. 10/054,607, now U.S. Pat. No. 7,030,902, filed on Jan. 22, 2002, which in turn claims priority of U.S. Provisional Application No. 60/263,498 filed on Jan. 23, 2001. The based applications U.S. patent application Ser. No. 11/928,152 and U.S. patent application Ser. No. 11/372,723 also claim priority of U.S. patent application Ser. No. 11/373,702 filed on Mar. 10, 2006, now U.S. Pat. No. 7,405,801, which claims priority of U.S. Provisional Application No. 60/661,847 filed on Mar. 15, 2005. The entire contents of each of the above applications are being herein incorporated by reference for all purposes.

TECHNICAL FIELD

This invention relates to the field of motion pictures and to a system called 3Deeps that will allow almost any motion picture to be viewed with the visual effect of 3-dimensions when viewed through 3Deeps Filter Spectacles. More specifically, the invention relates to the various means by which a motion vector and/or luminance measure that are associated with frames of the movie can be used to select an optimal optical density for the neutral density lens of the 3Deeps Filter Spectacles.

BACKGROUND OF THE INVENTION

A number of products and methods have been developed for producing 3-D images from two-dimensional images. Steenblik in U.S. Pat. Nos. 4,597,634, 4,717,239, and 5,002,364 teaches the use of diffractive optical elements with double prisms, one prism being made of a low-dispersion prism and the second prism being made of a high-dispersion prism. Takahaski, et al in U.S. Pat. No. 5,144,344 teaches the use of spectacles based on the Pulfrich effect with light filtering lens of different optical densities. Beard in U.S. Pat. No. 4,705,371 teaches the use of gradients of optical densities going from the center to the periphery of a lens.

Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', teaches an opaque frame that can be placed in front of a user's eyes like a pair of glasses for 3-D viewing to take advantage of the Pulfrich effect. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

Dones, U.S. Pat. No. 4,805,988, 'Personal Viewing Video Device', teaches a personal video viewing device which allows the simultaneous viewing of a stereoscopic external image as well as a monoscopic electronic image. This is accomplished using two optical systems which share particular components. The relative intensity of both images may be adjusted using a three-iris system where each iris may be a mechanical diaphragm, an electronically controlled liquid crystal device, or a pair of polarized discs whose relative rotational orientation controls the transmissivity of the disc pair.

Beard in U.S. Pat. No. 4,893,898 teaches a method for creating a 3-D television effect in which a scene is recorded with a relative lateral movement between the scene and the recording mechanism. The recording is played back and viewed through a pair of viewer glasses in which one of the lenses is darker and has a spectral transmission characterized by a reduced transmissivity in at least one, and preferably all three, of the television's peak radiant energy wavebands. The lighter lens, on the other hand, has a spectral transmission characterized by a reduced transmissivity at wavelengths removed from the television energy peaks. The result is a substantially greater effective optical density differential between the two lenses when viewing television than in normal ambient light. This produces a very noticeable 3-D effect for television scenes with the proper movement, while avoiding the prior "dead eye" effect associated with too great a density differential in ordinary light. Further enhancement is achieved by providing the darker lens with a higher transmissivity in the blue and red regions than in the yellow or green regions.

Other patents deal with image processing to measure motion in a moving picture and include Iue U.S. Pat. No. 5,717,415, Nagaya U.S. Pat. No. 5,721,692 and Gerard De Haan U.S. Pat. No. 6,385,245.

Iue in U.S. Pat. No. 5,717,415 teaches a method of converting two-dimensional images into three-dimensional images. A right eye image signal and a left eye image signal between which there is relatively a time difference or a luminance difference are produced from a two-dimensional image signal, thereby to convert two-dimensional images into three-dimensional images.

In U.S. Pat. No. 5,721,692, Nagaya et al present a 'Moving Object Detection Apparatus'. In that disclosed invention, a moving object is detected from a movie that has a complicated background. In order to detect the moving object, there is provided a unit for inputting the movie, a display unit for outputting a processed result, a unit for judging an interval which is predicted to belong to the background as part of a pixel region in the movie, a unit for extracting the moving object and a unit for calculating the moving direction and velocity of the moving object. Even with a complicated background in which not only a change in illumination condition, but also a change in structure occurs, the presence of the structure change of the background can be determined so as to detect and/or extract the moving object in real time. Additionally, the moving direction and velocity of the moving object can be determined.

De Haan U.S. Pat. No. 6,385,245 teaches a method of estimating motion in which at least two motion parameter sets are generated from input video data. A motion parameter set is a set of parameters describing motion in an image, and by means of which motion can be calculated.

Visual effects are important in motion pictures and have the potential to expand the viewing enjoyment of moviegoers. For example the movement effect 'Bullet Time' utilized in the movie 'The Matrix' was critical to the appeal of the movie.

Visual effects for 3-dimensional motion pictures include such motion pictures as 'Charge at Feather River', starring Guy Madison. The 'Vincent Price movie 'House of Wax' was originally released as a 3-D thriller. The 3-D movie fad of the early to mid-1950s however soon faded due to complexity of the technologies and potential for improper synchronization, and misalignment of left and right eye images as delivered to the viewer.

TV 3-D motion pictures have been attempted from time-to-time. Theatric Support produced the first TV Pulfrich event in 1989 for Fox Television—"The Rose Parade in 3D Live." In order to sustain the illusion of realistic depth these 3-D Pulfrich effect TV shows require all foreground screen action to move in one consistent direction, matched to the fixed light-diminishing lens of special spectacles provided to viewers for each broadcast. This enormous constraint (for all screen action to proceed in one direction) placed on the producers of the motion picture is due to the realistic expectation that viewers were not going to invert their spectacles so as to switch the light-diminishing filter from one eye to another for each change in screen-action direction. For the great majority of viewers the limitation of spectacles with a fixed filter, either left or right, meant the 3D effect would be available only with movies produced specifically for that viewing spectacles design.

With the exception of Sony I-max 3-D presentations, which require special theater/screening facilities unique to the requirements of I-Max technology, 3-dimensional motion pictures remain a novelty. Despite the wide appeal to viewers, the difficulties and burden on motion picture producers, distributors, TV networks, motion picture theaters, and on the viewers has been a barrier to their wide scale acceptance. Because of recent loss of theater revenue to the web an effort is again underway to offer 3-D cinema that audiences will come out for, results still to be determined. The new offerings will be digital, and so many problems having to do with film may be bypassed. TV networks are also attempting to find a means to distribute 3D to their viewers.

The following background information is provided for a better understanding of the present invention:

The Human Eye and Depth Perception

The human eye can sense and interpret electromagnetic radiation in the wavelengths of about 400 to 700 nanometers—visual light to the human eye. Many electronic instruments, such as camcorders, cell phone cameras, etc., are also able to sense and record electromagnetic radiation in the band of wavelengths 400-700 nanometer.

To facilitate vision, the human eye does considerable 'image processing' before the brain gets the image.

When light ceases to stimulate the eyes photoreceptors, the photoreceptors continue to send signals, or 'fire' for a fraction of a second afterwards. This is called 'persistence of vision', and is key to the invention of motion pictures that allows humans to perceive rapidly changing and flickering individual images as a continuous moving image.

The photoreceptors of the human eye do not 'fire' instantaneously. Low light conditions can take a few thousands of a second longer to transmit signals than under higher light conditions. Causing less light to be received in one eye than another eye, thus causing the photoreceptors of the right and left eyes to transmit their 'pictures' at slightly different times, explains in part the Pulfrich 3-D illusion, which is utilized in the invention of the 3Deeps system. This is also cause of what is commonly referred to as 'night vision'.

Once signals are sent to the eyes, the brain processes the dual images together (images received from the left and right eye) presenting the world to the mind in 3-dimensions or with 'Depth Perception'. This is accomplished by several means that have been long understood.

Stereopsis is the primary means of depth perception and requires sight from both eyes. The brain processes the dual images, and triangulates the two images received from the left and right eye, sensing how far inward the eyes are pointing to focus the object.

Perspective uses information that if two objects are the same size, but one object is closer to the viewer than the other object, then the closer object will appear larger. The brain processes this information to provide clues that are interpreted as perceived depth.

Motion parallax is the effect that the further objects are away from us, the slower they move across our field of vision. The brain processes motion parallax information to provide clues that are interpreted as perceived depth.

Shadows provide another clue to the human brain, which can be perceived as depth. Shading objects, to create the illusions of shadows and thus depth, is widely used in illustration to imply depth without actually penetrating (perceptually) the 2-D screen surface.

Methods of Producing 3-D Illusion in Moving Pictures

Motion pictures are images in 2-dimensions. However, several methods have been developed for providing the illusion of depth in motion pictures. These include the Anaglyph, IMAX (Polaroid) and Pulfrich 3-dimensional illusions.

Anaglyph 3-Dimensional Illusion

"Anaglyph" refers to the red/blue or red/green glasses that are used in comic books and in cereal packets etc. The glasses consist of nothing more than one piece of transparent blue plastic and one piece of transparent red plastic. These glasses are easy to manufacture and have been around since the 1920s.

An anaglyph stereo picture starts as a normal stereo pair of images, two images of the same scene, shot from slightly different positions. One image is then made all green/blue and the other is made all red, the two are then seen together.

When the image is viewed through the glasses the red parts are seen by one eye and the other sees the green/blue parts. This effect is fairly simple to do with photography, and extremely easy to do on a PC, and it can even be hand-drawn. The main limitation of this technique is that because the color is used in this way, the true color content of the image is usually lost and the resulting images are usually in black and white. As the colors compete for dominance they may appear unstable and monochromatic. A few images can retain a resemblance to their original color content, but the photographer has to be very selective with color and picture content.

IMAX (Polaroid) 3-Dimensional Illusion

IMAX creates the illusion of 3-dimensional depth by recording the motion pictures on two separate rolls of film with two camera lenses to represent the left and right eyes. These lenses are separated by an interocular distance of about 2.5 in., the average distance between a human's eyes. By recording on two separate rolls of film for the left and right eyes, and then projecting them simultaneously, IMAX can create a 3-Dimensional illusion for viewers.

IMAX uses either of two different methods to create the 3D illusion in the theatre. The first method relies on polarization. During projection, the left eye image is polarized in one direction and the right eye image polarized perpendicular to the left eye image as they are projected on the IMAX screen. By wearing special viewing glasses with lenses polarized in their respective directions to match the projection, the left eye image can be viewed only by the left eye since the polarization of the left lens will cancel out that of the right eye projection, and the right eye image can be viewed only by the right eye since the polarization of the right lens will cancel out that of the left eye projection.

IMAX also uses another method—shutter glasses—for 3D viewing. This method of 3D projection involves the use of LCD shutter glasses that use similarly polarized lenses for both eyes. The left and right eye images are projected on the viewing screen in alternate frames. These LCD shutter glasses are synchronized to the projector. The projector displays the left and right images that are momentarily viewed by the appropriate eye by allowing that LCD lens to become transparent while the other remains opaque. That is when the left eye frame is projected on the screen, the left lens of the shutter glasses becomes transparent and the right lens of the shutter glasses becomes opaque. When the next frame is projected on the screen—a frame for the right eye—the left lens becomes opaque and the right lens becomes transparent.

In both the IMAX 3D systems only the correct eye is allowed to view the correct image while the other eye is 'blinded'. The 'transparent' state is actually quite dark, and occludes about 35% of the projected light to the viewing eye while the non-viewing eye is supposed to view no image at all.

Problems with 3-D Motion Pictures

With the exception of Sony I-Max 3-d, a special cine-technology requiring theaters designed for its screening requirements, 3 Dimensional motion pictures have never caught on, except as a short-term fad, because a myriad of problems continue to make 3-dimensional motion pictures unacceptable to producers and viewers of motion pictures. Despite concerted efforts, 3-dimensional motion pictures continue to be nothing more than a novelty. There are many problems and constraints involving the production, projection, and viewing of 3-dimensional motion pictures.

Production: The commonly used anaglyph 3-dimensional movie systems require special cameras that have dual lenses, and capture 2-images on each frame. To have a version of the motion picture that can be viewed without special glasses requires that a separate version of the motion picture be shot with a regular camera so there is only one image per video frame and not simply the selection of one or the other perspective. Similarly, IMAX and shutter glass systems require special cameras and processing with separate versions of the motion picture for 2D and 3D viewing. Filming movies in 3D add as much as $10 million dollars to production costs, it has been reported.

Projection: Some 3-dimensional systems require the synchronization and projection by more than 2 cameras in order to achieve the effect. "Hitachi, Ltd has developed a 3D display called Transpost 3D which can be viewed from any direction without wearing special glasses, and utilize twelve cameras and rotating display that allow Transpost 3D motion pictures that can be seen to appear as floating in the display. The principle of the device is that 2D images of an object taken from 24 different directions are projected to a special rotating screen. On a large scale this is commercially unfeasible, as special effects in a motion picture must be able to be projected with standard projection equipment in a movie theater, TV or other broadcast equipment.

Viewing: As a commercial requirement, any special effect in a motion picture must allow viewing on a movie screen, and other viewing venues such as TV, DVD, VCR, PC computer screen, plasma and LCD displays. From the viewer's vantage, 3-dimensional glasses, whether anaglyph glasses or Pulfrich glasses, which are used in the majority of 3-dimensional efforts, if poorly made or worn incorrectly are uncomfortable and may cause undue eyestrain or headaches. Experiencing such headache motivates people to shy away from 3-D motion pictures.

Because of these and other problems, 3-dimensional motion pictures have never been more than a novelty. The inconvenience and cost factors for producers, special equipment projection requirements, and viewer discomfort raise a sufficiently high barrier to 3-dimensional motion pictures that they are rarely produced. A main object of this invention is to overcome these problems and constraints.

Attempts to Overcome the Problems of 3-D Motion Pictures

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it. Recent advances have eliminated mechanical shutter, and now use lens that darken when an electric current is passed through it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weight only 3.3 ounces, use two 3V lithium/manganese dioxide batteries, and have a battery life of 250 hours. This demonstrates the robustness and potential of a viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

However, shutter systems have not been overwhelmingly commercially successful. Motion pictures that use such stereo shutter systems require two frames for each frame of regular film. Motion pictures would then have to be produced in at least 2 versions. Also, except on high refresh rate systems, such as expensive PC monitors, the viewer sees too much 'flicker' causing distraction and annoyance. An additional requirement and burden is the wired or wireless signaling to control the state of the lens. LCD screens that are used on laptops generally do not have high enough refresh rates for stereoscopic shutter 3D systems. Shutter systems generally do not work well with LCD or movie projectors.

Previous versions of 3Deeps Filter Spectacles have been described in co-pending patent applications and provide a system by which ordinary 2-dimensional motion pictures can be viewed in part as a 3-dimensional motion pictures. They however were a sub-optimal solution. In the presence of screen motion, they only developed 3D from a 2D movie by a difference in optical density between the right and left lens—but did not describe any objective optimal target for those optical densities. Neither did the previous version or 3Deeps Filter spectacles address optimization of the spectacles to account for the materials from which the lenses are fabricated.

3Deeps Filter Spectacles that incorporate such double optimization are called Continuous Adjustable 3Deeps Filter Spectacles.

Continuous Adjustable 3Deeps Filter Spectacles doubly optimize 3Deeps Filter Spectacles to maximize the target optical densities of the lenses, and to account for the lens material. Double optimization of the 3Deeps Filter Spectacles has substantial benefits and Continuous Adjustable 3Deeps Filter Spectacles solves substantial problems that 3Deeps Filter Spectacles could not address.

The present invention solve the foregoing and other problems, and present significant advantages and benefits by providing a system to view 3-dimensional and other special effects in motion pictures. It is, therefore, an object of the invention to provide a system by which ordinary 2-dimensional motion pictures can be viewed in part as a 3-dimensional experience.

SUMMARY OF THE INVENTION

This invention directs to a 3D viewing spectacles having continuously adjustable optical densities in left lens and right lens individually and continuous control mechanism for setting the right optical density for each frame displayed so that a 2D video/motion picture can be viewed with optimized 3D effects. It also relates to a method for providing such a continuous optical density signal and device for such continuous optical density control. The continuous optical density control utilizes all adjustable optical density levels of the lens material to achieve optimized 3D viewing effects This invention has the following preferred embodiments:
1. An optical-density-continuous-adjustable 3Deeps Filter Spectacles for viewing a 21) video with 3D effects, comprising:
 a) two lenses made of a material having continuous optical density adjustable capacity;
 b) a continuous optical density signal receiving unit for receiving optical density continuous control values based on a motion vector of a prominent image target in a sequence of frames in the 2D video;
 c) a control unit transforming said continuous optical density signals into continuous control mechanism to set corresponding optical density for each lens when the sequence of frames is displayed.
2. The optical-density-continuous-adjustable 3Deeps Filter Spectacles of embodiment 1, further comprising a frame, on which the two lenses, the signal receiving unit and the control unit are mounted.
3. The optical-density-continuous-adjustable 3Deeps Filter Spectacles of embodiment 1, further comprising a IC chip with a circuitry adjusting optical density balance based on ambient luminance.
4. The optical-density-continuous-adjustable 3Deeps Filter Spectacles of embodiment 1, wherein the signal receiving unit is a wireless receiver.
5. The optical-density-continuous-adjustable 3Deeps Filter Spectacles of embodiment 2, further comprising a power source mounted on the frame.
6. The optical-density-continuous-adjustable 3Deeps Filter Spectacles of embodiment 2, further comprising a photosensor mounted on the frame.
7. The optical-density-continuous-adjustable 3Deeps Filter Spectacles of embodiment 1, wherein the material having continuous optical density adjustable capacity is a material selected from a group consisting of, electrochromatic material, LCD, suspended particle device, and polarizable optical material.
8. The optical-density-continuous-adjustable 3Deeps Filter Spectacles of embodiment 1, wherein the material is electrochromatic material and the control mechanism is based on electric voltages.
9. A method for providing continuous optical density control values for optimizing 3D effects on a 3Deeps Filter Spectacles with two optical density continuously adjustable lenses, comprising:
 setting a default optical density value for the two lenses in neutral state;
 obtaining a motion vector value of a prominent image target in a sequence of frames in a 2D video;
 obtaining a luminance value of each frame in said sequence;
 calculating an optical density adjustment value on each frame comprising the steps of:
  computing an retinal delay based on the motion vector value for 3D effects;
  computing an adjusted luminance value to achieve said retinal delay based on the luminance value;
  computing an optical density value for a lens to achieve said adjusted luminance value;
  computing the optical density adjustment value based on the default optical density value;
 composing optical density adjustment values on a sequence of frames in the 2D video as continuous optical density control values for the 3Deeps Filter Spectacles.
10. The method for providing continuous optical density control values as of Embodiment 9, further comprising a step of determining the motion vector value by comparing a lateral movement of the prominent image target in the sequence of frames.
11. The method for providing continuous optical density control values as of Embodiment 9, further comprising a step of: measuring the luminance value of each frame in said sequence.
12. The method for providing continuous optical density control values as of Embodiment 9, further comprising a step of synchronizing said continuous optical density control values with the frame displayed.
13. The method for providing continuous optical density control values as of Embodiment 9, further comprising a step of: providing synchronized continuous optical density control values to the 3Deeps Filter Spectacles.
14. A device for generating continuous optical density control signals for optimizing 3D effects on a 3Deeps Filter Spectacles with two optical density continuously adjustable lenses, comprising:
 input means for setting a default optical density value for the two lenses in neutral state;
 input means for acquiring a motion vector value of a prominent image target in a sequence of frames in a 2D video;

input means for acquiring a luminance value of each frame in said sequence;

computing means for calculating an optical density adjustment value on each frame comprising the means for:
- computing an retinal delay based on the motion vector value for 3D effects;
- computing an adjusted luminance value to achieve said retinal delay based on the luminance value;
- computing an optical density value for a lens to achieve said adjusted luminance value;
- computing the optical density adjustment value based on the default optical density value;

composing means for compiling optical density adjustment values on a sequence of frames in the 2D video as continuous optical density control values for the 3Deeps Filter Spectacles; and transforming means for transforming said continuous optical density control values into continuous optical density control signals.

15. The device for generating continuous optical density control signals as of Embodiment 14, further comprising:
computing means for determining the motion vector value by comparing a lateral movement of the prominent image target in the sequence of frames.

16. The device for generating continuous optical density control signals as of Embodiment 14, further comprising:
measuring means for obtaining the luminance value of each frame in said sequence.

17. The device for generating continuous optical density control signals as of Embodiment 14, further comprising:
synchronizing means for corresponding said continuous optical density control signals with the frame displayed.

18. The device for generating continuous optical density control signals as of Embodiment 14, further comprising:
transmitting means for providing synchronized continuous optical density control signals to the 3Deeps Filter Spectacles.

19. An IC chip providing continuous optical density control signals for optimizing 3D effects on a 3Deeps Filter Spectacles with two optical density continuously adjustable lenses, comprising:
- a first input port coupled to an output port of a motion vector estimation module to receive signals of motion vector values;
- a second input port coupled to an output port of a luminance determination module to receive signals of luminance values;
- a third input port coupled with the output port of a frame register;
- a processor unit performing an optical density calculation logarithm and generating optical density values based the motion vector values and the luminance values for each frame;
- a first output port outputting signals of said optical density values;
- a synchronizing unit providing synchronizing signals correlating said optical density value with each frame registered; and
- a second output port outputting said synchronizing signals.

20. An IC board providing continuous optical density control signals for optimizing 3D effects on a 3Deeps Filter Spectacles with two optical density continuously adjustable lenses, comprising:
- a motion vector estimation module providing signals of motion vector values;
- a luminance determination module providing signals of luminance values;
- a frame register;
- a processor unit coupled with the motion vector estimation module, the luminance determination module and the frame register, performing an optical density calculation logarithm and generating optical density values based the motion vector values and the luminance values for each frame;
- a synchronizing module providing synchronizing signals correlating said optical density value with each frame registered;
- a signal generating module generating synchronized, optical density signals; and
- a transmitting module outputting said synchronized optical density signals.

These embodiments of the present invention present significant advantages and benefits by providing a system to view 3-dimensional effects in regular 2D motion pictures.

BRIEF DESCRIPTION OF DRAWINGS

Many advantages, features, and applications of the invention will be apparent from the following detailed description of the invention that is provided in connection with the accompanying drawings in which:

FIG. 13 is a table showing control information for the Continuous Adjustable 3Deeps Filter Spectacles.

DETAILED DESCRIPTION OF THE INVENTION

Figure 1:
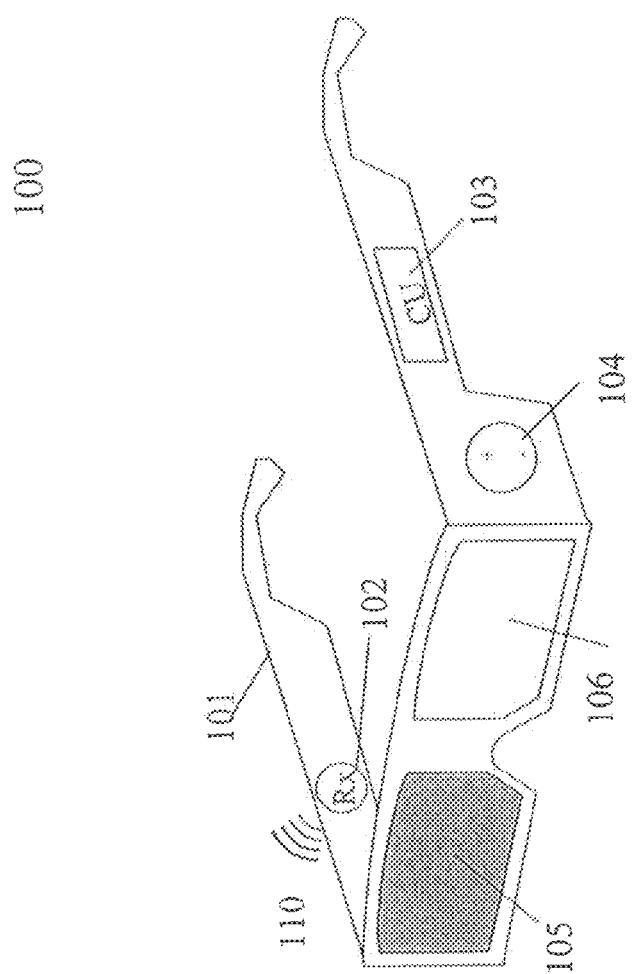
FIG. 1 is a perspective view of the preferred embodiment of the Continuous Adjustable 3Deeps Filter Spectacles.

Most systems for 3D stereoscopy are dual-image systems; that is the motion picture has a separate right-eye and left-eye image that are directed to the correct eye. This invention is a single-image system; that is the identical image is directed to both eyes of the viewer. All 3Deeps Filter Spectacles have the important advantage over traditional 3D viewing systems that two viewers sitting next to each other can both view the same movie, one in 3D wearing the 3Deeps Filter Spectacles, and the other in 2D not wearing the 3Deeps Filter Spectacles. For this invention we use the terminology that is more fully explained in the Detailed Description of 'instant image' and 'lagging image'. These 'images' are totally different from 'right-eye image' and 'left-eye image', and should not be confused.

In the instant invention both eyes see the same identical image, but the difference in retinal reaction time causes the images to be transmitted to the brain at slightly different times. The image that is transmitted to the brain from the eye covered by the 'clear' lens of the Continuous Adjustable 3Deeps Filter Spectacles is termed the 'instant image'. The image that is transmitted to the brain from the eye that is covered by a neutral density filter lens of the Continuous Adjustable 3Deeps Filter Spectacles is termed the 'lagging image'. The viewer's brain sees the 'instant image' and 'lagging image' as a single 'eye image' that displays 3-D depth characteristics when lateral motion is present.

More particularly, Continuous Adjustable 3Deeps Filter Spectacles use a dual optimization of the spectacle apparatus to achieve 3D that optimizes the Pulfrich illusion for the viewer.

A First Optimization

A preferred embodiment of the invention teaches how to use a retinal reaction time curve to calculate an optimal optical density for use in setting the neutral density filter of the Continuous Adjustable 3Deeps Filter Spectacles. More specifically, three teaching methods are presented, including:

a. Computing an optical density for the neutral density filter so the difference in retinal reaction time between the 'instant image' and the 'lagging image' is 2½ inches (the average inter-ocular distance between the right and left eyes) and thereby imparting 3-D depth characteristics to the scene. This embodiment requires as input both direction and speed of motion between frames of a motion picture, and luminance.

b. Computing an optical density for the neutral density filter so the difference in retinal reaction time between the 'instant image' and the 'lagging image' is a constant value and thereby imparting 3-D depth characteristics to the scene. This embodiment only requires luminance as input.

c. Computing an optical density for the neutral density filters so the difference in retinal reaction time between the 'instant image' and the 'lagging image' corresponds to a fixed number of picture frames and thereby imparting 3-D depth characteristics to the scene. This embodiment only requires luminance as input.

Such methods are only exemplary and not exhaustive. Other methods of using the retinal reaction time curve to calculate the optical density of the neutral density filter of the Continuous Adjustable 3Deeps Filter Spectacles may be employed. Similar methods using factors other than direction and speed of motion between frames of a motion picture, and luminance of the frame of the motion picture may also be advantageously used. Each method optimizes to a specific feature and characteristic of Continuous Adjustable 3Deeps Filter Spectacles.

The invention further directs to showing the use of a photo-detector, such as a photodiode, on the spectacles as an alternate means of estimating luminance for Continuous Adjustable 3Deeps Filter Spectacles.

A Second Optimization

The invention further directs to showing how a controller uses the optimal optical density, and the operating characteristics of the electrochromic material used in the fabrication of the spectacles, to optimize the operation of the Continuous Adjustable 3Deeps Filter Spectacles.

More specifically, the invention further directs to showing how the Operating Characteristic curve and the Transition Time curve of the electrochromic material are used to control the neutral density filter lens of the Continuous Adjustable 3Deeps Filter Spectacles.

Other Features

The invention further directs to showing how video format conversion chips, used for real-time image processing in High Definition LCD, Plasma, and Projection TV's, as well as Digital Cinema Projectors can be utilized in calculation of the optical density of the neutral optical filter lens of the Continuous Adjustable 3Deeps Filter Spectacles. While the calculation of the optical density of the neutral density filter may be done in software, it can advantageously be performed using electronic circuitry. The circuitry can (a) be included within the video format conversion chip, (b) be embedded in a separate chip that couples to a video format conversion chip on an IC board and connects directly to the Continuous Adjustable 3Deeps Filter Spectacles, or (c) be embedded in a separate chip that couple to another IC chip that connects to the spectacles.

Also, a general luminance reduction has been used in a dual image systems. No precise continuous luminance control has been disclosed. Furthermore, in such a dual image system embodiment, rather than use the optimal OD value for the Continuous Adjustable 3Deeps Filter Spectacles, the value is used to generate a second frame of a dual image 3D motion picture.

References will now be made in detail to the preferred embodiments of the invention, examples of which are illustrated in the accompanying drawings. Wherever possible, the same reference numbers will be used throughout the drawings to refer to the same or like parts.

We use the terminology 'neutral' filter (or neutral density filter) to mean a darkened. 'gray' or colored transparent filter. In this invention a neutral filter reduces light by the approximately the same amount for all wavelengths over the visual spectrum. For a neutral density filter with optical density 'd' the amount of optical power transmitted through the filter is given by $10^{-d}$. For reference, a neutral filter with an optical density of 0.3 allows transmission of about 50% of the light; an optical density of 0.6 allows transmission of about 25% of the light, and an optical density of 0.9 allows transmission of about 12.5% of the light.

We also use the term 'clear' to refer to a filter that is much clearer than the 'neutral' filter and seemingly does not block light. However, all filters block the transmission or reduce the passage of light to some extent. For instance, clear glass reduces light by about 1%. By clear then it should be understood we refer to a filter that reduces light less than the neutral density filter. That is all that is required to actuate the Pulfrich illusion.

Throughout the disclosure we use interchangeably the terms '3Deeps Filter Spectacles' and 'Pulfrich Filter Spectacles'—both referring to the earlier spectacles of this invention that allow 2D movies to be viewed with the visual effect of 3 dimensions. The term 'Continuous Adjustable 3Deeps Filter Spectacles' refers to the improved 3Deeps Filter Spectacles that use double optimization to solve problems inherent in earlier '3Deeps Filter Spectacles'.

In the embodiments of the invention the direction of motion is used to determine which of the two viewing lenses is clear and which is darkened to a neutral density. If the motion on the screen is determined to be left-to-right then the left lens of the spectacles is clear and the right lens darkened. If the motion on the screen is determined to be right-to-left then the right lens of the spectacles is clear and the left lens darkened. If there is no motion in the scene then both lenses are set to clear.

We may also use the term 'action directed eye'. When the motion on the screen is from left-to-right then the right eye that views the scene through the neutral density filter is the 'action directed eye'. When the motion on the screen is from right-to-left then the left eye that views the scene through the neutral density filter is the 'action directed eye'.

Pulfrich 3-Dimensional Illusion

Pulfrich was a physicist that recognized that an image that travels through a dark lens or filter takes longer to register with the brain than it does for an image that passes without interruption. The delay is not great—just milliseconds—but enough for a frame of video to arrive and register on the mind one frame later from an eye looking through a dark filter than from an unobstructed eye. Pulfrich spectacles then have one clear lens (or is absent a lens) that does not cause a delay, and one darkened lens that slightly delays the image that arrives to the other eye. In a motion picture viewed through Pulfrich lenses, for an object moving laterally across the screen, one eye sees the current frame and the other eye sees a previous frame.

The 'clear' lens may block some light. Even 'clear' glass blocks some light. What is important and necessary for the invention to show passages of a 2D motion picture in 3D is that the 'clear' lens be 'clearer' than the other darkened lens and not diminish as much light as the darkened lens. The invention will produce a 3D effect as long as the 'clear' light diminishing lens diminishes less light than the darkened 'light diminishing' lens.

As with normal two-eye parallel viewing, the disparity between the two images is perceived as depth information. The faster a screen-object moves in contrast to its background, the more separation there is between the 'instant image' and the 'lagging image', and the closer or further the object appears according to the eye being intercepted by the dark filter (closer if on the side to which the object is moving). The fact that faster objects can appear closer than slower objects also coincides with the principles of motion parallax. Generally, however, the greater displacements frame to frame (and now eye to eye) result from degrees of closeness to the recording camera (proximity magnifies), so that Pulfrich viewing can deliver an approximately correct and familiar depth likeness. While the depth likeness is unquestionably 3-D, it may differ from the fixed constant of an individual's inter-ocular distance when observing the world directly. Few observers will notice this anymore than they are bothered by the spatial changes resulting from use of telephoto or wide-angle lens in filming scenes.

Motion pictures made for the Pulfrich method can be viewed without any special glasses—appearing as regular motion pictures minus the 3-D effect. Also, motion pictures made without regard for the Pulfrich effect, will still show the 3-D visual effect if lenses are worn and appropriately configured.

The limitation of the Pulfrich technique is that the 3-dimensional illusion works only for objects moving horizontally or laterally across the screen. Motion pictures made to take advantage of these glasses contain lots of horizontal tracking shots or lateral picture-subject motion to create the effect. The illusion does not work if the camera doesn't shift location while subject matter remains static, but vertical camera movement will create horizontal movement as the field of view expands or contracts. Pulfrich, who first described this illusion, was blind in one eye, and was never able to view the illusion, though he accurately predicted and described it.

The 3-dimensional visual effect is produced by the 3Deeps System regardless of whether the motion picture was shot on regular or digital film; regardless of whether the presentation media is film, digital film, VCR tape, or DVD, and; regardless of whether the motion picture is viewed in the movie theater, home TV, Cable TV, iPod or PDA, or on a computer monitor.

A basic example of the Pulfrich illusion can be seen by viewing either of two TV stations. The news headlines on the CNN Television network or the stock market quotations on CNBC scroll in from the right of the TV screen and across and off the screen to the left. The news or quotations appear in a small band across the bottom of the screen while the network show appears above the scrolling information. When either of these network stations is viewed through Pulfrich glasses, with the darkened lens covering the left eye and the clear lens covering the right eye, the scrolling information appears in vivid 3-dimensions appearing to be in front of the TV screen. If the lenses are reversed with the clear lens covering the left eye and the darkened lens covering the right eye, the scrolling information appears to the viewer as receded, and behind the TV screen.

Another example of the Pulfrich illusion can be seen in the movie 'The Terminator', starring Arnold Schwarzenegger. Any off-the-shelf copy of the movie—VCR tape, or DVD, can be viewed on a TV or PC playback display monitor as originally intended by the filmmaker. But, viewing scenes that include lateral motion from 'The Terminator', such as the scene when Sarah Connors enters a bar to call police (about 29 minutes into the movie) when viewed through Pulfrich glasses (left eye clear lens and right eye dark lens) shows the scene vividly in 3-dimensions, even though this visual effect was totally unanticipated by the director and cinematographer.

Another stunning example is the famous railroad yard scene from "Gone with the Wind", in which Scarlett O'Hara played by Vivien Leigh walks across the screen from the right as the camera slowly pulls back to show the uncountable wounded and dying confederate soldiers. When viewed through Pulfrich glasses (with left eye clear lens and right eye dark lens), the scene appears to the user in 3-dimensions, even thought it was totally unintended by the director and cinematographer. Interesting here is that the main movement of this scene was created by the camera lifting and receding and so expanding the view. Effective lateral motion resulting from such camera movement would in fact be to only one side of the screen, which the viewers will utilize to interpret the entire scene as in depth.

The Continuous Adjustable 3Deeps system will allow any movie, such as "Gone with the Wind" which was shot in 1939, to be viewed in part in 3-dimensions. And with the Continuous Adjustable 3Deeps system this new viewing experience does not require any additional effort on the part of the owners, producers, distributors, or projectionists of the motion picture—just that the viewer don the 3 Deeps viewing glasses (also called 3 Deeps viewing spectacles).

Note that the Pulfrich 3-D effect will operate when the left or right filtering does not correspond with the direction of foreground screen movement. The depth-impression created is unnatural, a confusion of sold and open space, of forward and rear elements. When confronted by such anomalous depth scenes, most minds will 'turn off', and not acknowledge the confusion. For normal appearing 3-D, mismatched image darkening and foreground direction must be avoided.

We have described the need to match horizontal direction of foreground screen-movement to Left or Right light-absorbing lens. This, however, is a rule that often has to be judiciously extended and even bent, because all screen-action appropriate to Pulfrich 3-D is not strictly horizontal; horizontal movements that angle up or down, that have a large or even dominant element of the vertical, may still be seen in depth. Even a single moving element in an otherwise static scene can be lifted into relief by way of an adroit application of a corresponding Pulfrich filter. There would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/Right filter-match at odds with the filter-side that foreground-movement calls for.

For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the rule is to be followed, but not mechanically; screen movement is often compound and complex, and an observant individual could arrange a Pulfrich timing for a movie with an alertness to such subtleties that did not limit decisions to recognition of foreground direction alone. As mentioned earlier, there would even be times, when the recording camera had moved either forward or backwards through space, when both Left and Right lenses would half-darken to either side of their centers, outer halves darkening moving forward (with picture elements moving out to both sides from picture-center) or both inner halves darkening when retreating backwards (with picture elements moving in towards center from each side).

One of the advantages of optical density Continuous Adjustable 3Deeps Filter Spectacles over the 3Deeps Filter Spectacles previously described is that they obviate the necessity of many of the heuristic rules that would govern the operation of the Continuous Adjustable 3Deeps Filter Spectacles. Heuristic rules were used to address the problems of 3Deeps Spectacles in rapidly transitioning the state of the lenses for the viewer. In previous co-pending 3Deeps applications, we had described the use of such heuristics.

For instance, in co-pending U.S. Pat. No. 7,405,801 "System and method for Pulfrich Filter Spectacles", heuristic embodiments for 3Deeps Filter Spectacle were described as follows: [Col 23, Line 45 "Other embodiment may have synchronization algorithms that utilize various heuristic rules in determining a synchronization event. For instance, if the viewer lenses responding to rapidly detected changing lateral motion, switch states too rapidly, this may cause undue discomfort to the viewer. Other embodiments may allow the user to override the synchronization signals placed in the motion picture, and require that any single state remain active for a minimum period of time. This may be important for people that are photosensitive—people who are sensitive to flickering or intermittent light stimulation. Photosensitivity is estimated to affect one in four thousand people, and can be triggered by the flicker from a television set. While photosensitive people may simply remove the Pulfrich Filter Spectacles, heuristic rules could be employed to reduce flicker and eliminate any additional photosensitivity from the Pulfrich Filter Spectacles. For instance, such a heuristic rules may implement logic in the synchronization decision rule that require that no change to a synchronization event can take place for a set number of seconds after the last synchronization event—i.e. a lens state must be active for a minimum length of time before a new state may be implemented."

The use of Continuous Adjusting 3 Deeps Filter Spectacles as described herein eliminate the need for such heuristic rules since the lenses are now continually changing to conform to an optimal optical density.

The following technologies can be used in the present invention:

Substances That Change Color and Transparency

Objects that change color have been well known for a long time. Animate creatures such as cephalopods (squid) have long been known for their ability to change color seemingly at will, by expanding or retracting chromatophore cells in their body.

There are many different technologies that are used to cause physical materials to change their color and transparency. These may react to heat, light, ultraviolet light, or electronic means to change their state, which in turn affect how they reflect and refract light, or their properties of transparency, or translucency.

For instance, photochromatic lenses automatically darken in sunlight and lighten when indoors, and have been utilized in sunglasses for many years. Some may darken instantaneously, and others have lenses that take several different shades depending upon the intensity of the light presented.

Thermochromatic materials are heat activated, causing the color to change when the activation temperature is reached, and reverse the color change when the area begins to cool. These are used in such products as inks, and strip thermometers.

LEDs (Light Emitting Diodes) are electronic diodes that allow current to flow in one direction and not the other. LEDs have the unique "side effect" of producing light while electricity is flowing through them.

Thus they have two states—when electricity flows through them they are 'on' and emit light, or 'off' when no electricity flows through them and they do not emit light.

Phosphors are emissive materials that are used especially in display technologies and that, when exposed to radiation, emits light. Any fluorescent color is really a phosphor. Fluorescent colors absorb invisible ultraviolet light and emit visible light at a characteristic color. In a CRT, phosphor coats the inside of the screen. When the electron beam strikes the phosphor, it makes the screen glow. In a black-and-white screen, there is one phosphor that glows white when struck. In a color screen, there are three phosphors arranged as dots or stripes that emit red, green and blue light. In color screens, there are also three electron beams to illuminate the three different colors together. There are thousands of different phosphors that have been formulated, and that are characterized by their emission color and the length of time emission lasts after they are excited.

Liquid crystals are composed of molecules that tend to be elongated and shaped like a cigar, although scientists have identified a variety of other, highly exotic shapes as well. Because of their elongated shape, under appropriate conditions the molecules can exhibit orientational order, such that all the axes line up in a particular direction. One feature of liquid crystals is that electric current affects them. A particular sort of nematic liquid crystal, called twisted nematics (TN), is naturally twisted. Applying an electric current to these liquid crystals will untwist them to varying degrees, depending on the current's voltage. These crystals react predictably to electric current in such a way as to control light passage.

Still another way to alter the amount of light that passes through a lens is with Polaroid lenses. Polaroids are materials that preferentially transmit light with polarization along one direction that is called the polarization axis of the polaroid. Passing unpolarized light through a polaroid produces transmitted light that is linearly polarized, and reduces the intensity of the light passing through it by about one-half. This reduction in light from a first polaroid does not depend on the filter orientation. Readily available optically active materials are cellophane, clear plastic tableware, and most dextrose sugars (e.g. Karo syrup). Materials that alter the polarization of light transmitted through them are said to be optically active.

If two polaroids are placed immediately adjacent to each other at right angles (crossed) no light is transmitted through the pair. If two similar polaroids immediately adjacent to each other are in complete alignment, then the second polaroid does not further reduce the intensity of light passing though the first lens. Additional reduction of light intensity passing through the first polaroid lens will occur if the two similar polaroids immediately adjacent to each other are in other then complete or right angle alignment. This can be beneficially used in other embodiments of the invention to more precisely control the intensity of light passing through the 3Deeps spectacles lenses.

Polaroids can be actively controlled by electronic currents, and are used in such products as LCD displays. For example digital watches often use LCD display for the display of time. In such products, there is a light source behind two layers of LCD materials. Electronic current is used to control the polarity of specific areas of the two layers. Any area of the screen for which the two polaroid layers are at right angles to each other will not pass any light—other areas will allow light to pass. In this manner, the alphanumeric information of LCD can be electronically controlled and displayed on an LCD display.

Another technology to control the intensity of light passing through the lenses includes directional filters such as the micro-louver.

In the preferred embodiment of this invention, we utilize electrochromics that change transparency when an electronic current is passed through them. In particular, we use a substance that is darkened (allowing some light to pass through) when current is applied across it, but is clearer and transparent and allows more light to pass unhindered when no current is applied to it. In other embodiments of the invention, other substances and technologies could be used that allow the lenses to change their color, or their properties of transparency or translucency.

Algorithms to Detect Movement in Motion Pictures

Early motion detectors were entirely analog in nature but completely suitable to monitor situations where no motion is to be expected, such as restricted areas in museums, and stores when they are closed for the evening. Recent advances in digital photography and computers have allowed new means to monitor such situations, and incorporate digital video systems that can passively record images at set time intervals (e.g. 15 frames per second), computer processors to process the image and detect motion, and cause appropriate action to be taken if motion is detected.

Many different algorithms have been developed for computer processing of images that can be used to determine the presence of lateral movement in a motion picture, as well as identifying the direction of lateral motion. In the future new algorithms will continue to be developed. Any algorithm that can process sequences of digital images, and detect motion and the direction of motion can be used in the invention.

Out of necessity, algorithms to detect movement in a motion picture have had to be developed. The problem is that movies for TV, cine, digital cameras, etc use many different formats. To show these different formats with the highest quality possible in a home or movie theater venue requires that the problem of format conversion between the input format and the output screen format be deftly handled to optimize the quality of the viewing. Detailed descriptions of the problem and various digital image processing solutions can be found in the magazine articles Electronic Design Strategy News articles by Brian Dipert, "Video improvements obviate big bit streams", Mar. 15, 2001, pp 83-102 and Electronic Design Strategy News, article by Brian Dipert, "Video quality: a hands-on view, Jun. 7, 2001, pp 83-96". A simplified example will however help to explain the problem and the approaches take to a solution. Consider an input signal to a TV which is 30 frames per second (analog TV) but that is being output and shown on a high-end digital LCD TV running at 120 frames per second. Showing a TV input signal of 30 fps at an output of 120 fps is an example of a format conversion problem. One simple way to address this problem of format conversion is to simply add 3 exact copies of each frame to the output stream. That works if there is no motion, but if a screen object exhibits any motion between frames then the 3 new frames have the moving object in the wrong place. If this solution is used, then the better and more expensive the digital TV, the worse this problem appears to the viewer. So digital TVs incorporate format conversion image processing, generally implemented as format-conversion chips that perform complex frame-to-frame image processing and track speed and direction of motion and then use that information to better construct the 3 new frames.

At least two different approaches are taken to detect and quantify motion between frames of a moving picture. They include edge-based algorithms and region-based algorithms. Any algorithm that quantifies motion between frames of a motion picture can be used with the algorithms of the preferred and alternate embodiments to set the optimal optical density of the neutral density filter of 3Deeps Filter Spectacles.

Edge-based algorithms have been used in digital cameras as part of the means to implement functions such as auto-focus. Edge-based algorithms utilize information that can be calculated from the discontinuities between adjoining pixels of the digitized image. For instance, consider a person standing against a light background. The edge pixels of the person can be clearly identified because of the sudden change in pixel value. Edge-based algorithms generally identify such intensity edges in the image, eliminate all other pixels (for instance by changing them from their recorded value to 'white'), and then process the image based solely on the identified intensity edges.

The Melzonic chip from Philips is one example of a region-based algorithm. The Philips Melzonic chip uses a technique for motion estimation, which they call '3-D Recursive Search Block-Matching'. By analyzing two successive TV fields to locate blocks of pixels in the second field that match blocks in the first, 3-D Recursive Search Block-Matching is able to assign a velocity vector to each block of pixels in the first field. These velocity vectors can then be used to interpolate the correct spatial position of each pixel block in a new field that is positioned temporally between the two original fields—i.e. to create new movement phases.

The Philips Melzonic chip, or the methods, systems and apparatus in the previously described US Patents of Iue (U.S. Pat. No. 5,717,415), Nagaya (U.S. Pat. No. 5,721,692), or De Haan (U.S. Pat. No. 6,385,245), or in other inventions or algorithms for motion object detection, may be incorporated in embodiments of the 3Deeps System as a means control the optical density of the neutral density filter of the 3Deeps Filter Spectacles.

One might think that alternating between the screen-flatness of a dialogue scene and the deep space of an action scene would disrupt the flow of a story. In fact, just as accompanying movie-music can be intermittent while entirely supporting a story development, dialogue is best attended to with the screen flat and action-spectacle is most effective given the dimension and enhanced clarity of depth. Usually a function of lighting specialists, it is always necessary to make objects and spaces on a flat screen appear distinct from each other; besides making a scene more convincing, 3-D separation of forms and of spatial volumes one from the other speeds up the "reading" of what are essentially spatial events. This is to say: flat can best enable concentration on dialogue; depth-dimension can most effectively deliver action scenes. Alternating between 2-D and 3-D awareness is something we even do, to a degree, in our experience of actuality, as a function of our changing concentration of attention; just as we hear things differently when we concentrate on listening. Then, too, making sense of movies is a thing we learn to do, as different from life-experience as a movie is with its sudden close-ups and change of angle and of scene, its flashbacks, et cetera. Movie viewing is a learned language, a form of thinking; the alternating of flat-screen information with depth-information will be as readily adapted to as any other real-world-impossibility accepted without question as natural to the screen.

Synchronization and Control

The preferred embodiment of the Continuous Adjustable 3Deeps system makes use of signals to synchronize the lens filters of the viewing spectacles to the lateral motion in the motion picture, and thus control the 3-dimensional visual effect for the viewer. The signals are developed in real-time, and does not require any alteration to the motion picture, or that any control information is placed in the motion picture. The information that is calculated is used to determine synchronization events that are used to control the state of darkening individually of the left and right lenses of the Continuous Adjustable 3Deeps system.

Motion pictures have benefited from other types of synchronization and control information that is placed within the frames of motion pictures. However, these are characteristically different than the synchronization and control used in this invention.

In many motion pictures, to alert the movie theater projectionist that it is time to change reels, movie producers would place visible control information, in the form of a white circle appearing in the upper right upper hand corner of successive frames of the movie. When the projectionist sees this information, they know that it is time to start a second projector that has the next reel of the movie, and thus maintain an uninterrupted motion picture presentation.

Another means of communicating control information in motion picture frames is with the clapper slate board that indicates the start of a new scene when filming a motion picture. When filming motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers (SMPTE) code, usually in large red light emitting diode numerals. The SMPTE code displayed is then used to electronically synchronize the video recording with a separate audio recording.

These types of synchronization and control information solve problems related to the synchronization of sound with filmed action during the production and editing of motion pictures, and related to changing reels of film during the presentation of motion pictures.

Overview

The following is a brief overview describing the organization of the Detailed Description of the invention.

Figure 2:
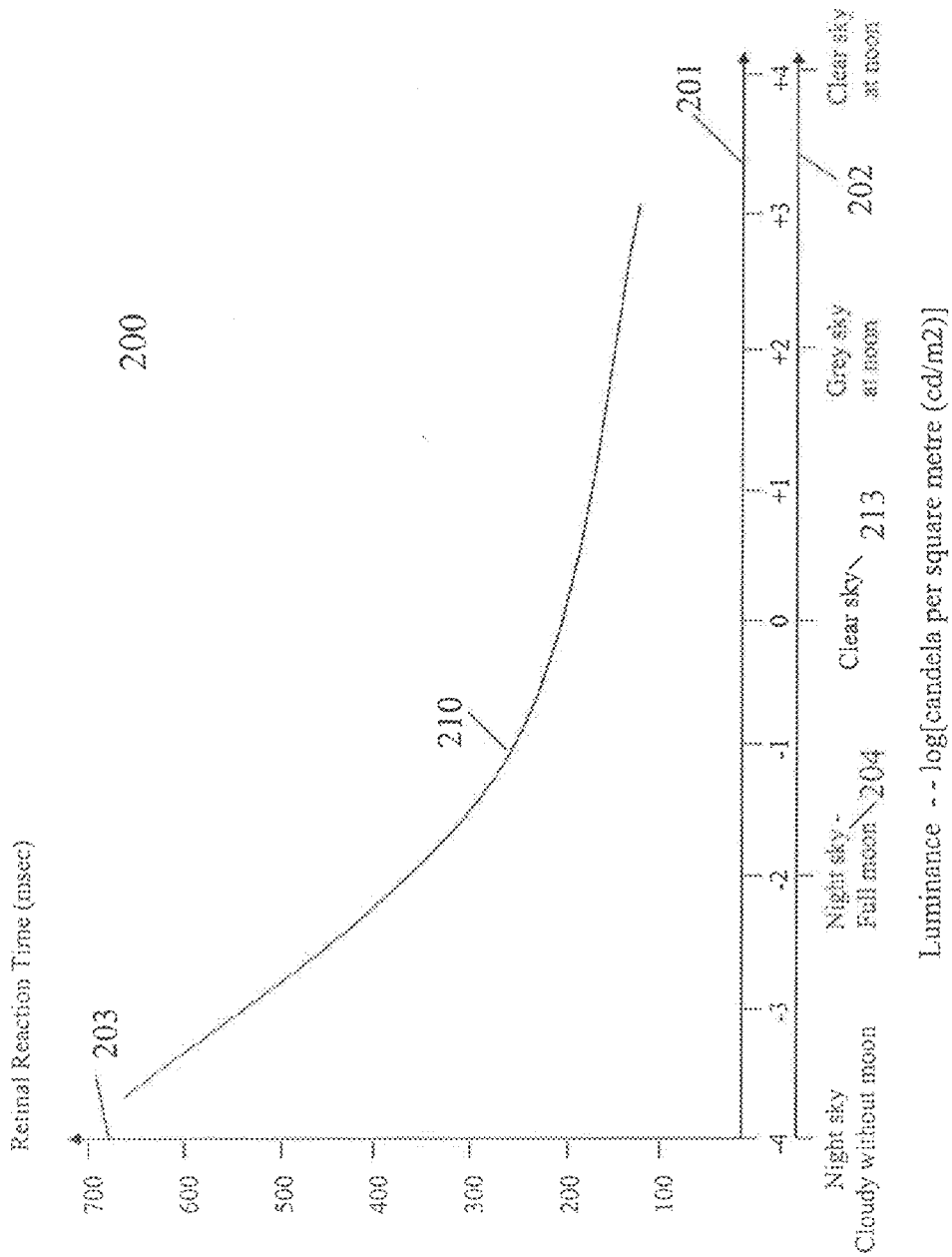
FIG. 2 shows a typical curve of retinal reaction time as a function of luminosity.
Figure 3:
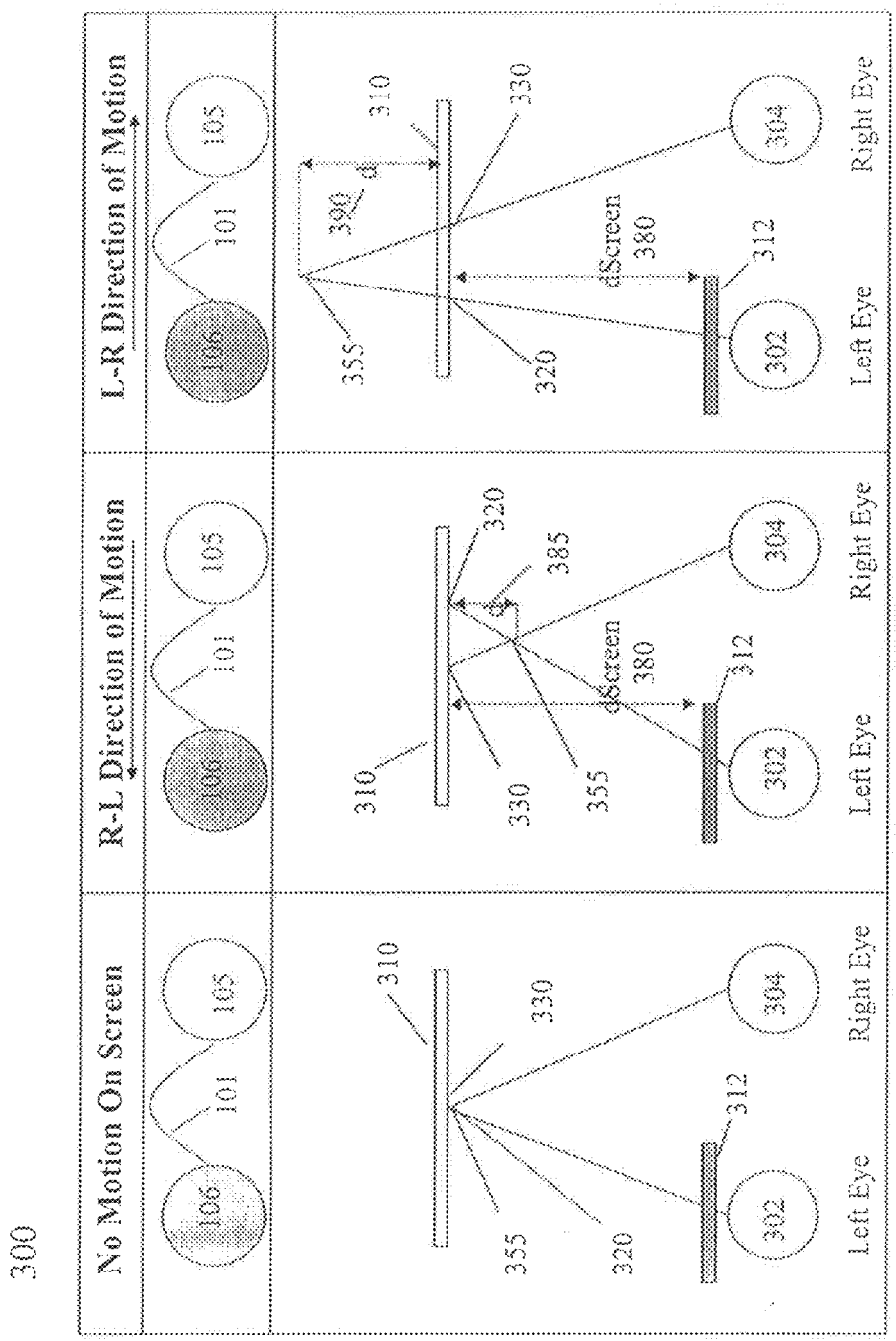
FIG. 3A shows the operation of the Pulfrich illusion when there is no horizontal foreground motion in the motion picture.
FIG. 3B shows the operation of the Pulfrich illusion when the motion picture exhibits horizontal foreground motion from the right to the left.
FIG. 3C shows the operation of the Pulfrich illusion when the motion picture exhibits horizontal foreground motion from the left to the right.

FIG. 1 is a perspective view of the preferred embodiment of the Continuous Adjustable 3Deeps Filter Spectacles that are the ocular mechanism through which 2D movies may be viewed as 3D. FIG. 2 shows a typical curve of retinal reaction time as a function of luminosity. In FIG. 2 and FIG. 3 we will explain the working of the Pulfrich illusion that occurs when viewing with one eye through a filtered lens and the other eye unobstructed or through a clear or unfiltered lens. The image seen through the clear lens is termed the 'instant image' and the image seen through the darker lens is termed the 'lagging image'. While previous related co-pending applications have taught this well-known illusion, we re-explain it in terms of a general retinal reaction time curve. Fully understanding the retinal reaction time curve is key to understanding how the instant invention uses this relationship to select optimal values for the optical density of the neutral density filter.

As previously described, it has to be stressed again that the terminology 'instant image' and 'lagging image' of the disclosed invention should not be confused with 'left-eye image' and 'right-eye image' of other 3D systems. The definitions are totally different. Dual image systems have separate right-eye and left-eye images that are directed to the appropriate eye. The present invention is a single-image system so that the right-eye and the left-eye always view the identical image. The eye however transmits delayed images to the brain that are termed the 'instant image' and the 'lagging image' and are organized by the brain as the 'eye image'. Thus, the present single-image invention works with any motion picture ever made, while most 3D systems must have specially prepared, produced, processed and displayed dual image motion pictures. Additionally, a viewer cannot watch a dual-image 3D system such as Analglyph, IMAX or Polaroid, or shutter-glass system with Continuous Adjustable 3Deeps Filter Spectacles. Similarly a viewer cannot watch a regular movie with the special viewing spectacles used with dual-image 3D systems such as Analglyph, IMAX or Polaroid, or shutter-glass and view the movie 3D.

Figure 4:
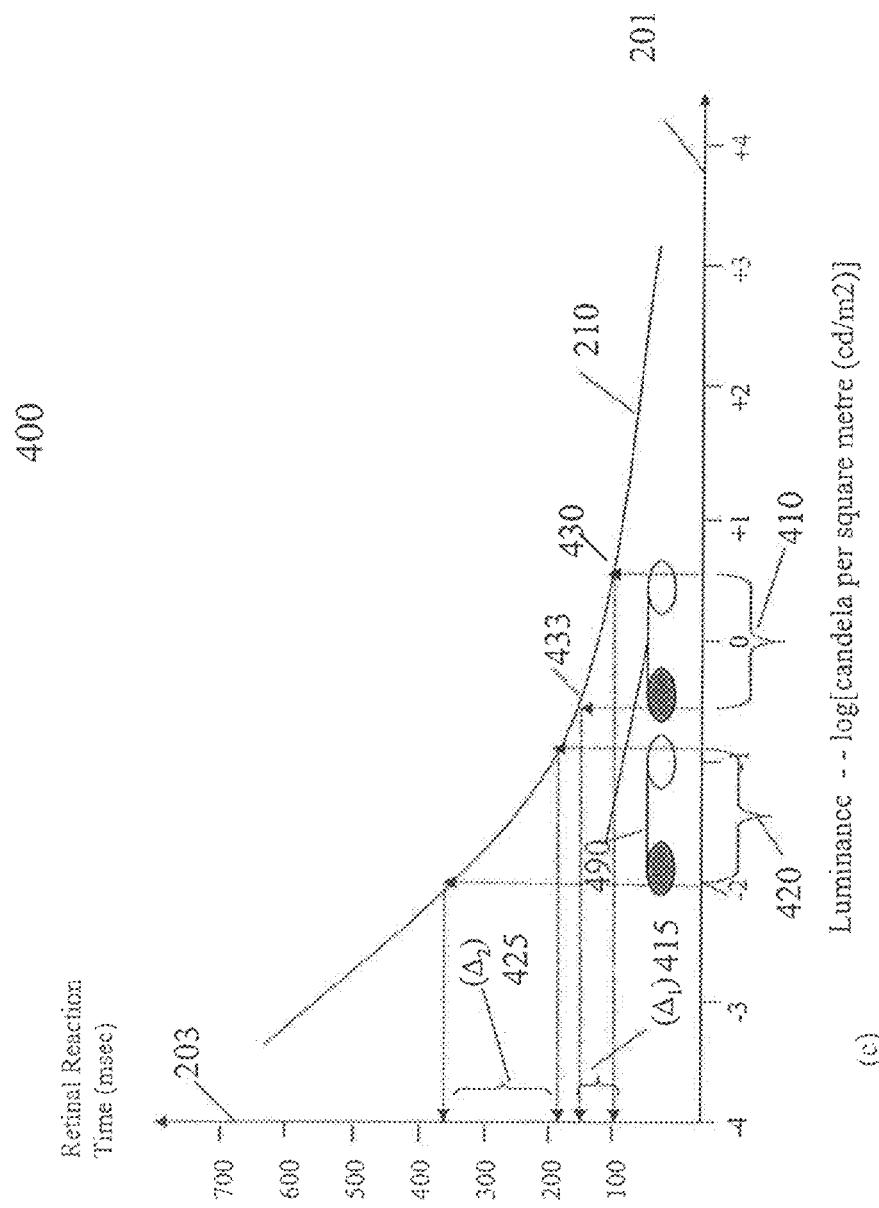
FIG. 4 uses the typical curve of retinal reaction time as a function of luminosity to explain the operation of cardboard Pulfrich Filter spectacles with fixed lenses.

In FIG. 4 we use the retinal reaction time curve to explain the working of cardboard Pulfrich spectacles. Cardboard Pulfrich Spectacles have been used for many years prior to the invention of 3Deeps Filter Spectacles (and are sometimes also called TV spectacles). We explain the shortcomings and problems of the cardboard spectacle approach. The current invention overcomes most of the problems and shortcomings of the cardboard spectacles.

Figure 5:
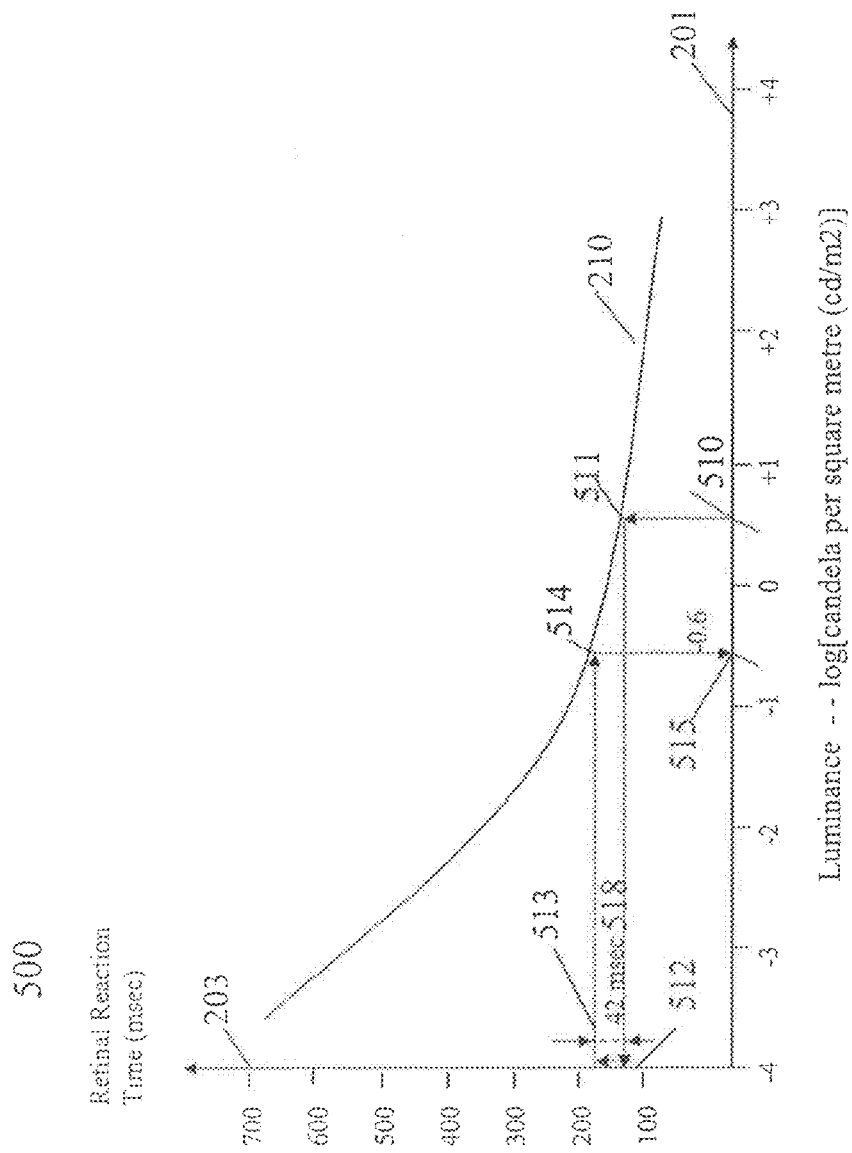
FIG. 5 uses the typical curve of retinal reaction time as a function of luminosity to demonstrate how to compute from a motion vector and luminosity the optimal optical density for the neutral density lens of the preferred embodiment of the Continuous Adjustable 3Deeps Filter Spectacles so that the difference in retinal reaction time between the viewer's eyes results in instant and lagging images that correspond to a separation on the display monitor of exactly 2½ inches.
Figure 6:
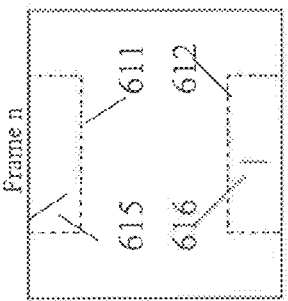
FIG. 6 shows an algorithm that can be used to calculate the optimal optical density for the neutral density filter of the preferred embodiment of the Continuous Adjustable 3Deeps Filter Spectacles.
Figure 7:
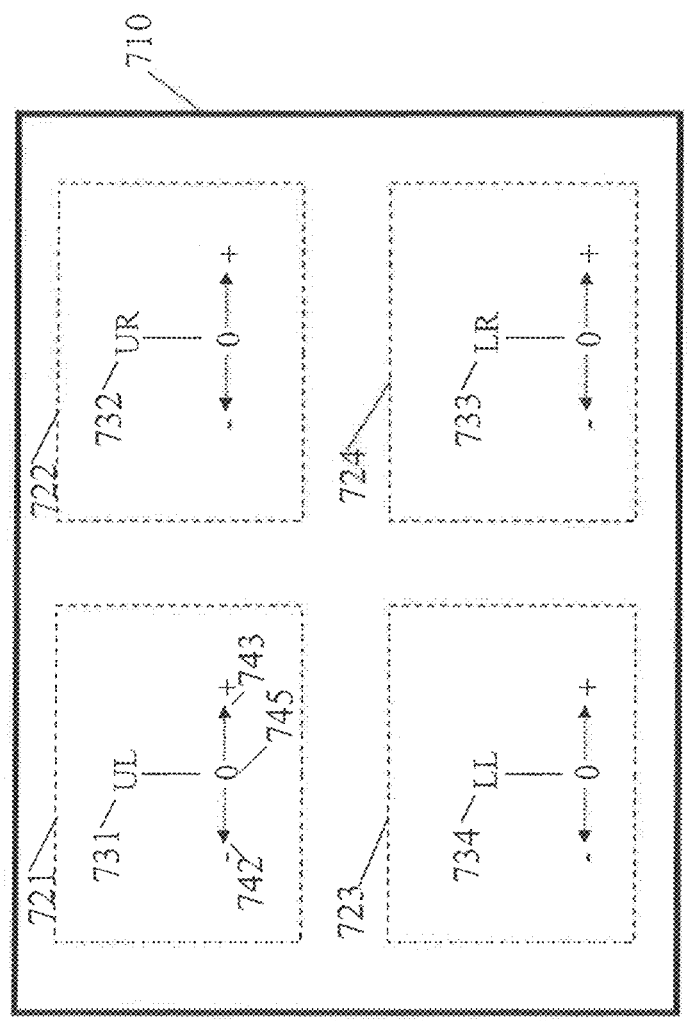
FIG. 7 is an illustration of an alternate algorithm to characterize lateral motion in a motion picture.

In FIG. 5 and FIG. 6 the retinal reaction time curve is used to explain how to calculate an optical density for the controllable neutral density filter that optimizes the Pulfrich illusion. This preferred embodiment requires as input measures the horizontal speed and direction of lateral motion, and a luminance or brightness measure. Since the average inter-ocular distance between a person's eyes is 2.5 inches, this method computes an optical density for the neutral density filter so the 'lagging image' seen through the filtered eye lags the 'instant image' seen through the unfiltered eye by the average inter-ocular distance of 2.5 inches. This method optimizes the depth perception of Continuous Adjusting 3Deeps Filter Spectacles, and overcomes the shortcomings and problems of the cardboard Pulfrich spectacles. FIG. 7 is an illustration of an alternate algorithm to characterize lateral motion in a motion picture.

Figure 8:
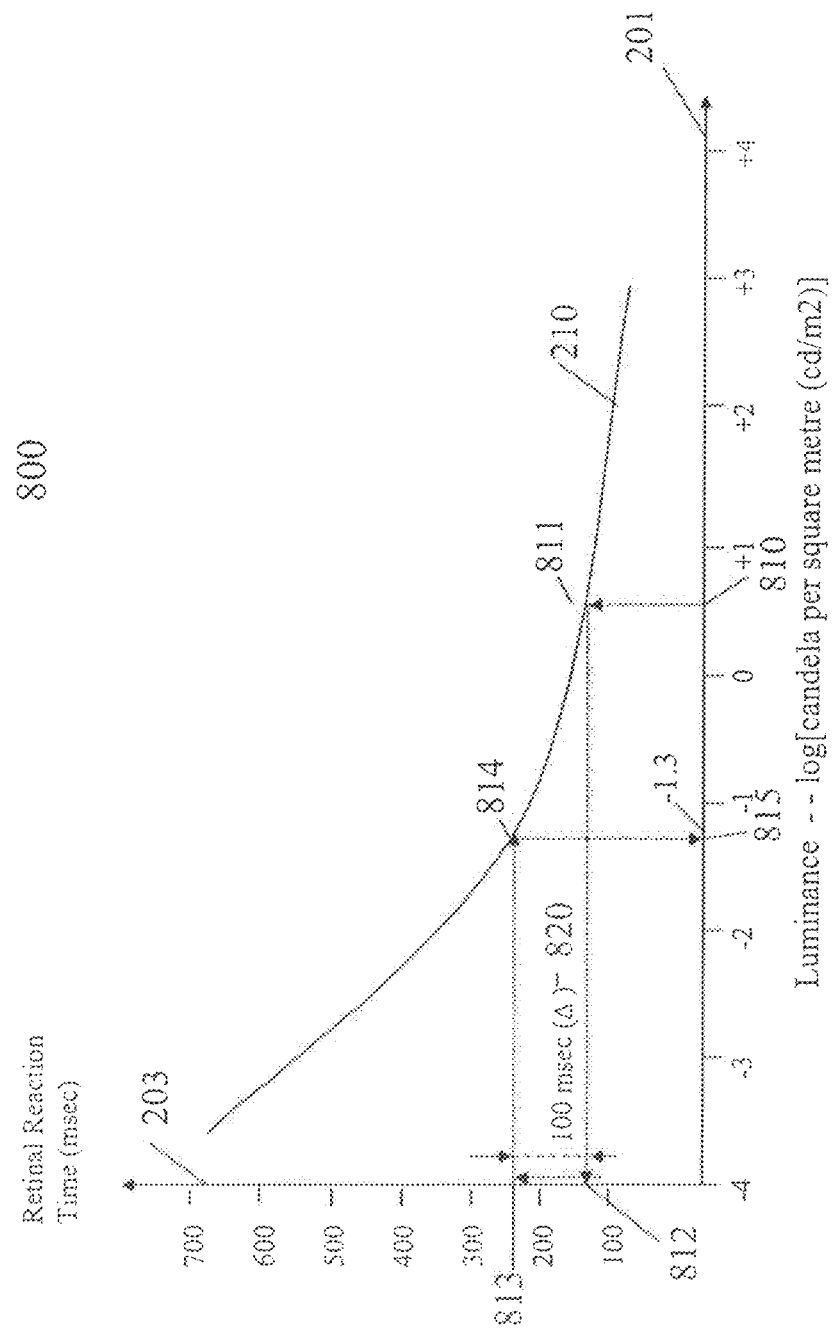
FIG. 8 uses the typical curve of retinal reaction time as a function of luminosity to demonstrate a first alternate embodiment for computing an optimal optical density for the neutral density lens of the Continuous Adjustable 3Deeps Filter Spectacles so that the difference in retinal reaction time between the viewer's eyes is a constant value.
Figure 9:
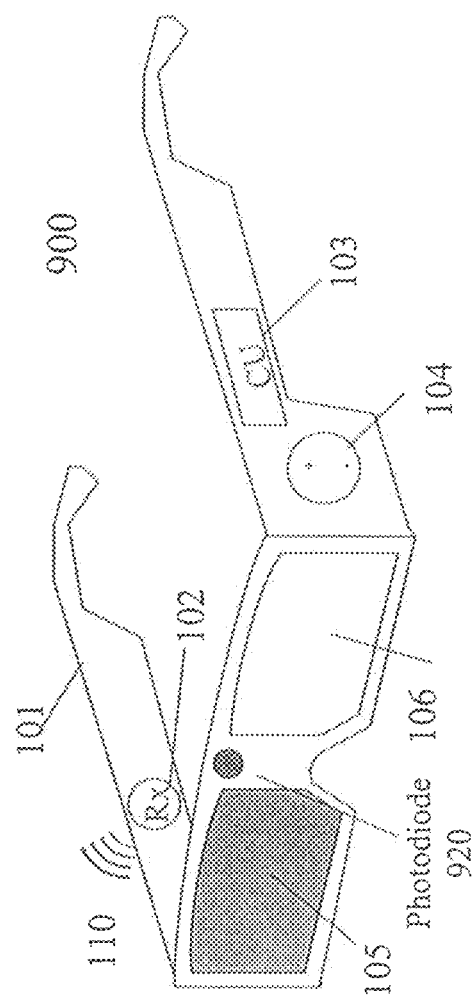
FIG. 9 shows Continuous Adjustable 3Deeps Filter Spectacles that include a photo-detector.

In FIG. 8 we use the retinal reaction time curve to show a first alternate method to calculate an optical density for the controllable neutral density filter. This method only requires that we know the direction of lateral motion and luminance value—but not the speed of motion. This approach sets the optical density of the neutral density lenses at a value so the difference in retinal reaction time is constant even as luminance changes. This method also overcomes shortcomings and problems of the cardboard Pulfrich spectacles. In FIG. 9 we show how this method operates when incorporated with a photo-detector that is included directly into the Continuous Adjusting 3Deeps Filter Spectacles.

Figure 10:
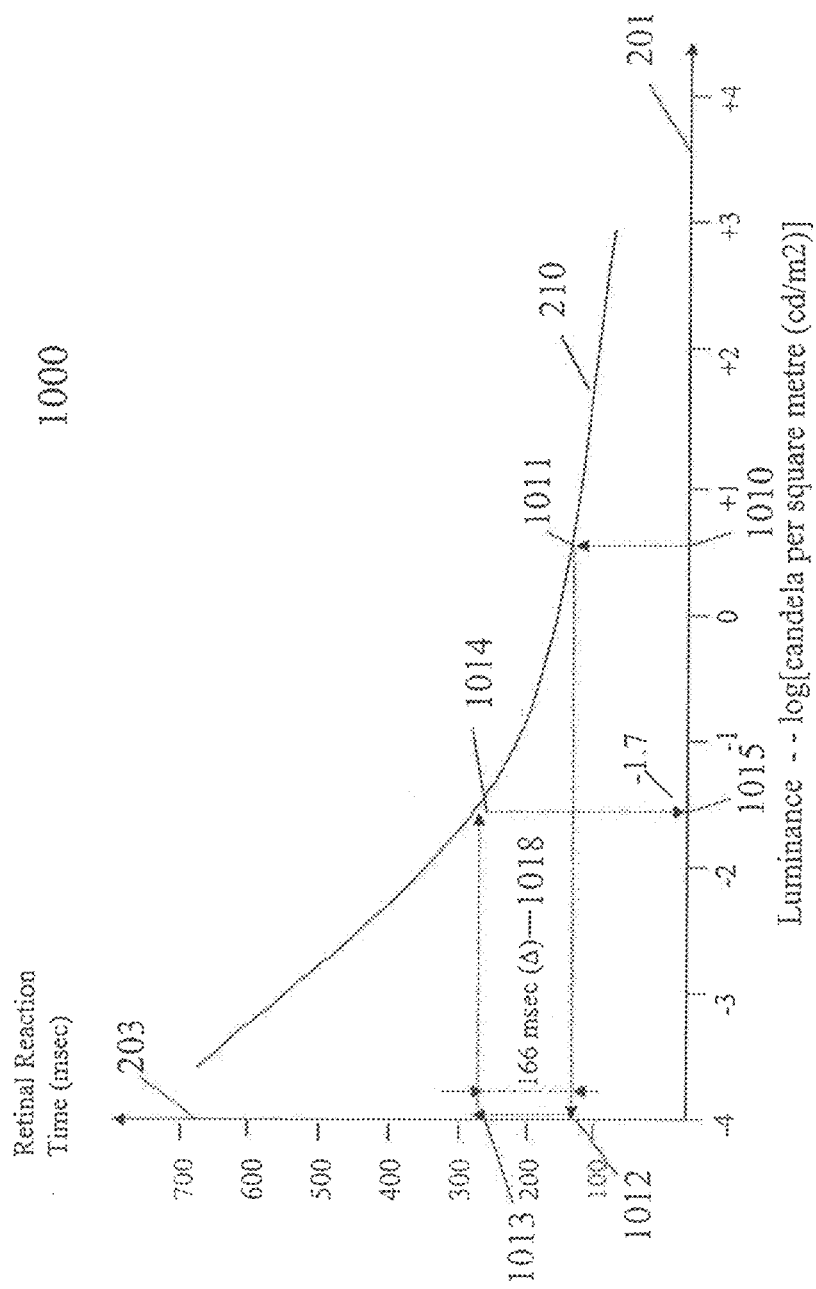
FIG. 10 uses the typical curve of retinal reaction time as a function of luminosity to demonstrate a second alternate embodiment for computing an optimal optical density for the neutral density lens of the Continuous Adjustable 3Deeps Filter Spectacles so that the difference in retinal reaction time between the viewer's eyes corresponds to a fixed number of frames of the motion picture.

In FIG. 10 we use the retinal reaction time curve to show a second alternate method to calculate an optical density for the controllable neutral density filter. This method only requires that we know the direction of lateral motion and luminance value—not the speed of motion—and using the retinal reaction time curve, selects values so the instant and lagging images are separated by a pre-specified number of frames of the motion picture. This method also overcomes the shortcomings and problems of the cardboard Pulfrich spectacles.

Figure 11:
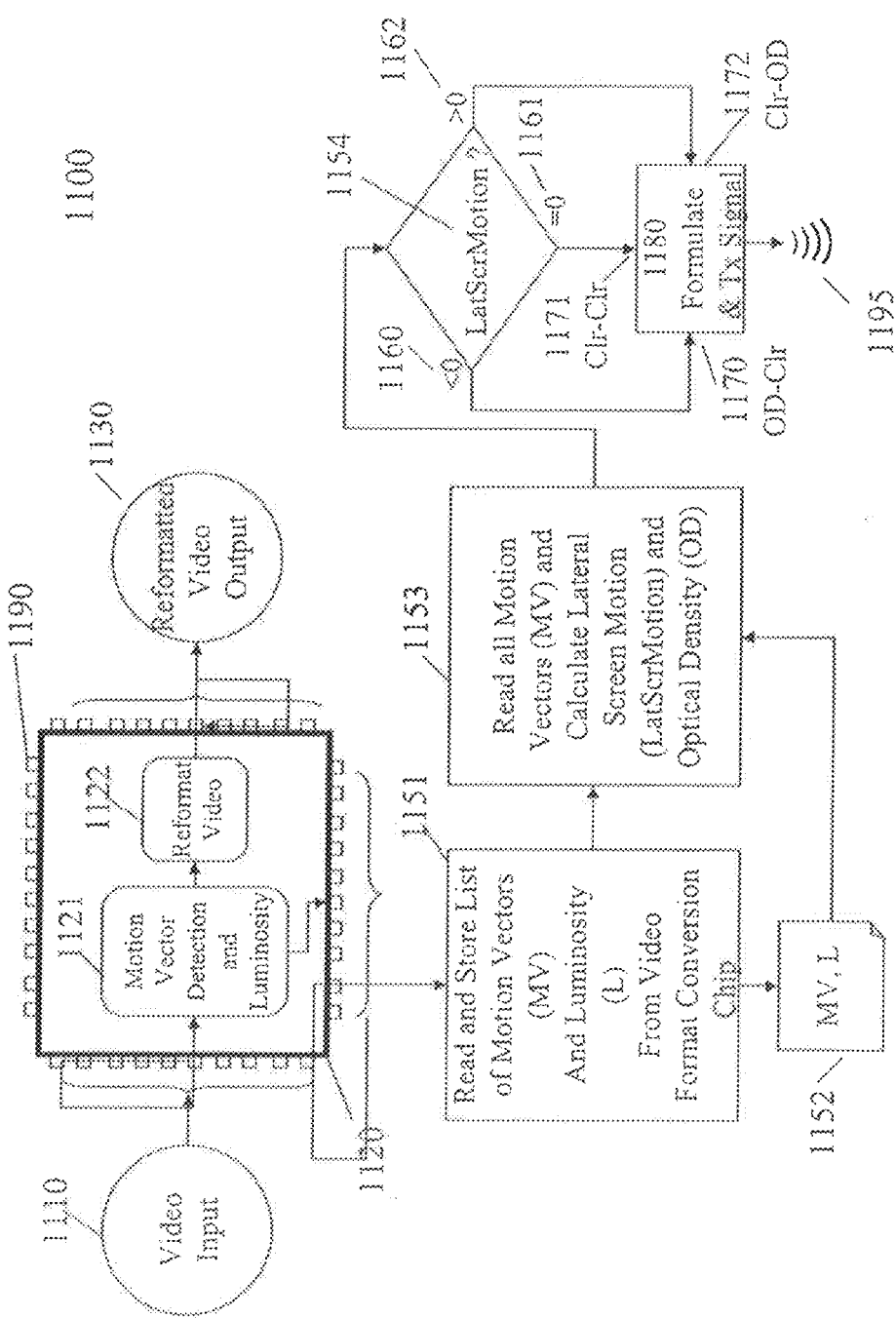
FIG. 11 is a flowchart showing the use of a format conversion semiconductor chip to compute the Continuous Adjustable 3Deeps Filter Spectacles synchronization information.
Figure 12:
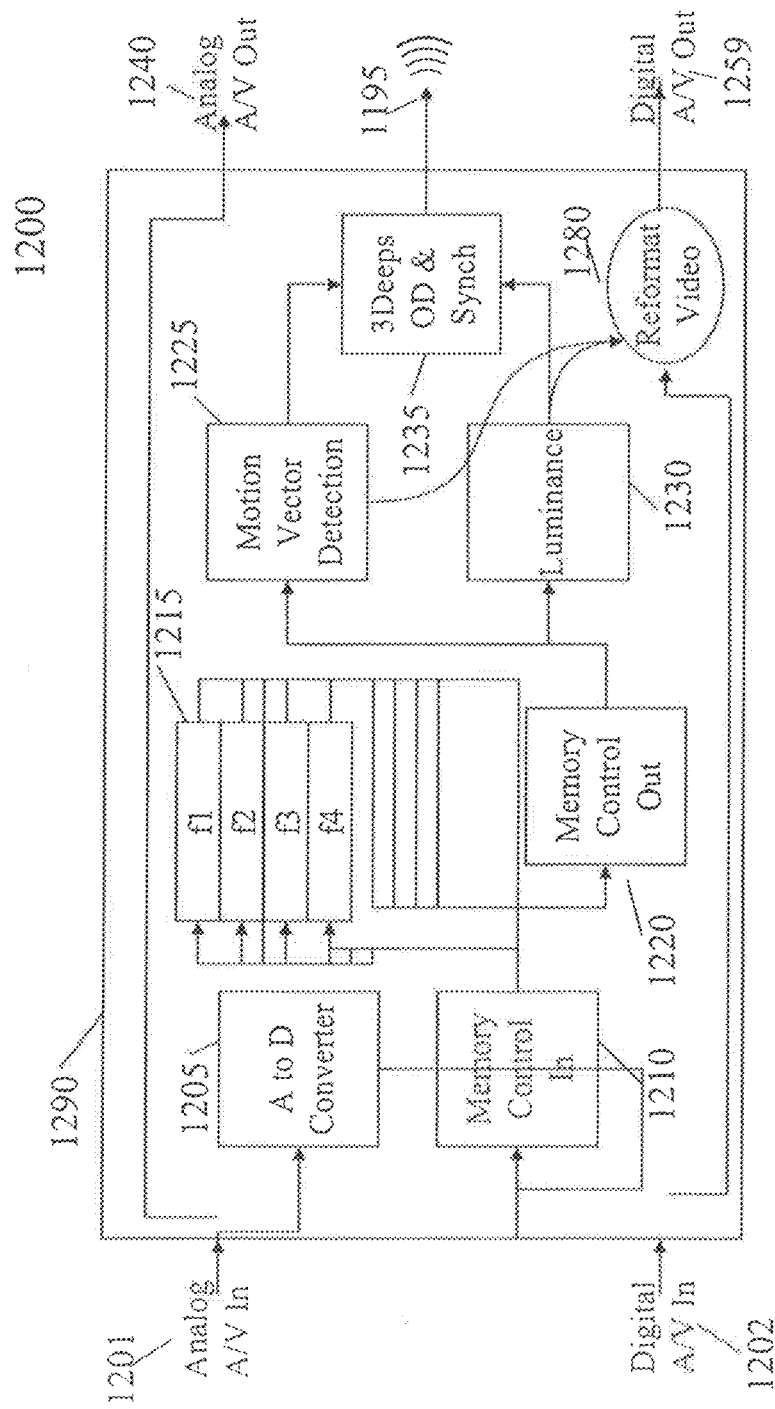
FIG. 12 is a block diagram showing the operation of the Video and 3Deeps processing used to calculate the optimal optical density of the neutral density filter in the preferred embodiment of the Continuous Adjustable 3Deeps Filter Spectacles.

The video industry has for many decades used Video Format Converters (semiconductor chips, and apparatus such as up-converters) to reformat movies for showing in different venues. FIG. 11 teaches how to incorporate methods of this invention with such video formatters. FIG. 11 is a flowchart of how to incorporate the methods of the invention with such a semi-conductor video format converter chips that is able to report out the detected motion vectors. In method of the invention may also be incorporated directly into the video format conversion chip to calculate control information for the Continuous Adjustable 3Deeps Filter Spectacles. FIG. 12 is a block diagram showing operation of a Video and 3Deeps processing used to calculate the optimal optical density of the neutral density filter in the preferred embodiment of the Continuous Adjustable 3Deeps Filter Spectacles.

Figure 13:
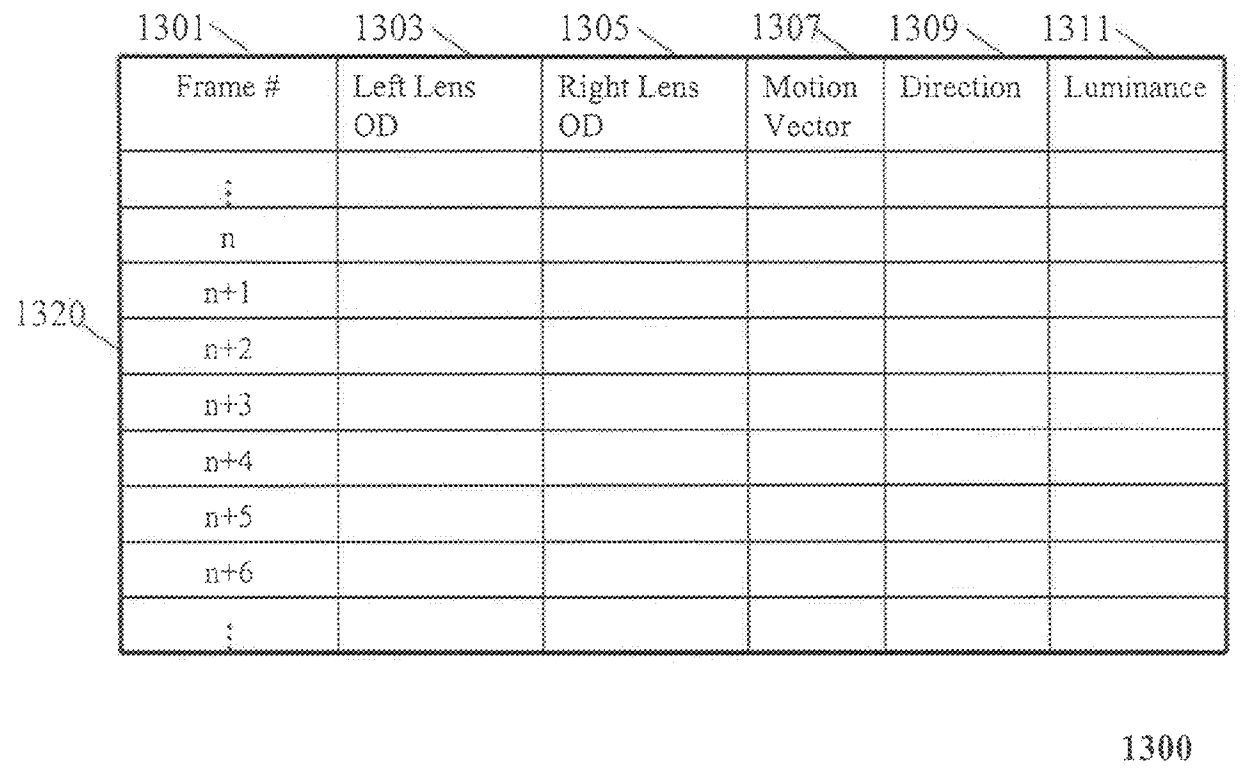
Figure 14:
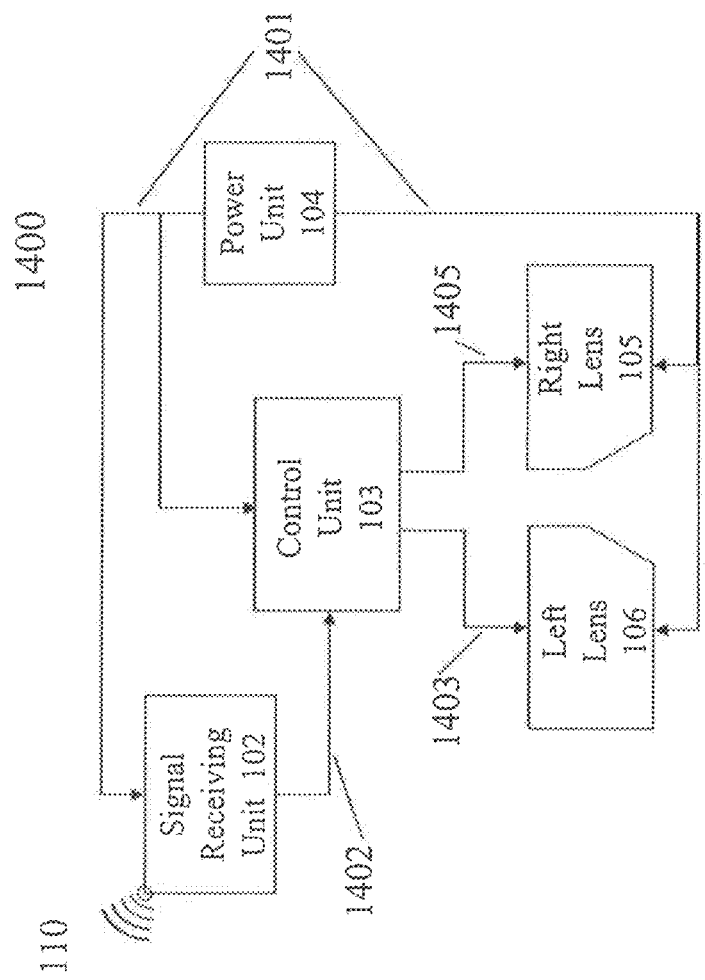
FIG. 14 is a block diagram of the operation of the Continuous Adjustable 3Deeps Filter Spectacles.
Figure 15:
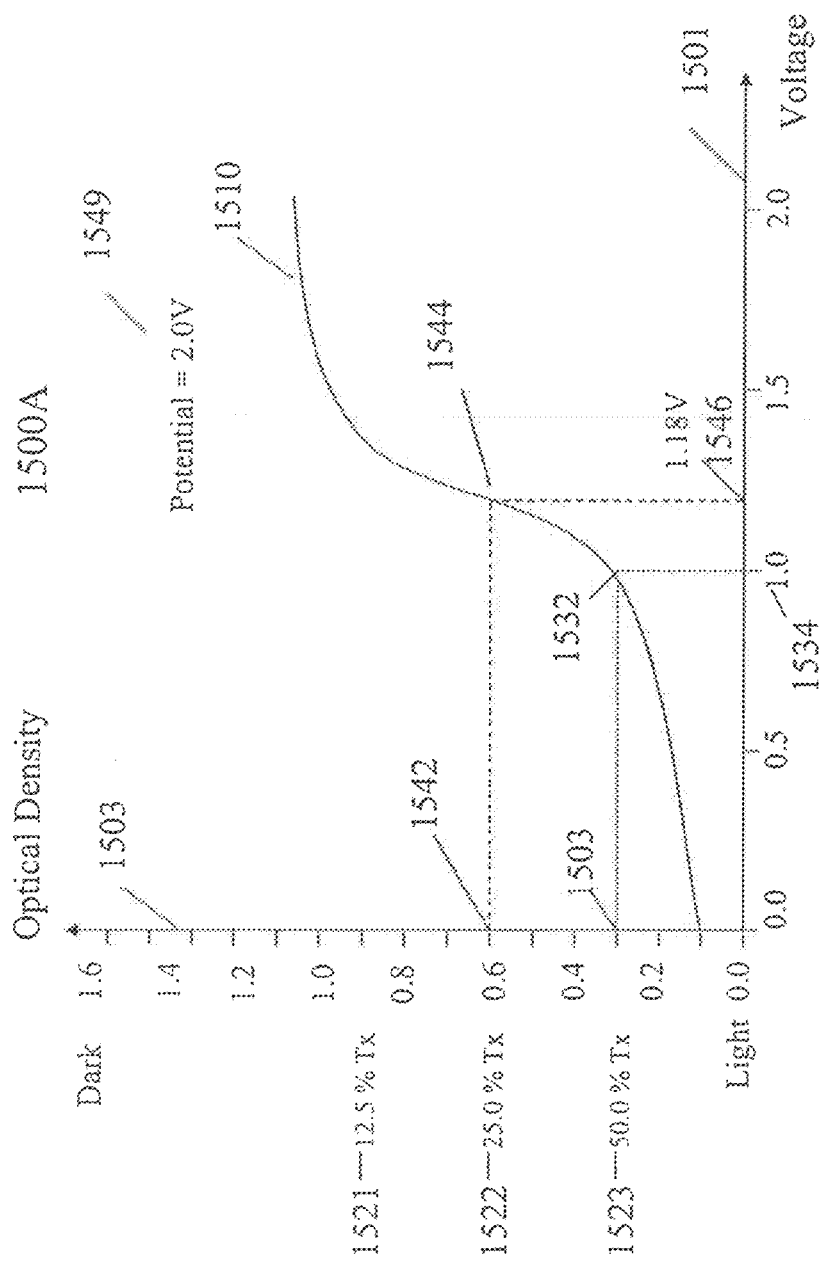
FIG. 15 shows a typical operating characteristic curve for an electrochromic material with optical density as a function of voltage.
Figure 16:
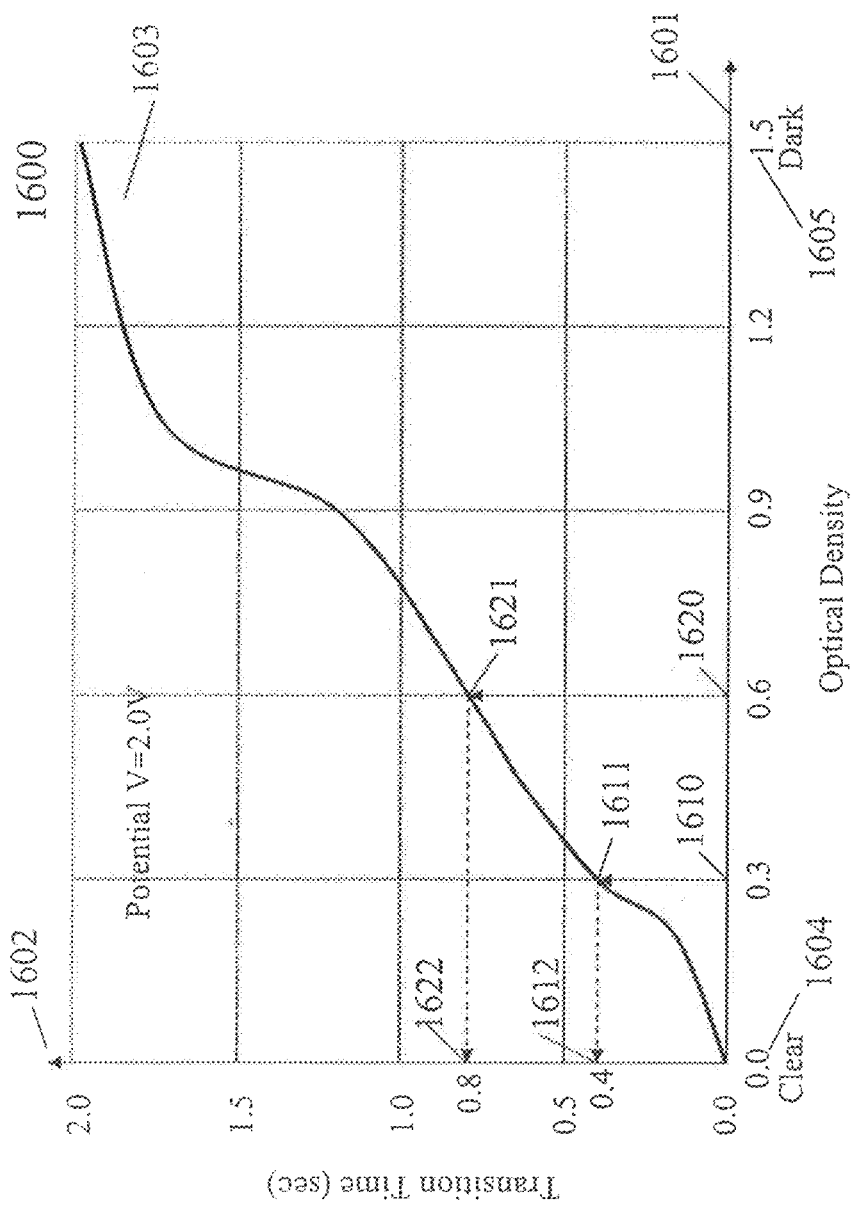
FIG. 16 is a first example of a transition lime curve for an electrochromic material with transition time as a function of optical density.
Figure 17:
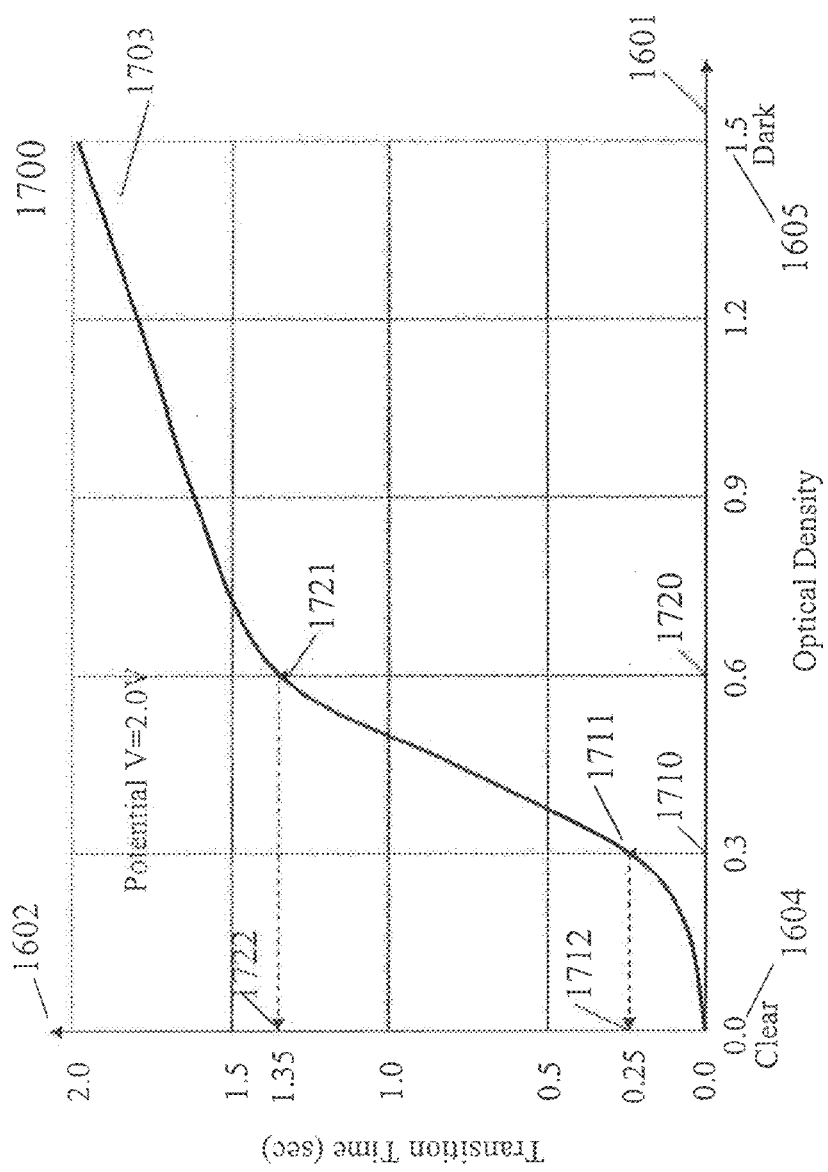
FIG. 17 is a second example of a transition time curve for an electrochromic material with transition time as a function of optical density.

In FIG. 13-19 we focus on the operation of the Continuous Adjustable 3Deeps Filter Spectacles, and specifically the means by which we optimize the operation of the lenses of the spectacles to the characteristics of the material from which the lenses are fabricated. FIG. 13 is a table showing the control information provided to the Continuous Adjustable 3Deeps Filter Spectacles by the Video and 3Deeps Processing, and FIG. 14 is a block diagram of the operation of the Continuous Adjustable 3Deeps Filter Spectacles, and For a typical electrochromic material FIG. 15 provides a typical Operating Characteristic curve (input Voltage and output optical density) for electrochromic material and shows how it is used by the 3Deeps Filter Spectacle to set the optical density of the neutral filter lens. FIG. 16 is a typical transition time curve for an electrochromic material with transition time as a function of optical density and for an electric potential that provides the most rapid change from a lower to higher optical density. FIG. 17 is a typical transition time curve for an electrochromic material with transition time as a function of optical density and for an electric potential that provides the most rapid change from a higher to a lower optical density.

Figure 18:
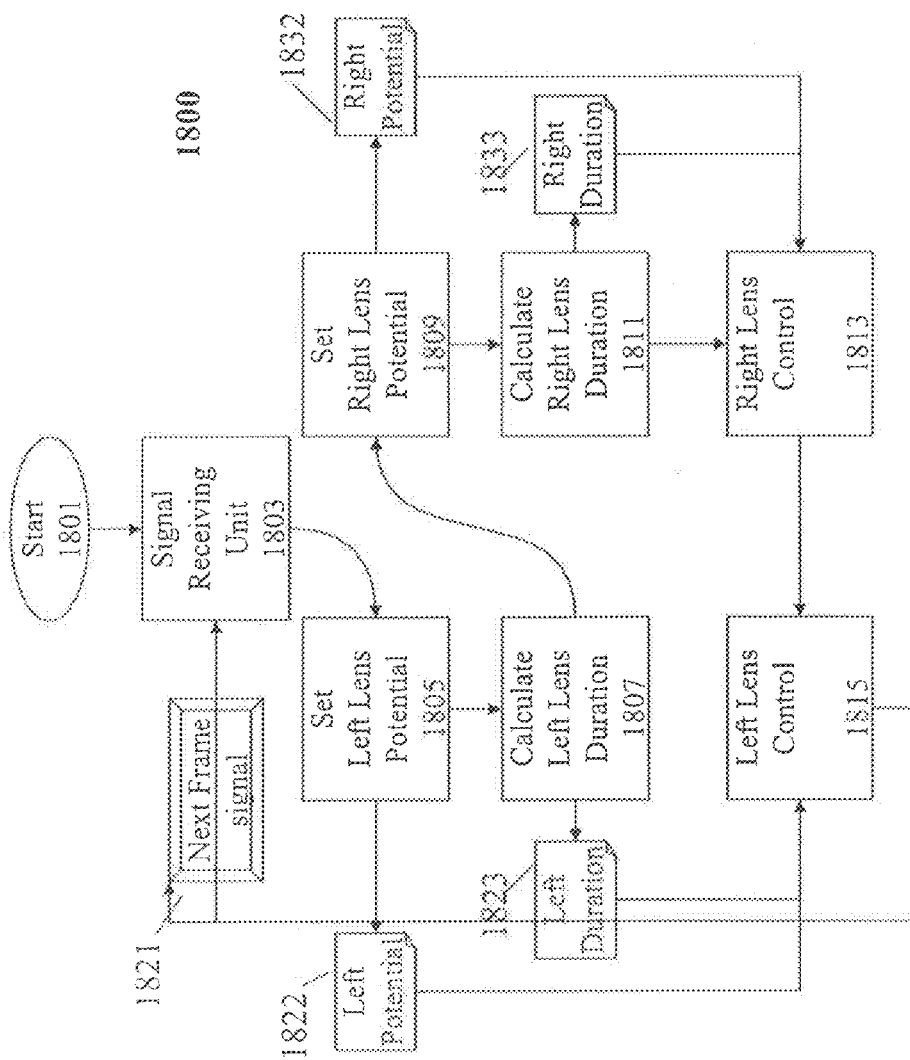
FIG. 18 is a block diagram showing the operation of the control unit of the Continuous Adjustable 3Deeps Filter Spectacles.
Figure 19:
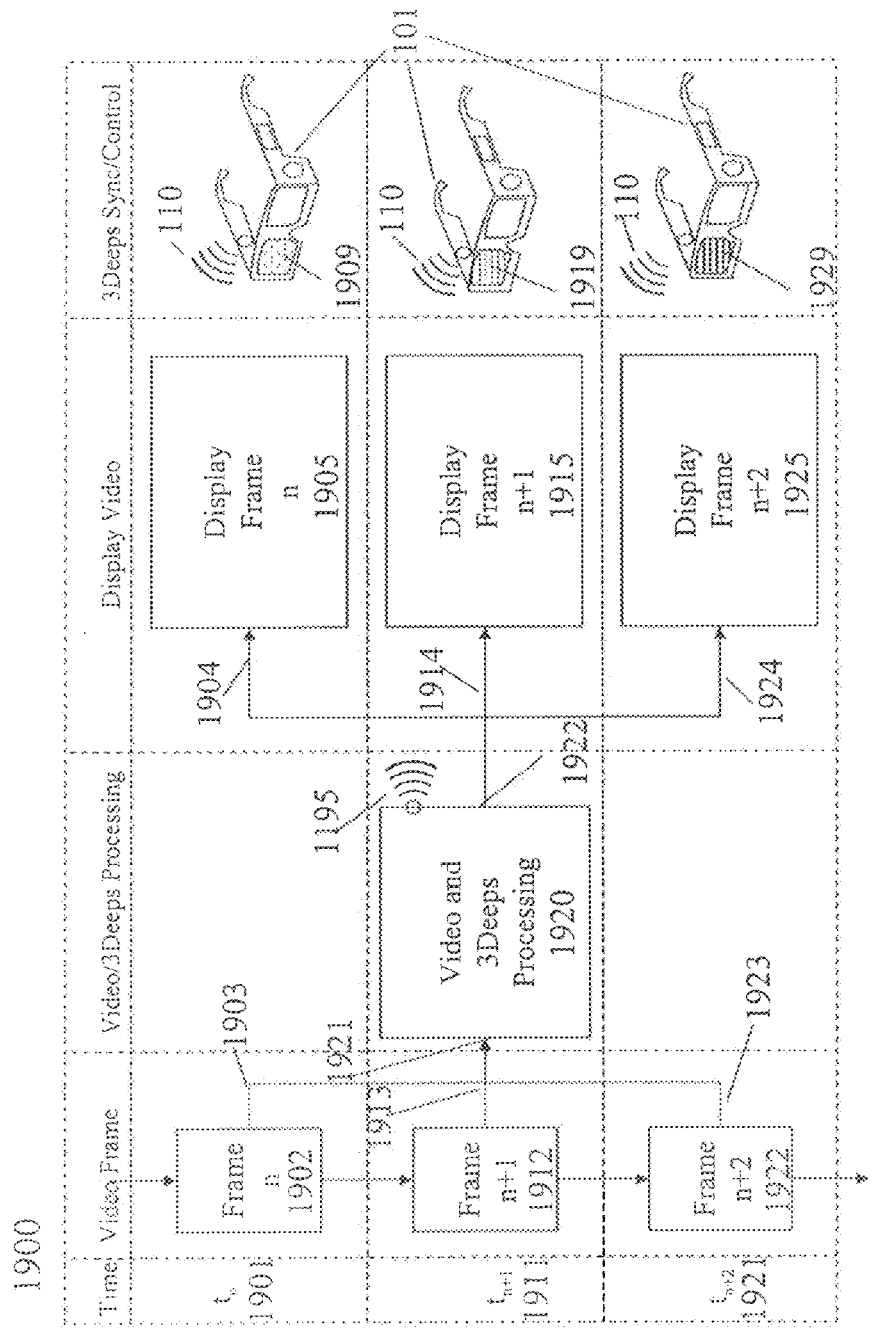
FIG. 19 is a block diagram showing the operation of a typical the Continuous Adjustable 3Deeps Filter Spectacles system.

FIG. 18 is a block diagram showing the operation of the control unit of the Continuous Adjustable 3Deeps Filter Spectacles, and describes how the operating characteristic curve of FIG. 15 and the transition time curves of FIG. 16 and FIG. 17 are used to optimize the operation of the lenses of the Continuous Adjustable 3Deeps Filter Spectacles. FIG. 19 shows the operation of an entire system—a typical Continuous Adjustable 3Deeps Filter Spectacles system—from input of the video frame, through Video and 3Deeps Processing to calculate the optimal optical density, the transmission and reception of the control information, and the operation of the Control Unit of the Continuous Adjustable 3Deeps Filter Spectacles.

Figure 20:
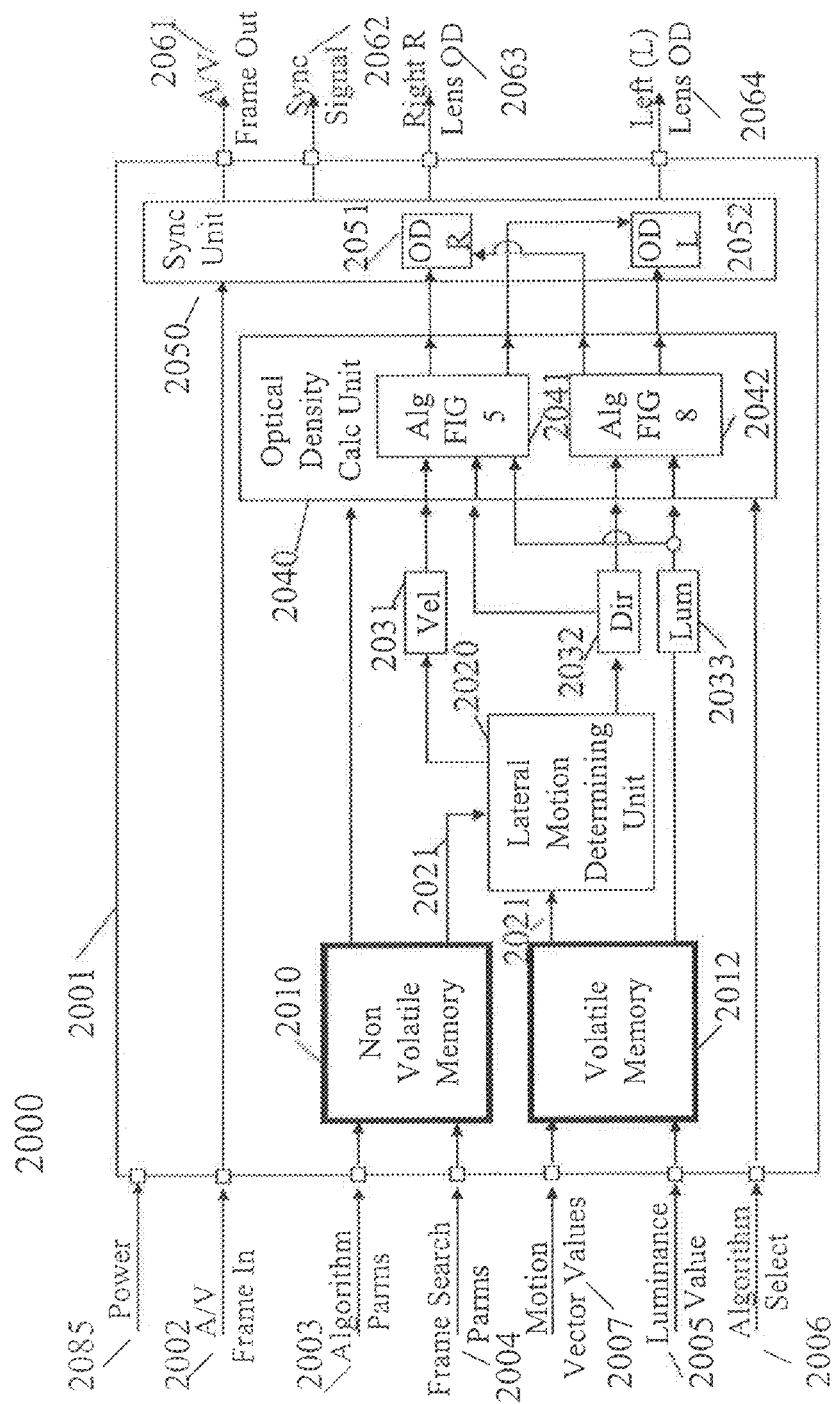
FIG. 20 is a block diagram for a preferred embodiment of an IC Chip generating optimum optical density signals for each individual lens of a Continuous Adjustable 3Deeps Filter Spectacle.
Figure 21:
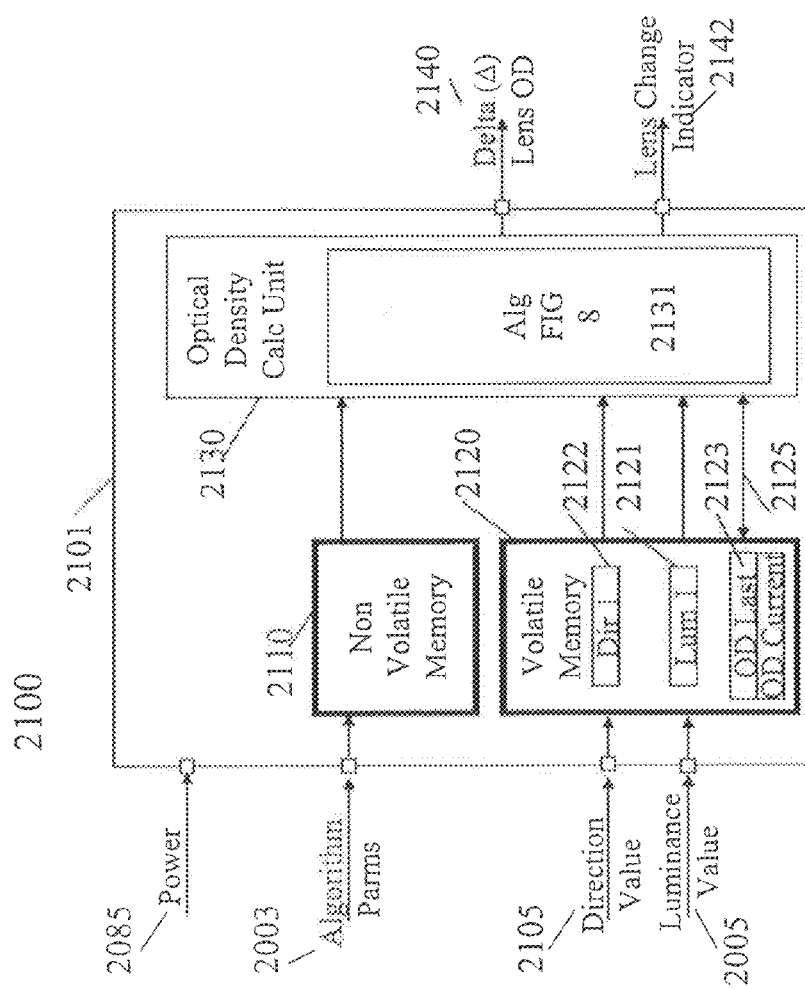
FIG. 21 is a block diagram 2101 of an alternate embodiment of an IC chip generating the change in optical density signals for each individual lens of a Continuous Adjustable 3Deeps Filter Spectacle.
Figure 22:
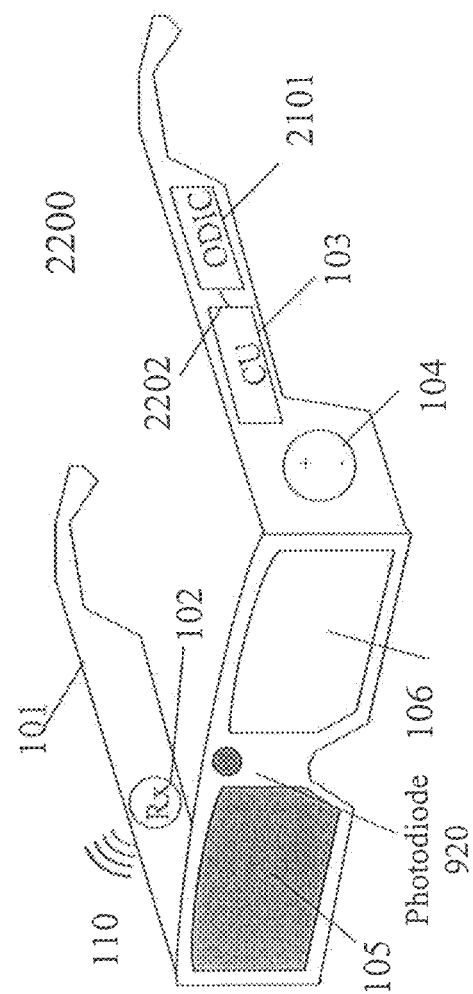
FIG. 22 shows Continuous Adjustable 3Deeps Filter Spectacles that include an IC chip generating the change in optical density signals for each individual lens of a Continuous Adjustable 3 Deeps Filter Spectacle.

FIGS. 20-22 shows hardware implementations of algorithms that calculate an optical density for the controllable neutral density filters. FIG. 20 shows an IC implementation selectable for either the algorithm described in FIG. 5 and FIG. 6, or the algorithm described in FIG. 8. The chip may be coupled to a video format conversion chip for input, and for output to the Continuous Adjustable 3Deeps Filter Spectacles, or another chip that outputs to the spectacles. FIG. 21 shows an alternate IC chip embodiment using the algorithm of FIG. 8. In this embodiment only the change in optical density is transmitted to the Control Unit of the Continuous Adjustable 3Deeps Filter Spectacles. While this IC chip may be coupled to a video format conversion chip, FIG. 22 shows how it may be implemented and coupled to the Control Unit of the Continuous Adjustable 3Deeps Filter Spectacles.

Continuous Adjustable 3Deeps Filter Spectacles

FIG. 1 is a perspective view 100 of the preferred embodiment of the Continuous Adjustable 3Deeps Filter Spectacles. It is comprised of a frame 101 that is used as the housing for the lenses and control circuitry. Such frames are a well-known means by which lenses can be fixed before a person's eyes for viewing. On the frame 101 is battery device 104 to power all circuitry of the optical density Continuous Adjustable 3Deeps Filter Spectacles. Also, on the frame 101 is a receiver 102 labeled 'Rx' that is powered by the battery 104. The receiver 102 has apparatus to receive radio-frequency (RF) 110 waves with synchronization and control information used to control the Continuous Adjustable 3Deeps Filter Spectacles. Such receivers are well known in the art of electronics. Also on the frame 101 is a control unit 103 powered by the battery 104 that transforms the continuing optical density signals into the electronic potentials used to control the optical density of each individual lens. Other embodiments may replace RF communications with other communications means, including but not limited to infrared, or audio sound.

Two lenses are fixed in the frames—a right lens (from the viewer's vantage point) 105 and a left lens 106. In the preferred embodiment, each lens is made of an electrochromic material for which the optical density can be reliably and precisely controlled by the application of an electronic potential across the material. The lens has circuitry so that the control unit 103 can independently control the transmissivity of each lens. Other embodiment may use electrical optical materials other than electrochromics. The operation of the Continuous Adjustable 3Deeps Filter Spectacles is further described in more detail in FIG. 14 and FIG. 18.

For exemplary purposes, FIG. 1 shows the Continuous Adjustable 3Deeps Filter Spectacles in just one of the three states that the lenses can take. FIG. 1 shows the right lens 105 darkened and the left lens 106 as clear with the clear lens allowing more light transmission than the darkened lens. This is the configuration to view a motion picture with a 3-dimensional effect in which the lateral motion in the motion picture is moving from left-to-right on the viewing screen. Other embodiments of the invention may have Continuous Adjustable 3Deeps Filter Spectacles that fit over regular prescription glasses in a manner similar to that in which snap-on or clip-on sunglasses are configured. In still another embodiment the lenses of the Continuous Adjustable 3Deeps Filter Spectacles may also be 'prescription lenses' customized for the viewer vision impairments.

Also, while the preferred embodiment of the invention uses Continuous Adjustable 3Deeps Filter Spectacles that are wireless, other embodiments may use wired connections. What is required is that the Continuous Adjustable 3Deeps Filter Spectacles can receive and respond to synchronization signals from the controller, and whether that is by wired or wireless means is immaterial to the invention.

Earlier versions of 3Deeps Filter Spectacles (also called Pulfrich Filter Spectacles) have been previously described in co-pending patent applications and U.S. patent application Ser. No. 11/928,152, U.S. patent application Ser. No. 11/372,723, U.S. patent application Ser. No. 11/372,702, and U.S. Pat. Nos. 7,030,902 and 7,218.339.

There are 3 lens settings used by the Continuous Adjustable 3Deeps Filter Spectacles. One setting is that both the right 105 and left lens 106 are clear. Neither lens is darkened. This is the lens state that is used in the preferred embodiment when there is no significant lateral motion in the motion picture. The second setting is the left lens 106 clear and the right lens 105 darkened. This is the lens state that is used in the preferred embodiment when foreground lateral motion in the motion picture is moving from the left to the right direction, as seen from the viewer's perspective. The third setting is the left lens 106 darkened and the right lens 105 clear. This is the lens state that is used in the preferred embodiment when the foreground lateral motion in the motion picture is moving from the right to the left direction, as seen from the viewer's perspective. The lens state consisting of both left and the right lens darkened is not used. This lens state can be achieved by the Continuous Adjustable 3Deeps Filter Spectacles, and may have uses in other embodiments of the invention.

In Continuous Adjustable 3Deeps Filter Spectacles, the right and left lenses of the viewing glasses may take a multiplicity of different levels of darkness to achieve different effects, resulting in many different lens states. In particular, the darkening of the non-clear lens can be optimized according to the speed of lateral motion and/or luminance, so as to optimize the degree of 3-dimensional effect (the first optimization). Also, the Control Unit 103 can control the electrochromic lenses so that they reach their target state in an optimal manner (the second optimization).

Various control units may be utilized with the Continuous Adjustable 3Deeps Filter Spectacles that can both display the audio/video of the associated motion picture, as well as perform the Continuous Adjustable 3Deeps Filter Spectacles synchronization to identify 3Deeps synchronization events and issue control signals to the Continuous Adjustable 3Deeps Filter Spectacles. This includes, but is not limited to; DVD-based control units; Digital Movie Projector control units; Television-based control units, hand-held and operated control units; spectacle-based control units, and cell-phone based control units.

Calculating the Optical Optimal Density of Continuous Adjustable 3Deeps Filter Spectacles FIG. 2 shows a typical retinal reaction time curve 200. While each eye is stimulated by light continuously, there is a time delay till the information is triggered and transmitted to the brain. This time delay occurs when we view fix-eyed (as during movie viewing), and is called the "Retinal Reaction Time". The retinal reaction time is dependent on the amount of light (brightness) that falls on the eye. Luminance is measured in log [candela per square meter ($dc/m^2$)] as has been presented in FIG. 2 on the abscissa scale 201. (In studies of perception and psychophysics luminance is often measured in Trolands which is a unit of conventional retinal illuminance, but corrects the measurements of luminance values impinging on the human eye by scaling them by the effective pupil size.)

To aid the reader, we have included a second abscissa scale 202 in FIG. 2 that translates Luminance into commonly understood terms. For instance a luminance reading of '0' approximates the amount of ambient light from a 'clear sky' 213. Other commonly understood values are also presented including a luminance reading of '−2' that approximates the amount of ambient light from a 'night sky with a full moon' 204.

The ordinate scale 203 of the retinal reaction time curve shows in milliseconds the amount of time till the corresponding amount of light triggers and sends the information to the brain. For instance in a 'clear sky' 213 having a luminance measure of '0', the eye will trigger about every 200 msec and send the image to the brain. A 'night sky with a full moon' 204 has a luminance measure of '−2' and the eye will trigger about every 325 msec and send the image to the brain.

While the retinal reaction mechanisms are independent for each eye, when both eyes are unobstructed the luminance value is the same and they trigger at about the same time. However, if one eye is shaded so the eyes have unequal retinal illuminance, then the two eyes will trigger at different speeds and different times. The terminology we use is 'instant image' for the image sent to the brain by an unshaded eye, and 'lagging image' for that image sent to the brain by the shaded eye. Using filters with different optical density shading results in a difference in retinal reaction time. The difference in retinal reaction time between the two eyes is one factor in the commonly accepted explanation for the Pulfrich illusion.

The second factor is simultaneity. The brain will take the two eye images and put them together in a 'simultaneous' fashion to generate the image that we perceive. Thus in normal viewing, if both eyes see the same image without any filtered obstruction, the brain gets two approximately identical 'instant images'. These images only differ by the inter-ocular distance between the eyes (about 2½ inches), and the mind puts these two simultaneous images together to perceive depth. However, if one eye is shaded than the mind will perceive one 'instant image' and one 'lagging image' and put those together simultaneously to perceive depth. These two factors, retinal reaction time, and simultaneity are the two factors that explain Pulfrich illusion.

If the scene being viewed is static with no moving object, then the 'instant' image of the unshaded eye and the 'lagging image' of the shaded eye will still see the same image and the retinal reaction delay and simultaneity factors will not provide any depth information. Thus, the Pulfrich illusion cannot work in the absence of motion. But if the scene being viewed has horizontal motion (also called lateral motion) then the shaded eye will see an image that is 'lagging' the instant image. In this case the 'lagging image' caused by retinal reaction delay of the shaded eye, when juxtaposed with the 'instant image' perceived by the unshaded eye will, through the mechanism of simultaneity, be reconciled by the brain as a perception of depth. This is the Pulfrich illusion. This will be diagrammatically explained in FIG. 3.

Note from the typical retinal reaction time curve 210 the potential of the Pulfrich illusion. Retinal reaction time from the illumination of light from a clear sky at noon ($\frac{1}{10}^{th}$ of a second) is approximately half as long as retinal reaction time from a clear sky ($\frac{1}{5}^{th}$ of a second)! On a TV with a 100 Hz refresh rate that is 10 frames! The instant invention uses the retinal reaction time curve to select the optical density of the neutral shaded lens to optimize the Pulfrich illusion.

The retinal reaction time curve 210 in FIG. 2 is a typical curve provided for teaching purposes and may be further refined in the future. The effect of luminance on retinal reaction time has been extensively studied as in "Simple Reaction Time As A Function Of Luminance", Alfred Lit, et al, in Perception & Psychophysics, 1971, Vol 10(6), p 397. The relationship will differ from person-to-person, and also exhibit variability within the same person as they age, or even exhibit intra-day variation due to factors such as eyestrain, etc. The retinal reaction time curve 210 exhibits a reciprocal relationship with retinal illuminance, and also has a discontinuity at a retinal illumination of about '−1' the threshold at which the cone sensors of the eye turn off and only rod sensors (that do not see color) are operational. For the teaching purposes of this disclosure however, the 'smooth' retinal reaction time curve 210 of FIG. 2 will be used.

FIG. 2 shows the general relationship 210 between reaction time (in milliseconds) as a function of luminance. For either eye, the magnitude of the visual latent period is a reciprocal function of the prevailing level of retinal illumination. The figure shows a slow retinal reaction time at low luminance, with retinal reaction time progressively increasing as luminance levels increase. The relationship shown by this figure is used in various embodiments to calculate the optical density of the neutral filter. In the preferred embodiment, this relationship will be used to approximate normal stereoscopic vision by calculating the optical density of the neutral filter to using an average inter-ocular separation between the eyes (about 2½ inches).

FIG. 3A-FIG. 3C show in more detail the geometry 300 of how the Pulfrich illusion works. The geometry of the Pulfrich illusion has been well described as for instance in "The Magnitude Of The Pulfrich Stereo-Phenomenon As A Function Of Target Velocity", Alfred Lit, Journal of Experimental Psychology, Vol. 59, No 3, 1960. Placing a neutral density filter 312 over one eye and allowing the other eye to view the motion picture unobstructed actuates the Pulfrich illusion. We again note that with the Pulfrich illusion both eyes view the same single image on a screen 310. The difference in retinal reaction time allows the eyes to view a single image, but the mind is fooled into thinking it is seeing two different images (the lagged and instant images) when lateral motion is present. Simultaneity allows the mind to put the two images together to get a depth-perceived eye-target image with depth perception.

We stress that the Pulfrich illusion will not work if separate right-eye and left-eye images are presented to the viewer, as is the case with other dual image 3D viewing systems. 3Deeps is incompatible with any dual image 3D system.

FIG. 3A shows the geometry of a viewer wearing 3Deeps Filter Spectacle 101 in which the left eye 302 has a shaded filter 312 and the right eye 304 is unobstructed. At the top of the figure is a schematic showing the spectacles 101 with the left lens shaded 106 and the right lens clear 105. In this figure there is no lateral motion in the motion picture. The right eye 304 focuses on an object in the motion picture that we call the instant image 330 in a 2D plane on the screen 310. Even thought the left eye 302 views through a shaded filter lens 312 causing a retinal delay, because there is no motion, the left eye 302 sees a lagging image 320 that is coincident with the instant image 330, and the brain simultaneously interprets them as the eye target 355 in a 2D plane on the screen. In this case no illusion of depth is provided by the Pulfrich illusion.

FIG. 3B shows the geometry of a viewer wearing Continuous Adjustable 3Deeps Filter Spectacle 101 in which the left eye 302 has a shaded filter 312, and the right eye 304 is unobstructed. At the top of the figure is a schematic showing the spectacles 101 with the left lens shaded 106 and the right lens 105 clear. In this figure the direction of lateral motion on the screen is from right-to-left. The right eye 304 focuses on an object in the motion picture that we call the instant image 330 in a 2D plane on the screen 310. Because the left eye 302 views through a shaded lens 312, the retinal delay causes the left eye 302 to see the image lagging behind the instant image 330 also called the lagging image 320. The brain receives the instant image 330 and the lagging image 320 and places them together as an eye target 355 with an illusion of depth in front of the 2D plane of the screen 310.

In FIG. 3B the distance 'dScreen' 380 measures the distance between the viewer and the screen, and the distance 'd' 385 measures the perceived distance of the eye target 355 away from the screen 310. The distances 'd' 385 and 'dScreen' 380 can be used to provide a measure of the degree of the depth illusion. One measure of the 3D depth effect is 'd/dScreen' as a percentage. For example if 'd' 385 is ½ foot, and 'dScreen' 380 is 10 feet, then 'd/dScreen' is '1/20' and the degree of depth perception is '5%'.

With this configuration, if another object in the movie has a frame-to-frame lateral motion from right-to-left that is faster than the instant image than it will lag the instant image even more and appear to the viewer even closer than the eye image. If another object in the movie has a frame-to-frame lateral motion from right-to-left that is slower than the instant image than it will lag the instant image less and appear to the viewer further away than the eye image. This is in complete agreement with how the mind interprets motion parallax as a cue for depth perception.

FIG. 3C shows the geometry of a viewer wearing Continuous Adjustable 3Deeps Filter Spectacle 101 in which the left eye 302 has a shaded filter 312, and the right eye 304 is unobstructed. At the top of the figure is a schematic showing the spectacle with the left lens 106 shaded and the right lens 105 clear. The only difference between FIG. 3C and FIG. 3B is that in this figure the direction of lateral motion on the screen is from left-to-right. The right eye still focuses on an object in the motion picture that we call the instant image 330 in a 2D plane on the screen 310 in the same place as in FIG. 3B. Because the left eye 302 is shaded, the retinal delay causes the left eye 302 to see the image lagging 320 behind the instant image 330. The brain receives the instant image 330 and the lagging image 320 and places them together as an eye target 355 appearing in 3D behind the 2D plane of the screen 310. The distance 'dScreen' 380 measures the distance between the viewer and the screen and is shown as the same distance as in FIG. 3B. The distance 'd' 390 is a negative number since it is behind the screen, and d/dScreen measures the degree of the depth illusion.

The geometry for a viewer wearing Continuous Adjustable 3Deeps Filter Spectacles in which the right eye has a shaded filter and the left eye has a clear filter is similar. If in FIG. 3B the filter had been shown filtering the right eye rather than the left eye, then the right eye would see a lagging image so that the eye image would appear behind the 2D plane of the screen. If in FIG. 3C the filter had been shown filtering the right eye rather than the left eye, then the right eye would see a lagging image so that the eye image would appear in front of the 2D plane of the screen.

FIG. 4 400 uses the typical curve 210 of retinal reaction time 203 as a function of luminosity 201 to explain the working of Cardboard Pulfrich Spectacles 490 with fixed lenses. The standard cardboard Pulfrich spectacle 490 comes with a clear lens (usually the left eye) and a neutral density lens of fixed optical density (usually covering the right eye). There is no provision to change the lens. The optical densities of the clear and neutral lens filters 490 are fixed and the only variable is the retinal luminance. Different luminance will occur for instance depending upon the lighting of the viewing venue. One immediate problem is that because the 'gray' filter lens is fixed in the frames and cannot be changed, all motion must be in a single direction—usually from left-to-right. To address this problem, movies viewed through cardboard Pulfrich filters 490 have been limited to scenes that have either no motion or motion in only a single direction. This problem can be termed the 'direction of motion constraint'.

A second problem is that for a given speed of lateral motion, as the luminosity changes, the amount of depth perception will change. This problem is demonstrated by looking at the retinal reaction curve 210 in FIG. 4. It shows the difference in retinal reaction time $\Delta_1$ 415 and $\Delta_2$ 425 between the two eyes for two different values of ambient light (unaided eye). With bright ambient light the cardboard Pulfrich spectacles 490 indicated on the figure by bracket 410 produce a difference in retinal delay of $\Delta_1$ 415. Luminance of the clear lens intersects 430 the retinal reaction curve 210 and the luminance through the neutral density filter intersects 433 the retinal reaction curve 210 to yield a difference 415 in retinal reaction time of $\Delta_1$. Similarly if the luminance is darker then the difference 425 in retinal reaction time is a value $\Delta_2$. Darker ambient light indicated on the figure by bracket 420 produces a difference in retinal delay of $\Delta_2$ 425 that is significantly greater than $\Delta_1$. This is a function of the relationship between luminance 201 and retinal reaction time 203. Increasing luminance results in an increase in the visual latency period. Note that with bright ambient light, the difference ($\Delta_1$) 415 in retinal reaction time is smaller than the difference ($\Delta_2$) 425 in retinal reaction time, so the depth illusion is greater in a darker room rather than a lighter room.

A related problem is that as speed of lateral motion changes but for a fixed luminosity, the amount of depth perception will also change. This is unnatural and another problem with cardboard Pulfrich spectacles 490. A scene should maintain the same amount of depth perception independent of the speed of objects in the scene. To address these problems, movies produced for viewing through cardboard Pulfrich filter 490 may try to maintain a constant luminosity and speed of motion. That is these problems severely constrain the content of the movie. This can be referred to as 'oscillating visualization of depth'.

Also, since cardboard Pulfrich Spectacles 490 only has one neutral density filter it is usually very dark resulting in more loss of light than is necessary to actuate the proper 3D depth illusion. This problem can be referred to as 'over-darkening'.

Another problem is that the depth perception will change depending on the lighting of the venue in which the motion picture is shown. In darkened theaters, the perception of depth will be larger than when viewing the movie in a brightly lit home environment, since the difference in retinal delay is greater in a darkened environment than a well-lit environment. This may mean the 3D depth illusion will be attenuated in a dark movie theater and muted in a well-lit home theater. The implication is that the same movie, viewed through cardboard Pulfrich spectacles 490, will view 3D depth differently depending on the lighting of the venue. This problem can be referred to as a 'venue-dependency'.

One way to illustrate the problem with cardboard Pulfrich spectacles 490 with a fixed neutral density filter is that as luminance changes the degree of depth perception is also constantly changing and will only rarely and per chance be at the level of normal stereoscopic vision. Note that in FIG. 4 the horizontal lines that give the readings on the retinal reaction time scale all have their arrows pointing towards the scale which is due to the fact that with cardboard Pulfrich spectacles 490 there is no control over the retinal reaction rime for either eye, and no control for the difference in retinal reaction time between the eyes.

FIG. 5 and FIG. 6 use the retinal reaction time curve 210 to show how to calculate an optical density for the controllable neutral density filter that optimizes the Pulfrich illusion. The approach that is described solves the problems with the cardboard Pulfrich spectacles 490, including the 'direction of motion constraint' 'oscillating visualization of depth', 'over-darkening', and 'venue-dependency' problems. In this preferred embodiment of the invention, the Continuous Adjusting 3Deeps Filter Spectacles are controlled to provide a neutral density filter that has an optical density so that the distance between the lagged image that is seen by the eye obstructed by the neutral filter, and the image seen by the unobstructed image, is 2½ inches. This distance, 2½ inches, is the average distance between a viewer's eyes—also called the inter-ocular distance. That is, the optical density of the neutral filter is chosen dependent on (1) speed of motion on the screen, (2) the luminance reaching the unobstructed eye, and (3) so that the delayed image from the filtered eye appears 2½ inches behind image from the unfiltered eye.

Consider the following—normal stereoscopic vision is obtained by viewing a 3-dimensional world from the vantage point of a left and right eye that are about 2½ inches apart (the average inter-ocular distance). Each eye sees the same image but from the slightly different vantage of eyes that are separated by approximately 2½ inches. To get an optimal 3Deeps stereoscopic depth illusion we turn this around. When viewing a motion picture on a TV or in a movie theater each eye is viewing the exact same image in a 2-dimensional plane of the screen. An optimal Pulfrich illusion will occur via the Pulfrich illusion when the difference in retinal reaction time results in instant and lagging images that appear 2½ inches apart.

This number, 2½ inches, is also the 'magic number' used in other 3D viewing systems. Cameras for recording dual-image 3D systems that are viewed using anaglyph spectacles, shutter-glasses, IMAX, or Polaroid spectacles use cameras with lenses that are lashed together to have a separation of 2½ inches between the lenses that record same scene 'right-eye' and 'left-eye' images.

Geometrically, in normal stereoscopic vision the eyes, separated by the inter-ocular distance, triangulate on an object. In the preferred embodiment of the invention each eye sees instant and lagging images separated by the inter-ocular distance and the mind triangulates to get a stereoscopic eye image. In the two cases we have the same triangulation and geometry so the 3Deeps visualization is what the mind expects to see. The calculations for this preferred embodiment are shown in FIG. 5. This provides depth perception that is entirely natural.

FIG. 5 500 uses the typical curve 210 of retinal reaction time 203 as a function of luminosity 201 to demonstrate how to compute from a motion vector and luminosity the optimal optical density for the neutral density lens of the preferred embodiment of the Continuous Adjustable 3Deeps Filter Spectacles so that the difference in retinal reaction time between the viewer's eyes results in instant and lagging images correspond to a separation on the display monitor of exactly 2½ inches. The figure describes an algorithm $f_{PrefEmb}$(Luminance, LatScrMotion) that has luminance and a motion vector as input (negative value for right-to-left lateral motion and a positive value for left-to-right lateral motion. The algorithm $f_{PrefEmb}$(Luminance, LatScrMotion) is described in more detail in FIG. 6.

First we measure the ambient luminance or brightness 510. This is the first input parameter. Luminance represents the amount of light that the unaided eye will see through the clear lens. Using the retinal reaction time curve 210 we can establish the retinal reaction time delay. In our example we have an input luminance measure 510 of 0.52 cd/m2, that from the retinal reaction time curve 210 corresponds 511 to a retinal reaction time delay 512 of 120 msec. The second input parameter is the speed of lateral motion. For this example we assume a left-to-right lateral screen motion of 100 dots (pixels) per frame. That is the major object on the screen (for example a speeding car) is traveling across the screen from frame to frame at the speed of 100 dots per frame. We assume the motion picture is being viewed on a quality monitor with a pixel resolution of 100 dots per inch. This computes to taking 2½ frames to move 2½ inches across the screen. If the TV has a refresh rate of 60 Hz (60 frames per second) then it will take 2.5/60=1/24 or approximately 42 msec for the screen object to traverse 2½ inches on the screen. That is, we want the retinal reaction time difference 518 between the two eyes to be 42 milliseconds. Adding the 42 msec to 120 msec computes to 162 msec retinal reaction time 513 to affect a 42 millisecond retinal reaction time difference 518 between the two eyes. Now going back to the intercept 514 on the retinal reaction curve 210 we see that we need to choose an optical density for the neutral density lens that will give us a luminance reading 515 of about −0.6 on the luminance scale. If the direction of the lateral motion is from left-to-right, the right lens will take this optical density and the right lens will be clear.

The algorithm $f_{PrefEmb}$(Luminance, LatScrMotion) provides the computation of the optical density of the neutral density lens $f_{PrefEmb}$(Luminance, LatScrMotion) and more detail is provided in FIG. 6. This is then the method by which we can compute the optical density of the neutral density lens that is optimal in that the 3D depth perception as viewed through the 3Deeps Filter Spectacles will be exactly the same as for normal human stereoscopic vision.

FIG. 6 provides some more detail of the steps of the algorithm 600 but in tabular form. In Step 1 610 the direction and speed of motion is calculated. The search for a moving object is limited to an upper bounded region 611 and a lower bounded region 612 of the movie. The upper bounded region 611 is a surrogate for the image background and the lower bounded region 612 a surrogate for the image foreground. The single most prominent moving object 615 in the background 611, and the single most prominent object 616 in the foreground 612 surrogate regions are tracked between frames of the motion picture and the horizontal component of the motion is calculated as direction (right- to left or left-to-right) and speed (in units of pixels per inch or dots per inch). A negative horizontal speed motion represents motion from right-to-left, and a positive horizontal speed motion represents motion from left-to-right. A reading of '0' for speed of motion means that there is no discernable foreground of background object in motion.

The method presented in Step 1 610 to find the measure the motion in the frame of the moving picture is only exemplary and is over-simplified to teach the principle. Any algorithm that allows us to quantify the direction and speed of lateral motion in a motion picture frame can be used. The video industry has expended considerable resources on R&D to develop image processing algorithms used for video format conversion to track motion of objects between frames of a motion picture, and Step 1 would derive benefit from use of that body of research. Many of the video format conversion chips used in digital TVs, up-converters, and digital projectors track numerous moving objects from frame-to-frame to perform the best possible format conversion of object in motion. In alternate embodiments it would be beneficial to use a subset pr the entire set of motion vectors to calculate a single speed and direction of motion that characterizes motion in the moving picture.

In Step 2 620, the background horizontal vector LatScrMotion$_{Top}$ 615 is subtracted from the foreground horizontal vector LatScrMotion$_{Bot}$ 616 to get an overall measure (LatScrMotion) of the instantaneous motion associated with the frame of the motion picture, and the value is stored.

In step 3 630 the Luminance value is calculated and stored. In this teaching example the Luminance is estimated as the average brightness of all Pixels in the frame. Other embodiments may use other means to quantify luminance. In step 4 640 the two input value, speed of lateral motion (LatScrMotion) and Luminance are used as input value in the algorithm described in FIG. 5 to get the value of the optical density for the neutral density lens—i.e. the value of $f_{PrefEmb}$(Luminance, LatScrMotion) from FIG. 5. A decision procedure 650 is then used to get the optical density for each of the 3Deeps spectacle lenses. If the lateral screen motion (LatScrMotion) is zero (dpi) or near-zero (−10 dpi<LatScrMotion<10 dpi) then both lenses will be set to the ClearState optical density value (OD). If the lateral screen motion in a direction from right-to-left then set the left lens to the calculated value $f_{PrefEmb}$(Luminance, LatScrMotion) 640 and the right lens to clear. If the lateral screen motion is in a direction from left-to-right then set the right lens to the calculated value $f_{PrefEmb}$ (Luminance, LatScrMotion) 640 and the left lens to clear.

This overcomes the problems with cardboard Pulfrich lenses 490. Firstly, the 3Deeps Filter Spectacle lenses always take the correct state consonant with the direction of motion on the screen. Secondly, rather than the depth perception fluctuating as with cardboard Pulfrich filter 490, the optical density of the neutral density lens fluctuates to provide the constant degree of depth perception that the mind expects from its everyday vision of reality. Third, the 3Deeps Filter Spectacle lenses do not over-darken but always take an optical value since they can conform to speed of motion and luminance. And finally, since luminance is accounted for, the motion picture will view the same regardless of whether viewed in a darkened movie theater, or a well-lit home theater environ.

Some Additional Background

Before describing alternate means to select the optical density for a filter to produce the Pulfrich illusion, it is useful to consider further how to determine the parameters that are used to calculate an optimal optical density for the neutral lens of the Pulfrich Filter Spectacles. The two parameters are (a) a motion vector that describes the speed and direction of lateral motion in the motion picture, and (b) luminance or brightness of the motion picture.

Motion Measures in a Motion Picture

In order to address de-interlacing and up-conversion format problems with motion picture recording, broadcast and display, various algorithms have been developed to determine the direction and speed of motion in a motion picture, and many of these algorithms have been implemented in software and hardware devices.

Consider an input signal to a TV which is 30 frames per second (for example as from analog TV) but that is being output and shown on a high-end digital LCD TV running at 120 frames per second. Showing a TV input signal of 30 fps at an output of 120 fps is an example of format conversion that is done by many different format conversion apparatus. One simple way to do this format conversion is for the chip to simply add 3 exact copies of each frame to the output stream. That works if there is no motion, but if a screen object exhibits any motion between frames then the 3 new frames have the moving object in the wrong place. The better and more expensive the digital TV, the worse this problem appears to the viewer. So the better format-conversion chips perform complex frame-to-frame image processing and track speed and direction of motion and then use that information to better construct the 3 new frames. But estimating speed and direction of motion between frames (which these devices already do) is also sufficient information to calculate the timing and optimal optical density for the neutral (shaded) density lens of the 3Deeps (which the devices do not do).

This is an oversimplified example of video format conversion, but that is useful for teaching purposes. State-of-the art format-conversion chips may also have functions to do some or all of the following—adaptive motion de-interlacing, edge smoothing, intelligent image scaling, black level extension, digital noise reduction, auto flesh-tone correction, as well as other complex image processing functions.

Many companies have already developed the image processing algorithms and implemented them in Integrated Chip circuitry. Philips described their Semiconductor MELZONIC chip in the following way—"After exhaustive investigation and computer simulation, researchers at Philips developed a totally new technique for motion estimation which they have called '3-D Recursive Search Block-Matching'. By analyzing two successive TV fields to locate blocks of pixels in the second field that match blocks in the first, 3-D Recursive Search Block-Matching is able to assign a velocity vector to each block of pixels in the first field. These velocity vectors can then be used to interpolate the correct spatial position of each pixel block in a new field that is positioned temporally between the two original fields—i.e. to create new movement phases."

In U.S. Pat. No. 5,717,415 "Display System With 2D/3D Image Conversion Where Left And Right Eye Images Have A Delay And Luminance Based Upon A Horizontal Component Of A Motion Vector", Iue describes 'Motion Vector Detecting" by analysis of successive frames of a motion picture. The motion vectors are used to develop separate left-eye and right-eye images so that 2D movies may be viewed as 3D movies. There is no disclosure nor suggestion that the motion vectors be used in a single-image system with controllable Pulfrich spectacles.

In essence, digital TV and digital Cinema rely upon various implementation of video format conversion, and make extensive use of motion adaptive algorithms implemented as hardware and software to detect and quantify motion between frames. They use such information to enhance the quality of the video output signal. All such hardware and software implementation that detect and quantify a motion vector can be used advantageously for Continuous Adjustable 3Deeps Filter Spectacles.

Luminance Measures in a Motion Picture

By luminance we mean brightness. However since the motion picture is viewed through 3Deeps spectacles, luminance of the screen picture may be calculated in many different ways. We could use the screen luminance of the motion picture, the ambient light of the room, or a measure of light arriving at the eye of the viewer.

For standard analog TV signals, every raster point on the TV screen has an attached luminance value as part of the TV signal. Screen luminance may be calculated as an average of all screen luminance values. Other means may be used to calculate a luminance measure of each screen frame for analog TVs. Similarly, different means may be used to calculate an overall luminance measure for digital TVs.

While luminance of the picture is one factor in setting the optical density of the neutral lens of the Pulfrich Filter Spectacles, ambient light of the room or theater in which the motion picture is viewed need also be considered. Many TVs already have built in luminance control. The Philips Electronics Ambilight technology used in their flat-panels is an RGB backlight that changes color based on the on-screen image. A filter is used to calculate the average color on the top, left and right border of the screen that is then sent to a micro controller that controls three separate banks of red, green and blue cold-cathodes.

Also, some TVs will sense ambient light and can use that information to adjust the brightness of the picture. In a bright room they will show a brighter picture while when they sense a darkened room they can present a more subdued picture. This is done in part to extend the life of the LCD and plasma screens that are used in digital TVs and projectors.

Recalling that the primary mechanism by which the Pulfrich illusion works is the difference in retinal reaction time triggered by a neutral lens covering one eye, the retinal illuminance is a more important factor than screen luminance in developing depth perspective via 3Deeps Filter Spectacles.

In FIG. 9 described later, we use a photodiode located on the Continuous Adjusting 3Deeps Filter Spectacles as a surrogate measure for retinal luminance. Each of the algorithmic embodiments shown in FIG. 5, FIG. 8, and FIG. 10 could preferably use luminance measures of the display venue or retinal illuminance rather than the luminance of the motion picture in their calculations. If we were using the algorithm of the preferred embodiment, speed and direction of motion would need to be transmitted to the 3Deeps Filter Spectacles that would then use luminance and the motion vector with the algorithm of the preferred embodiment to calculate and set the optical value of the neutral density lens of the 3Deeps Filter Spectacles.

FIG. 7 is an illustration of an alternate algorithm 700 that can be used to characterize lateral motion in a motion picture. It estimates 4 motion vectors—an upper-right (UR) 732 and upper-left (UL) 731 motion vectors to estimate background lateral motion, and a lower-right (LR) 733 and lower-left (LL) 734 motion vectors to estimate foreground lateral motion. Each vector is estimated from its non-overlapping regions in the frame of the movie. In this sample algorithm the most prominent motion vector in the Upper Right 722, Upper Left 721, Lower Right 724, and Lower Left 723 regions are identified. Each of these 4 vectors can take any of 3 value; it may be moving either right-to-left (negative lateral speed motion 742) or moving left-to-right (positive lateral speed motion 743), or if there is no motion the lateral component of the vector has a value of '0' 745. That is there are 81 ($3^4$) possible combinations. Each of the 81 combinations might have separate and distinct computation in this alternate algorithm.

One of the 81 possible combinations has the UR 732, UL 731, LR 733 and LL 734 each having a value of '0'. This is what would be expected when there is no motion on the screen as for instance during a close-up on a single character speaking. This case would be result in both lenses of the 3Deeps Filter Spectacles taking the same or clear state (ClearStateOD).

Another of the 81 possible combinations would have both the UR 732 and LR 733 vector showing right-to-left motion (negative values), and both the UL 731 and LL 734 showing left-to-right motion (positive values). This is what would be expected when the camera is receding and expanding a scene and the primary component of motion comes from the action of the camera panning. (This is exactly the scenario in the famous railroad yard scene from "Gone with the Wind", in which Scarlett O'Hara played by Vivien Leigh walks across the screen from the right as the camera slowly pulls back to show the uncountable wounded and dying confederate soldiers.) In this case the alternate algorithm would calculate the value UL+LL+UR+LR as the LatScrMotion 620. If this value were negative then the algorithm 650 would set the right lens to the ClearStateOD and the left lens to a darkened state in accordance with the value $f_{PrefEmb}$(Luminance, LatScrMotion) 640. If this value were positive then the algorithm 650 would set the left lens to the ClearStateOD and the right lens to a darkened state in accordance with this value $f_{PrefEmb}$(Luminance, LatScrMotion) 640.

Each of the other 79 cases would similarly have appropriate calculations.

Each of the 2 algorithms presented for teaching use the notion of selecting 'the most prominent motion vector in a region'. In these algorithms we define that as the longest edge in the search region that is exhibiting motion. Other definitions may be used. For instance, within a scene the algorithm may use this definition to first identify a prominent edge. The identified edge may then persist throughout other frames as long as it continues to appear in subsequent frames, even if that edge is no longer the longest edge in the region. Other algorithm may continue to track this edge through subsequent frames, even were it to move out of the search region.

While two algorithms have been used to characterize lateral motion in a motion picture from a set of motion vectors, other algorithms may be advantageously employed. Motion pictures are filmed so that the major action takes place in the center of the screen. Other algorithms to characterize lateral motion in a motion picture from a set of motion vectors may then search for the major vector of motion in the center of the screen and use motion vectors from the top of the screen (a surrogate for background) and motion vectors from the bottom of the screen (a surrogate for foreground) to estimate parallax in the frame of the motion picture. The major vector of motion and estimate of parallax can then be used to determine the optimal optical density of the neutral density filter. In another approach, an algorithm to characterize lateral motion in a motion picture would focus on the regions of the movie that are well lit. Cinematographers compose film, using light to focus attention and highlight the most important action in the scene. This may be useful in delimiting the portion of the frame of the motion picture to which an algorithm to characterize lateral motion in a motion picture frame is restricted. It should be appreciated that from the large number of motion vectors between frames of a motion picture, there are many different algorithms that can be advantageously used to quantify a motion vector that characterizes motion in a frame of a motion picture that is used to determine the optimal optical density of the neutral density filter.

A First Alternate Embodiment

Motion pictures are often viewed on small, personal devices such as an Apple iPod. Such devices have small screens and are held within arms reach for viewing. For such devices the preferred embodiment that optimizes the Optical Density of the neutral density lens to an average inter-ocular distance may be inappropriate. We provide other alternate embodiments, either of which is appropriate for small viewing devices, as well as for TV or movie theater viewing.

FIG. 8 shows the use of the retinal reaction time curve 210 for a first alternate embodiment algorithm 800 to calculate the optical density of the neutral density lens. The x-axis 201 shows luminance, and the y-axis 203 shows retinal reaction time. Observe that the amount of light produced by a motion picture is constantly changing. Some night scenes in a movie produce low light, and other scenes such on the open seas at noon are much brighter. In this first alternate embodiment, rather choose an optical density for the neutral filter so that there is a separation of 2, inches between the instant and delayed image to the eye (as in the preferred embodiment), we may choose to fix the difference (A) 820 between retinal reaction time of the eyes. Then as retinal illumination to the unfiltered eye changes, the optical density of the neutral filter is chosen to produce a constant difference in reaction time between the right and left eyes. It will be seen that this has some advantages.

In this example, assume as in FIG. 5 that the luminance 810 is 0.54. As demonstrated in FIG. 5 that relates 811 to a retinal reaction time 812 for the unaided eye of 120 msec. For this example choose a fixed difference Δ 820 between the retinal reaction time of the two eyes of 100 msec, which computes to a retinal reaction time 813 for the filtered eye of 220 msec (120+100). Then going back to the intercept 814 on the retinal reaction time curve 210, we need to pick an optical density for the neutral density filter so the luminance 815 to the eye is −1.3.

Similarly as the measured value of luminance changes, this algorithm can be used with new values of luminance to calculate a changing optical density for the neutral density filter. This algorithm only uses an estimate of retinal luminance as input. One benefit of this algorithm is that it only requires the luminance and direction of motion, but not the speed of lateral motion. Thus it is much less computationally intensive, but will provide Continuous Adjustable 3Deeps spectacles that take states conforming to the direction of motion and conforms to the value of luminance. It also affords a means by which the calculation of optical density for the neutral density filter can be implemented on the Continuous Adjustable 3Deeps Filter Spectacles, since luminance can be sensed by the spectacles. This may lessen the computational requirement for the Phenomenoscope described in co-pending patent application Ser. No. 11/372,723.

FIG. 9 900 shows 3Deeps Filter Spectacles 910 that include a photodiode 920 on the frame of the Continuous Adjustable 3Deeps Filter Spectacles. A photodiode 920 is a type of photodetector capable of converting light into either current or voltage, depending upon the mode of operation. The output of the photodiode 920 provides a measure of the amount of light arriving at the frame of the Continuous Adjustable 3Deeps Filter Spectacles 910, and is a good surrogate measure of retinal illuminance. This surrogate luminosity measure is input to a Lens Control Unit 103, also on the spectacles, and used with the algorithm described in the first alternate embodiment to calculate the optical density of the neutral density filter. In this example the direction of motion must still be determined and depending upon the direction of motion the Right Len 105 and the Left Lens 106 will take an optical density of either the ClearStateOD or the calculated neutral density optical density. If this value is determined by a control device external to the Continuous Adjustable 3Deeps Filter Spectacles then such information must be communicated to the Continuous Adjustable 3Deeps Filter Spectacles according to one of the various methods as described in co-pending patents and patent applications. If the Continuous Adjustable 3Deeps Filter Spectacles are the Phenomenoscope described in co-pending patent application Ser. No. 11/372,723, then the Continuous Adjustable 3Deeps Filter Spectacles themselves can determine if inter-frame motion is present, and if so in which direction.

A Second Alternate Embodiment

FIG. 10 uses the typical curve 210 of retinal reaction time 203 as a function of Luminance 201 to demonstrate a second alternate embodiment 1000 for computing an optimal optical densities for the neutral density lens of the Continuous Alternating 3Deeps Filter Spectacles so that the difference (Δ) 1018 in retinal reaction time between the viewer's eyes corresponds to a fixed number of frames of the motion picture.

In this second alternate embodiment, rather choose an optical density for the neutral filter so that there is a separation of the average inter-ocular distance (2½ inches) between the instant and delayed image to the eye (as in the preferred embodiment), we may choose to have a difference (Δ) 1018 between retinal reaction time chosen so that the instant and lagging image are a fixed number of movie frames. It will be seen that this has some advantages.

In this example, assume as in FIG. 5 that the luminance 1010 is 0.54. This is at a point 1011 on the retinal reaction time curve 210 of (0.54, 0.120). As demonstrated in FIG. 5 that relates to a retinal reaction time 1012 for the unaided eye of 120 msec. Assuming for this example a screen refresh rate of 60 Hz, a delay of 10 frames can be achieved by having a difference in retinal reaction time 1018 of 166 msec. (That is $^{10}/_{60}=\frac{1}{6}$ second=166 msec). From a base of 120 msec that is 120+166=286 msec (1013). Taking that as the ordinate value, the retinal reaction time 210 curve intercept is at a point 1014 on the retinal reaction curve 210, and we need to select an optical density of the neutral density lens of −1.7 1015.

As the measured value of luminance changes, this algorithm can be used as the only input to calculate optical density for the neutral density filter. The benefit of this algorithm is that it also only requires the luminance and direction of motion, but not the speed of lateral motion. Thus it is much less computationally intensive, will provide Continuous Alternating 3Deeps Filter Spectacles that take states conforming to the direction of motion and conforms to the value of luminance. It also affords a means by which the calculation of optical density for the neutral density filter can be performed by the Continuous Alternating 3Deeps Filter Spectacles. This may greatly lessen the computational requirement for the Phenomenoscope described in co-pending patent application Ser. No. 11/372,723.

Video and 3Deeps Processing

Various algorithms have been described to determine the optimal density for the neutral density filter of the Continuous Alternating 3Deeps Filter Spectacles. Whether the calculations are performed by embedded dedicated hardware, or by software running on a CPU, the Video and 3Deeps processing of the preferred embodiment will have the following functions; (1) take as video input the frames of a motion picture, (2) perform video format conversions to address de-interlacing and up-converter conversion problems, (3) output the converted video, (4) calculate a motion vector, luminance, and optimal optical density, (5) and output the 3Deeps control information to the Continuous Alternating 3Deeps Filter Spectacles. FIG. 11 teaches how to incorporate methods of this invention with such video formatters. FIG. 12 is a block diagram showing operation of a Video and 3Deeps processing used to calculate the optimal optical density of the neutral density filter in the preferred embodiment of the Continuous Adjustable 3Deeps Filter Spectacles.

FIG. 11 is a flowchart 1100 showing the use of a format conversion semiconductor chip 1120 to compute the Continuous Adjustable 3Deeps Filter Spectacles synchronization information. Video Format conversion chips are used to convert a movie from one format such as interlaced 60 Hz to another format such as non-interlaced 120 Hz.

Across the top the flowchart shows the video format conversion chip 1120 in its normal operation. To emphasize that the step is performed by a semiconductor chip, it is shown with a depiction of the pins 1190 of a semiconductor chip. As is typical with format conversion chip, it inputs frames (analog or digital) 1110 of the motion picture, and outputs suitably reformatted digital versions 1130 of the movie. Within the format conversion semiconductor chip 1120 image processing algorithms perform motion vector detection and quantify and extract the motion vector(s) and Luminosity values (1121) and use them to reformat the video (1122) for output.

The motion vector(s) (MV) and Luminosity value (L) are output by the format conversion IC and are read and stored 1151 by another processing unit that implements any of the previously described algorithms to calculate the optical density value of the neutral density frame. The output motion vector (MV) and luminosity (L) measures are stored 1152. They are then read by a computing device 1153, which incorporates any of the teaching algorithms herein described, or uses another algorithm to compute the LatScrMotion for each frame and output the value of the optical density of the neutral density filter. A decision rule 1154 will then determine the setting for the right and left lenses of the 3Deeps Filter Spectacles. If the LatScrMotion=0 (1161) then both lenses are set to a clear optical density (1171). If the LatScrMotion<0 (1160) then screen motion is from right-to-left and the left lens will be set to the corresponding darkened optical density and the right lens will have the clear optical density (1170). If the LatScrMotion>0 (1162) then screen motion is from left-to-right and the right lens will be set to the corresponding darkened optical density and the left lens will have the clear optical density (1172). The results are formulated 1180 into Continuous Alternating 3Deeps Filter Spectacle control information, and transmitted 1195 synchronously with the motion picture. The control information is described in FIG. 14. In the preferred embodiment, the control information is transmitted wireless, but other embodiments may use wired means.

In another embodiment (not shown) the algorithm to compute the 3Deeps Filter Spectacle synchronization information is included entirely within the format conversion semiconductor rather than on a second computer processor. In this case the format conversion chip not only inputs frames (analog or digital) of the motion picture, and outputs suitably reformatted versions of the movie, but also calculates and reports out the 3Deeps Filter Spectacle synchronization information.

FIG. 12 is a block diagram 1200 showing more detail of the operation of the Video and 3Deeps processing module 1290 used to calculate the optimal optical density of the neutral density filter in the preferred embodiment of the Continuous Adjustable 3Deeps Filter Spectacles.

If the motion picture is analogue then it is input using the Analogue Audio/Video input 1201. The analogue is fed to an Analogue to Digital Converter 1205 module that converts it to digital format frame by frame. A Memory-Control-In module 1210 stores the digital frames in Memory 1215. Each successive frame is stored in a different memory section denoted f1-f4. Other embodiments may have significantly more frame memory. The first frame of the motion picture would be stored in memory section f1, the second frame in f2, the third frame in f3, and the fourth frame stored in memory section f4. The frame memory will then roll over—with frame 5 stored in frame memory f1, frame 6 stored in f2, and so on. While this is happening in real-time other module of the Video and 3Deeps Processing module 1290 will also be accessing the frame memory, and performing the required calculations for each frame. Once the motion vector detection 1225, Luminance 1230, and 3Deeps OD and Synchronization 1235 calculations are performed, the associated motion picture frame stored in frame memory $f_1$ 1215 is no longer needed and can be overwritten by rolling over the storage location number in frame memory 1215.

The analogue 1201 is also directed unchanged to an analogue audio/video out module 1240. The analogue A/V out 1240 data is precisely the same as the Analogue A/V In 1201, without any format conversion. Other embodiments of the Video and 3Deeps Processing module 1290 may perform format conversion or reformatting of the analogue input signal before output of the analogue signal. Also, the output from the Analogue to Digital Converter is routed to the Digital Audio/Video Out module 1259. Before it is output at the Digital A/V Out 1259, it is processed by the Reformat Video module 1280 using as input the output from the Luminance 1230 and Motion Vector Detection 1225 modules. In this way the motion picture Analogue A/V 1201 is available for output both as the original Analogue A/V out 1240, and also in a reformatted digital A/V out 1259.

The Video and 3Deeps Processing module 1290 may also accept the motion picture in a digital format using module Digital A/V In 1202. In this case the Analogue to Digital converter 1205 is not used. The Digital A/V will be routed to the Digital A/V Out 1259 in the same way as previously described. That is before it is output at the Digital A/V Out 1259, it passes through Reformat Video module 1280 using as input the output from the Luminance 1230 and Motion Vector Detection 1225 modules.

The Digital A/V 1202 will also be processed by the Memory-Control-In module 1210, and stored in the digital frame memory 1215. The frames will be stored as previously described with successive frames stored in high labeled frame buffers, and rolling over when the highest frame numbered frame buffer has been reached.

Consider now the processing of a current frame. The Memory-Control-Out module 1220 will fetch the corresponding current frame from the frame memory 1215 and input it for processing to the Luminance calculation module 1230, and the Motion Vector Detection module 1225. The motion detection module 1225 will also reference the previous frame from frame memory 1215. In this simplified preferred embodiment, for teaching purposes, only two frames of the motion picture are used to estimate a lateral motion vector in the motion picture. In other embodiment many more frames may be used to estimate the lateral motion vector. Algorithms for the calculation of the lateral motion vector have been described in this and co-pending patent applications. Any of those algorithms may be used or other algorithms well known in the art, or that are already in use by format conversion chips. Whichever algorithm is used, it is implemented in the Motion Vector Detection module 1235. The calculation of Luminance is as described previously, and this algorithm is implemented in the Luminance module 1230. Alternate algorithms for the calculation of Luminance may be implemented in other embodiments.

The Luminance module 1230, and the motion vector detection module 1225 are also input to the 3Deeps Optical Density and Synchronization module 1235. For the preferred embodiment, and the current frame, the algorithm described in FIG. 5 and FIG. 6 is implemented in the 3Deeps Optical Density and Synchronization module 1225 that take as input the Motion Vector Detection 1225 and Luminance 1230 and calculate the optimal optical density for the motion-directed lens of the Continuous Alternating 3Deeps Viewing spectacles. If no lateral motion is detected then the output for the right lens is set to a digital value representing the clear state, and the output for the left lens is set to a digital value representing the clear state.

The control information calculated by the 3Deeps OD and synchronization module 1235 is further described in FIG. 13. If the motion vector is in the left to right direction then the output for the left lens is set to a digital value representing the clear state and the output for the right lens is set to a value representing the optimal optical density calculated by the algorithm in the module of the 3Deeps OD and synchronization module. If the motion vector is in the right to left direction then the output for the left lens is set to a digital value representing the optimal optical density calculated by the algorithm of the 3Deeps OD and synchronization module, and the right lens is set to a digital value representing the clear state. The control information is output and transmitted 1195 to the Continuous Alternating 3Deeps Filter Spectacles.

All output values are synchronized for the same frame. That is, when the Video and 3Deeps processing module 1290 outputs a frame of the motion picture on the Digital Audio/Video Out 1259, and the same frame on the Analogue Audio/Video out 1240, it will also output and transmit 1195 the Continuous Alternating 3Deeps Filter Spectacle control information for that same frame. In other embodiments, the Video and 3Deeps processing module 1290 may be embedded wholly or partially embedded in the circuitry of a video format conversion chip.

Optimal Control of the Continuous Adjustable 3Deeps Filter Spectacles

Optical Density Continuous Adjustable 3Deeps Filter Spectacles are advanced 3Deeps Filter Spectacles. They are characterized by the reception and utilization of control information that continually adjust the 3Deeps Filter Spectacles to the optimal optical density to maximize the Pulfrich illusion for viewing 2D motion video as 3D. But Digital TVs have refresh rates of up to 120 Hz, and many electrochromic materials are unable to change optical density that fast. Even were the materials able to change that fast, it may be desirable to continuously moderate the optical density of the Continuous Adjustable 3Deeps Filter Spectacles so there is a continuity and they do not change state too abruptly. The algorithms implemented in the Control Unit 103 of the Continuous Adjustable 3Deeps Filter Spectacles optimally handle the synchronization of the refresh rate of a movie to the viewing spectacles. Analogous to the way in which format conversion chips takes an input format and converts to an output format appropriate for the viewing monitor, Continuous Adjustable 3Deeps Filter Spectacles take the optimal optical density for the viewing spectacles and 'render' them to the viewing spectacles in a manner appropriate to the lens material from which they are fabricated.

In the preferred embodiment of the Continuous Adjustable 3Deeps Filter Spectacles, control information for the spectacles lenses is updated in synchronization with each and every frame of the motion picture. The Control Unit (described in FIG. 18) of the Continuous Adjustable 3Deeps Filter Spectacles implements algorithms that utilize this information to optimize 3D viewing, and provides significant advantage over earlier, but less active 3Deeps Filter Spectacles. One important advantage is that different Continuous Adjustable 3Deeps Filter Spectacles made from different electro-optical lenses can each receive the same control information and but still each operate in an optimal manner appropriate to the lens material from which they are fabricated. In typical operation, the Continuous Alternating 3Deeps Filter Spectacles may receive the new control and synchronization states for the lenses even before they have finished transitioning to a previous state.

While Continuous Adjustable 3Deeps Filter Spectacles may synchronize with every frame of the movie, as do shutter glasses, they are totally different from the operation of shutter glasses. Shutter-glass is a dual image system that synchronizes to the left and right eye frame images. While the preferred embodiment of Continuous Adjustable 3Deeps Filter Spectacles synchronize to every single frame of the motion picture, they provide a continuously changing optical density with transmission of light controlled for each eye. Shutter-glass systems always have a light-intercepted state—dependent on whether the image is a right eye or left eye image, and in which no transmission of light is allowed through the lens. In contrast, Continuous Adjustable 3Deeps Filter Spectacles require that there always be transmission of light through both lenses, but are continually adjusting the transmissivity of the lenses synchronized to motion in the movie. A movie made for shutter-glasses cannot be viewed with Optical Density Continuing Adjustable 3Deeps Filter Spectacles, and shutter-glasses cannot be used for any movie that can be viewed in 3D using Optical Density Continuing Adjustable 3Deeps Filter Spectacles.

FIG. 13 is a table 1300 showing control information for the Continuous Adjustable 3Deeps Filter Spectacles. The control information is organized by frame 1320 of the motion picture—that is control information is transmitted synchronous with the output frames of the motion picture. If the movie is input at 60 Hz but output to the screen monitor after format conversion at 100 Hz, then the Continuous Adjustable 3Deeps Filter Spectacle control information will be synchronized to the output frame rate of 100 Hz. For each frame 1320 the frame number 1301, optical density of the Left Lens 1303, optical density of the right lens 1305, scalar value of the motion vector 1307, direction of the motion vector 1309 ('−' for right-to-left lateral motion, '+' for left-to-right lateral motion, or '0' for not motion), and Luminance 1311 are provided.

The control information requires very low bandwidth. If the information is transmitted in character format with 9 characters for the frame number 1301, 5 characters each for the left lens OD 1303, right lens OD 1305, Motion Vector 1307, Luminance 1311, and 1 character for the direction 1309, that is a total of 30 characters for each frame. For a fast output format at 120 Hz that is still a low-bandwidth of 3600 characters per second easily handled by inexpensive off-the-shelf digital Transmit/Receive (Tx/Rx) chip pairs.

This control information is sufficient for all the different embodiments of Continuous Adjustable 3Deeps Filter Spectacles. In the preferred embodiment the control unit 103 on the Continuous Adjustable 3Deeps Filter Spectacles 100 will receive the control information 1300 but only use the subset of the information that is required. In the preferred embodiment of the Continuous Adjustable 3Deeps Filter Spectacles, the only control information that is required is the Left Len OD 1303 and Right Lens OD 1305.

In another embodiment, a photodiode 920 on the frames of the Continuous Adjustable 3Deeps Filter Spectacles may be used to provide the Luminance calculation to the algorithm of the first alternate embodiment described in FIG. 8 implemented in the Control Unit 103. In this case, the Optical Densities calculated and transmitted by the Video and 3Deeps Processing Module are not used, but must be re-calculated by the Control Unit 103 of the Continuous Adjustable 3Deeps Filter Spectacles. Using the algorithm of the first alternate embodiment running on the Control Unit 103, the direction of motion 1309 for each frame will be input along with the luminance measure from the photodiode 920 to provide control of the right 105 and left 106 lenses of the Continuous Adjustable 3Deeps Filter Spectacles 101. Similarly, other embodiments may use different subsets of the control information 1300 to control the Continuous Adjustable 3Deeps Filter Spectacles 101. An advantage of Continuous Adjustable 3Deeps Filter Spectacles is that if two viewers are sitting side-by-side, one with spectacles that incorporate in the control unit 103 the algorithm of the preferred embodiment (FIG.

5 and FIG. 6), and the second viewer with spectacles that incorporate in the control unit 103 the algorithm of the first alternate embodiment (FIG. 8), both will view the movie optimally for their respective spectacles.

FIG. 14 is a block diagram 1400 of the operation of the Continuous Adjustable 3Deeps Filter Spectacles of FIG. 1. All circuits on the Continuous Adjustable 3Deeps Filter Spectacles 101 are powered 1401 by the battery 104, including the Control Unit 103, Signal Receiving Unit 102, the Left Lens 106, and the Right Lens 105. The control information 110 previously described in FIG. 13 is received by the Signal Receiving Unit 102 and sent 1403 to the Control Unit 103. The control unit 103 implements an algorithm that is specific for the lens materials used in the fabrication of the Right Lens 105 and the Left lens 106 of the Continuous Adjustable 3Deeps Filter Spectacles, and controls the Left Lens 106 with a control circuit 1403, and the Right Lens with a control circuit 1405.

This approach has great advantages. The control information 110 is spectacle-agnostic; i.e. all spectacles receive the same transmitted control information. The control unit 103 on the spectacles performs a final view-spectacle-specific optimization, translating the control information into control signals specific to the lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles. For the preferred embodiment the details of the Control Unit 103 algorithm will be detailed in FIG. 18.

Electro-Optical Lenses

The preferred embodiment of the Optical Density Continuing Adjustable 3Deeps Filter Spectacles use electrochromic lenses. Electrochromism is the phenomenon displayed by some chemicals of reversibly changing color when an electric potential is applied. There are many different families of chemicals that exhibit such properties including but not limited to polyaniline, viologens, polyoxotungstates's and tungsten oxide. Within each family, different 'mixtures' of chemicals produce different properties that affect the color, transmissivity, and transition time. For instance some electrochromics may only affect ultraviolet light—not visible light—appearing as a clear plastic to an observer since they do not affect visible light. Electrochromics have been the object of study for several decades, and have found their chief use in 'smart windows' where they can reliably control the amount of light and heat allowed to pass through windows, and has also been used in the automobile industry to automatically tint rear-view mirrors in various lighting conditions.

The operating characteristics of each formulation of an electrochromic material will be different. Some electrochromic materials may take several seconds to change state from one optical density to another—others may be near instantaneous. For many electrochromic materials the color change is persistent and electric potential need only be applied to effect a change. For such 'persistent' electro-optical materials, only an electronic on-off pulse is needed, while non-persistent materials require the application of a continuing electronic potential. Other materials may attain state under the presence of electric potential, but then slowly leak potential and change back. These materials may require a maintenance potential to maintain state but one that is different from that to attain the optical density state.

The preferred embodiment of the Continuing Adjustable 3Deeps Filter Spectacles can be fabricated from a persistent electrochromic material. For some electrochromic materials, the transition time moving from a lighter to a darker optical density (FIG. 16) is different from that of the transition time moving from a darker to a lighter optical density (FIG. 17). While electrochromic material can be used in the preferred embodiment of the optical density Continuous Adjustable 3Deeps Filter Spectacles, any electro-optical materials that change optical density in response to an applied potential may be used. This includes but is not limited to LCDs or SPDs (Suspended particle devices). SPDs are a different material with almost instantaneous response but need a much higher potential to change state faster opto-electrical material. In selecting the lens material, one should seek materials with shorter transition time. The optical transmission time of the lens material should be taken into account in optimizing the operation of the Continuing Adjustable 3Deeps Filter Spectacles with lenses in electrochromic or electro-optical formulations. In the future, new electro-optical materials will be discovered and may be advantageously used in the practice of this invention.

FIG. 15 1500 shows a typical operating characteristic curve 1510 of an electrochromic material with output optical density 1503 (y-axis) as a function of voltage 1501 (x-axis). An optical density of 0.3 corresponds to about 50% transmission of light (1523). An optical density of 0.6 corresponds to about 25% transmission of light (1522). And an optical density of 0.9 corresponds to about 12.5% transmission of light (1521). To get a specific desired optical density, one only need apply the correct voltage across the material. In this example, were the lenses of the 3Deeps Filter Spectacles made from such electrochromic material then if the desired optical density were 50% transmission of light 1523, the 3Deeps Filter Spectacle controller would cause 1 Volt 1534 to be applied across the electrochromic lenses. One volt 1534 intersect 1532 the operating characteristic curve 1510 resulting in an optical density of 0.3 (1503) that corresponds with 50% transmission of light 1523. FIG. 15 is a typical operating characteristic curve. Depending on the chemical formulation of the material the operating characteristic curves may differ.

Other embodiments may use more than one layer of material where each material can respond to controlling signals. For instance, one layer may impinge light over a restricted range of visible light and another layer may impinge light over a different range of visible light.

The operating characteristic curve of FIG. 15 will provide sufficient control if the electrochromic lenses change state near instantaneously. But, many electrochromic materials do not respond instantaneously to an applied potential and take a finite time to transition to the desired optical density state. Continuous Adjustable 3Deeps Filter Spectacles need also account for the transition time of the material from which the lenses are fabricated.

FIG. 16 shows 1600 a typical transition time curve 1603 for an electrochromic material with transition time as a function of optical density when a potential of 2.0V is applied to the electrochromic material. It is for a 'slow' electrochromic material with transition time 1602 as a function of optical density 1601. This hypothetical electrochromic material has a 'lightest' state with an optical density of 0.0, or clear, 1604 and its darkest state 1605 is an optical density of 1.5 or dark. The material can take any optical density between 0.0 and 1.5 by the application of 2V for the proper length of time. If the material has an optical density of 0.0 or clear 1604, and 2V potential is applied to the material, it will take 2 seconds for the material to change state and darken to a optical density of 1.5 (dark) 1605. This is shown on the transition time curve 1603.

As an example, if the material has an optical density of 0.3, and the control signal 110 received on the frames receiving unit 102 indicates that the subject lens should change to an optical density of 0.6, then the transition time curve 1603 would be implemented by the control unit 103 to apply 2V potential to the lens for 0.4 seconds. An optical density 0.3 1610 intercepts the transition time curve 1603, at a point 1611 on the curve corresponding to 0.4 seconds 1612. An optical density 0.6 1620 intercepts the transition time curve 1603, at a point 1621 on the curve corresponding to 0.8 seconds 1622. The absolute value of the difference abs(0.8−0.4)=0.4 seconds then is the length of time that 2V potential needs to be applied to the lens to change its optical density from 0.3 1610 to 0.6 1620. After that length of time has elapsed no potential is applied since the electrochromic will 'latch' in the new state.

This is an example of how an algorithm implemented in the Control Unit 103 of the Continuous Adjustable 3Deeps Filter Spectacles would use the transition time curve 1603 to control the right lens 105 and the left lens 106. To transition a lens from and optical density of 0.3 to an optical density of 0.6 the Control unit would apply 2V potential to the lens for 400 msec.

This is a simplified example for illustrative and teaching purposes. Other electrochromic materials may have other operating characteristics that have characteristic exponential, negative exponential, or logistic (s-shaped) relationships. In this example, 2V potential is used to move between states. It is used under the assumptions that (a) for this electrochromic formulation the higher the electronic potential the more rapid will be the change from a lighter to a darker optical density, and (b) change of state from a lighter to a darker optical density is to be optimized. Other materials may require different potentials to be applied to move from between states. In any of these cases, the principle of operation is identical and the Control Unit 103 on the frames of the lenses uses the operating characteristics of the material used in the right 105 and left 106 lenses to determine the potential and the length of time the potential is to be applied to transition between lens control states.

In the example above, it took 400 msec (0.4 sec) for the Continuous Adjustable 3Deeps Filter Spectacles to change from an optical density of 0.3 and optical density of 0.6. That is in the length of time it will take to change optical density, 48 frames of video will have been shown. The lenses are operating much slower than a digital TV with a refresh rate of 120 Hz (8.3 msec). This apparent problem is actually an advantage. In this example, at each frame of video (every 8.3 msec), the Continuous Adjustable 3Deeps Filter Spectacles are receiving new control values. These advanced 3Deeps spectacles are then 'continuously' moving to their optimum value, and this has real advantages for 2D/3D viewing.

First, note that within a scene, motion will exhibit consistency, and the target optical density will likely will not change very much. Consider a car speeding across through the scene; the luminosity and the speed and direction of motion will stay at about the same value, so the control and synchronization information for the lenses will be about the same. In this example, while it will take 4 tenths of a second for the lenses to reach their target OD, and there will be 48 3Deeps lens control values, corresponding and synchronized to the intervening 48 frame of video, they will likely target about the same lens OD. Once the target is reached, successive lens setting will be similar and thus the lenses will quickly respond and conform to such values—often within the 8.3 msec between successive frames of video. The lenses are then continuously moving towards the optimal value, and that has distinct viewing advantages over lenses that appear to 'instantaneously' and 'abruptly' change OD value at each frame. Also, since the Control Unit 1403 of the Continuous Adjustable 3Deeps Filter Spectacles transforms the control signals for the specific lenses, the control signals will not contain any 3Deeps spectacle specific information. Thus, 2 people watching the same Sunday afternoon football game, but each wearing Continuous Adjustable 3Deeps Filter Spectacles (for instance made by different vendors, or different models from the same vendor) that differ only by the operating characteristics of the electrochromic material, will each have optimal viewing from their specific 3Deeps spectacles.

In other embodiments the transmitted control and synchronization information may be other than for every frame. This might be the case with a different vendor TV. In this case no changes are necessary to the Continuous Adjustable 3Deeps Filter Spectacles, and they will continue to operate optimally for the combination of received control signals and electrochromic materials. Consider again our 2 hypothetical viewers above. Were they at half-time to move to another viewing venue, with a digital TV that has a refresh rate of 60 Hz and that only transmits 3Deeps Filter Spectacle control information every other frame (30 times a second), they would each still have optimal viewing for their specific 3Deeps spectacles.

FIG. 15 shows an alternate means to transition from an optical density of 0.3 to an optical density of 0.6 is to apply a potential of 1.18V. The target optical density 0.6 1542 intersects the operating characteristic curve 1544 of the electrochromic material at a voltage of 1.18V 1546. So applying a voltage of 1.18 Volts will transition the lens from an optical density of 0.3 to an optical density of 0.6. The transition time curve for a voltage of 1.18V is not shown, but would be used similarly to the transition time curve of FIG. 16 (that is for an applied potential of 2.0V) to determine the length of time that 1.18V is to be applied to the lens. In general, any potential greater than 1.18V and less than 2.0V will be applied for the proper transition time will serve to change the state of the lenses.

In the preferred embodiment, to transition the lenses from an optical density of 0.3 to 0.6 we use the transition time curve for an applied potential of 2.0V, since we have assumed a lens material with the characteristic that the higher the applied potential the more rapid is the transition time. In the preferred embodiment, we seek to maximize transition time. Other embodiment may maximize other characteristics of the electro-optical material.

FIG. 17 shows 1700 a typical transition time curve 1703 for an electrochromic material with transition time as a function of optical density when a negative potential of −2.0V is applied to the electrochromic material (draining the lens material of potential). It is for a 'slow' electrochromic material with transition time 1602 as a function of optical density 1601. This hypothetical electrochromic material has a 'lightest' state with an optical density of 0.0, or clear, 1604 and its darkest state 1605 is an optical density of 1.5 or dark. The material can take any optical density between 0.0 and 1.5 by the application of −2V for the proper length of time. If the material has an optical density of 2.0 or dark 1606, and −2V potential is applied to the material, it will take 2 seconds for the material to change state and lighten to an optical density of 0 (dark) 1604. This is shown on the transition time curve 1703.

As an example, if the material has an optical density of 0.6, and the control signal 110 received on the frames receiving unit 102 indicates that the subject lens should change to an optical density of 0.3, then the transition time curve 1703 would be implemented by the control unit 103 to apply –2V potential to the lens for 1.1 seconds. An optical density 0.6 1720 intercepts the transition time curve 1703, at a point 1721 on the curve corresponding to 1.35 seconds 1722. An optical density 0.3 1710 intercepts the transition time curve 1703, at a point 1711 on the curve corresponding to 0.25 seconds 1712. The absolute value of the difference abs(0.35–0.25)=1.1 seconds then is the length of time that –2V potential needs to be applied to the lens to change its optical density from 0.6 1720 to 0.3 1710. After that length of time has elapsed no potential is applied since the electrochromic will 'latch' in the new state.

This is an example of how an algorithm implemented in the Control Unit 103 of the Continuous Adjustable 3Deeps Filter Spectacles would use the transition time curve 1703 to control the right lens 105 and the left lens 106. To transition a lens from and optical density of 0.36 to an optical density of 0.3 the Control unit would apply –2V potential to the lens for 1.1 seconds.

In the general case, the relationship between optical density (x-axis) and transition time (y-axis) for any specific formulation of electro-optical material may be represented functionally by a response surface as $y=f(x,v)$. The first derivative $df(x,v)/dy$ provides the transition time rate for any value of voltage 'v'. To get the transition time for the material to change state and move from optical density $OD_1$ to $OD_2$ by the application of a potential 'v' to the material, the control unit 103 would evaluate to the integral Min(response time)=min$\iint df(x,v)dxdv$ over the range $OD_1$ to $OD_2$, and for all $\{v: -2v<v<+2\}$.

The representation of such response surfaces, and the evaluation of integrals by numerical or analytical methods are well known in the art, and any method may be used. In the preferred embodiment the optimization is done to minimize the response time. However other embodiments may optimize on other characteristics of the material. For instance, the use of the maximum and minimum voltage to change state may have a detrimental effect on the life of the lenses. In such cases, boundary conditions may limit the range of voltage to values that have a lesser impact on lens life. For other materials in which battery life may depend upon the applied transition voltage it may make sense to optimize to get longer battery life. While the preferred embodiment optimizes to minimize response time for the lenses to change state, other embodiments may use the same principles to optimize on other characteristics of the electro-optical material from which the lenses are fabricated. In any embodiments however, a dual approach is used in which first the optimal optical densities are calculated, and then the Control Unit 103 of the Continuous Adjustable 3Deeps Filter Spectacles 101 optimize those values to a characteristic(s) of material from which the lenses are fabricated in order to control the spectacle lenses.

FIG. 18 is a block diagram 1800 showing the operation of the Control Unit 103 for the preferred embodiment of the Continuous Adjustable 3Deeps Filter Spectacles 101. The preferred embodiment uses electrochromic lenses that; (a) latch to state once the desired optical density is reached, (b) have an operating characteristic curve as shown in FIG. 15, (c) have a transition time curve as shown in FIG. 16 for an applied potential of 2.0V that provides the lenses with the most rapid change from a lower to a higher optical density, and (d) have a the transition time curve as shown in FIG. 17 for an applied potential of –2.0V that provides the lenses with the most rapid change from a higher to a lower optical density.

When the control unit is started 1801 it transitions to a 'Signal Receiving Unit Module' 1803 and inputs the 'Next Frame Signal' 1821. This will have the Control Information 1300 for a single frame 'n' 1320 and will include the frame number 1301, optical density of the Left Lens 1303, optical density of the right lens 1305, scalar value of the motion vector 1307, direction of the motion vector 1309, and Luminance 1311. After the information is received it is passed to the processing for the Left Lens. First the Left Lens Potential is assigned in the 'Set Left Lens Potential Module' 1805. In the preferred embodiment we will use either a '+2V' potential if the change for the left lens is from a lower to higher optical density, or '–2V' if the change is from a higher to a lower optical density. The value is stored as the 'Left Potential' 1822. Then in the 'Calculate Left Lens Duration' module 1807, we use the value of the optical density of the Left Lens 1303 from the prior frame (n–1) and the value of the optical density of the Left Lens for the current frame, and the appropriate transmission time curve to calculate and store the value of the 'Left Duration' 1823. If the change for the left lens is from a lower to higher optical density then we use the Transmission Time curve 1600 described in FIG. 16, and if the change for the left lens is from higher to a lower optical density then we use the Transmission Time curve 1700 described in FIG. 17.

The Control Unit 103 then transitions to processing for the Right Lens. First the Right Len potential is calculated. The Right Lens Potential is assigned in the 'Set Right Lens Potential Module' 1809. In the preferred embodiment we will use either a '+2V' potential if the change for the left lens is from a lower to higher optical density, or '–2V' if the change is from a higher to a lower optical density. The value is stored as the 'Right Potential' 1832. Then in the 'Calculate Right Lens Duration' module 1811, we use the value of the optical density of the Right Lens 1305 from the prior frame (n–1) and the value of the optical density of the Right Lens for the current frame, and the appropriate transmission time curve to calculate and store the value of the 'Right Duration' 1833. If the change for the left lens is from a lower to higher optical density then we use the Transmission Time curve 1600 described in FIG. 16, and if the change for the left lens is from higher to a lower optical density then we use the Transmission Time curve 1700 described in FIG. 17.

The Control Unit 103 then transitions to the 'Right Lens Control' 1813 and causes the circuitry to provide the 'Right Potential' 1832 to the right lens 105 for a duration equal to the value of 'Right Duration' 1833. The Control Unit 103 then transitions to the 'Left Lens Control' 1815 and causes the circuitry to provide the 'Left Potential' 1822 to the left lens 106 for a duration equal to the value of 'Left Duration' 1823. The Control Unit then transitions reads the 'Next Frame Signal' 1821 and performs the same processing for frame 'n+1' that it performed for frame 'n'.

FIG. 19 is a block diagram 1900 showing the operation of a typical the Continuous Adjustable 3Deeps Filter Spectacles system. This is the complete system. It follows the operation of the 2D/3D 3Deeps viewing systems through 3 consecutive frames of video and shows the processing Video and 3Deeps Processing, display of the motion picture in synchronization with transmission of the Control Information for the Continuous Adjustable 3Deeps Filter Spectacles, and reception and control of lenses.

The first column is labeled 'Time' and shows 3 consecutive frames of video at time $t_n$1901, $t_{n+1}$ 1911, and $t_{n+2}$ 1921. As an example, if the video is being shown at 60 Frame per second then the time between each frame (e.g. $t_{n+1}-t_n$) is 16.667 msec. First consider the processing of the frame 'n' 1903 at time $t_n$1901. The Video Frame 1902 is read 1903 by the Video and 3Deeps Processing module 1920. The Video processing format conversion is output 1904 and displayed as Display Frame 1905. In this teaching example, the Video/3Deeps Processing consists only of de-interlacing so no new frames are created in the Display Video output stream. If the Video/3Deeps Processing module also performed up-conversion (or down-conversion) then the number of output frames would increase (decrease). The Video and 3Deeps Processing module has been previously described in FIG. 11 and FIG. 12. The Video/3Deeps Processing also calculates the Control Information 1300 described in FIG. 13. The control information is transmitted 1195 synchronous with the output display frames 1905. The Continuous Adjustable 3Deeps Filter Spectacles 101 receive the signal 110 and the Control Unit 103 implements the electrochromic specific algorithm to optimally control the Continuous Adjusting 3Deeps Filter Spectacles and generate the signal synchronous with motion picture to set the dark optical density of the right lens 1909 and the left lens to clear. The operation of the Control Unit 103 has been described in FIGS. 14, 15, 16, 17, and 18.

Similarly is the processing of the next frame 'n+1' 1912 at time $t_{n+1}$ 1911. The Video Frame 1912 is read 1913 by the Video and 3Deeps Processing module 1920. The Video processing format conversion is output 1914 and displayed as Display Frame 1915. The Video/3Deeps Processing calculates the Control Information 1300 described in FIG. 13. The control information is transmitted 1195 synchronous with the output display frames 1915. The Continuous Adjustable 3Deeps Filter Spectacles 101 receive the signal 110 and generate the signal to set the dark optical density of the right lens 1919 and the left lens to clear. In this example the right lens 1919 associated with frame 'n+1' is a darker optical density than the right lens 1909 that is associated with frame 'n'.

Similarly is the processing of the next frame 'n+2' 1922 at time $t_{n+2}$1921. The Video Frame 1922 is read 1923 by the Video and 3Deeps Processing module 1920. The Video processing format conversion is output 1924 and displayed as Display Frame 1925. The Video/3Deeps Processing calculates the Control Information 1300 described in FIG. 13. The control information is transmitted 1195 synchronous with the output display frames 1925. The Continuous Adjustable 3Deeps Filter Spectacles 101 receive the signal 110 and generate the signal to set the dark optical density of the right lens 1929 and the left lens to clear. In this example the right lens 1929 associated with frame 'n+2' is an even darker optical density than the right lens 1919 that is associated with frame 'n+1'.

FIG. 20 2000 is a block diagram 2001 for a preferred embodiment of an IC Chip generating optimum optical density signals for each individual lens of a Continuous Adjustable 3Deeps Filter Spectacle 101. The preferred embodiment of the chip is a self-contained optical density calculator that calculates and outputs the OD density values for the Right 2063 and Left lenses 2064 of Continuous Adjustable 3Deeps Filter Spectacles synchronized 2062 to the A/V 2061 of the motion picture. The chip 2001 performs the calculations selectively based on the optimal OD algorithms described in FIG. 5 and FIG. 6, or selectively based on the optimal OD algorithm described in FIG. 8. The chip has configurable Frame Search parameters (parms) 2004 used to identify and determine the single motion vector (direction 2032 and velocity 2031) that characterizes lateral motion in the frame of the motion picture as described in FIG. 6. Additionally, the preferred embodiment of the chip 2001 is configurable with parameters necessary for the algorithmic calculations 2003 such as the pixel resolution of the viewing screen.

Power 2085 is provided to the IC chip 2001. The chip has an input port for the A/V Frame-In 2002 for the current frame of the motion picture coupled to the output port of a frame register. The input frame signal 2002 is passed unchanged through the chip 2001, and output on the A/V Frame-Out 2061 synchronized 2062 with the calculated output values of the Right Lens OD 2063 and the Left Lens OD 2064 of Continuous Adjustable 3Deeps Filter Spectacles 101.

The chip has an input port 2007 to receive the Motion Vector Values of the current frame coupled to the output of a motion vector estimation module. As previously related, Video format conversion chips calculate motion vector values to compensate for motion when de-interlacing and up-converting video, and the subject IC chip 2001 will often be coupled to such a format conversion chip. The chip 2001 also has an input port to receive the luminance values 2005 coupled to the output of a luminance determination module possibly as calculated by a video format conversion chip. The Motion Vector values 2007 and Luminance values 2005 are stored in Volatile memory 2012 contained on the chip. Other embodiments of the chip 2001 may use off-chip memory for storage of these values.

The preferred embodiment of the chip 2001 has non-volatile memory 2010 to store the Frame Search parameters 2004 of the algorithm implemented in the Lateral Motion Determining Unit 2020. The Frame Search parameters 2004 have been previously described in FIG. 5 and FIG. 6, and are the regions of the current frame of the motion picture that delimits the search for lateral motion vector that characterizes motion in the frame of the motion picture. The parameters include the boundaries of the upper bounded region that is a surrogate for the background in the frame of the movie and the lower bounded region that is a surrogate for the foreground of the frame of movie. The input port for the Frame Search parameters 2004 provides a means to input the Frame Search parameters, and the input includes a binary switch to control whether the chip will input, store and use new values for the Frame Search parameters or use the already stored values. In normal usage it would be unusual for the Frame Search parameters 2004 to be changed within any single presentation.

Also stored in the non-volatile memory 2010 are the parameters necessary to compute the Optical Density Calculations. This includes (a) the threshold values for determining whether lateral motion is present or not (e.g. the −10 dpi and 10 dpi values 650 of FIG. 6), (b) refresh rate of the viewing monitor (e.g. 60 Hz of FIG. 5), and (c) the pixel resolution of the viewing monitor (e.g. 100 dpi of FIG. 5). The input port for the algorithm parameters 2003 provides a means to input the algorithm parameters and includes a binary switch to control whether the chip will input, store and use new values for the Algorithm or use the already stored values. In normal usage the algorithm parameters primarily characterize the viewing display (e.g. TV screen) and once set will rarely change.

The 'Algorithm Select' 2006 input allows the chip 2001 to configure itself to use either the circuitry that performs the calculation described in FIG. 5 and FIG. 6, or in FIG. 8. The Algorithm described in FIG. 5 and FIG. 6 requires as input the direction and velocity of lateral motion in the motion picture and the luminance in the frame of the motion picture, while the algorithm described in FIG. 8 requires as input only the direction and luminance of the frame of the motion picture, but not the velocity. In other embodiment the 'Algorithm Select' 2006 input may be stored in the Non-Volatile memory 2010 and then only changed as necessary.

The operation of the units of circuitry on the chip 2001 using these input values follows. The A/V Frame 2002 is input to the chip so that the Right 2063 and Left OD 2064 values calculated and output with the frame may be synchronized 2062 with the A/V output 2061. No calculations or reformatting is performed on the A/V signal.

The Lateral Motion Determining Unit 2020 has circuitry to implement the previously described algorithm to determine the single most prominent moving object in the background region of the frame and the single most prominent object in the foreground region of the frame and then process these identified values to calculate the direction and velocity that characterizes lateral motion in the frame. Input to the Lateral Motion Determining Unit 2020 is the Frame Search Parameters 2004 stored in the Non-Volatile memory 2010, and the Motion Vector Values 2007 stored in Volatile memory 2012. The output is the calculated Velocity ('Vel' in dpi units) 2031 and the direction of motion 2032 ('Dir' negative for right-to-left motion and positive for left-to-right motion.) These values may be stored in volatile memory in some embodiments.

The Optical Density Calc Unit 2040 implements the Optical Density Calculation to determine the setting of the lenses of the Continuous Adjustable 3Deeps Filter Spectacles 101. In the preferred embodiment both of the algorithms described in FIG. 5 and FIG. 6, and in FIG. 8 are implemented within the units circuitry. The Algorithm Select input port 2006 determines which of the calculation circuits is used. If the Algorithm described in FIG. 5 and FIG. 6 is used then the values of Velocity 2031 (Vel) and Direction 2032 (Dir) of lateral motion are read from the output of the Lateral Motion Determining circuitry 2020. Also, the Luminance (Lum) 2033 value stored in volatile memory 2012 is read, along with the Algorithm parameters 2003 stored in Non Volatile memory 2010. With these input values the Optical Density Calc Unit 2040 circuitry calculates the optimal optical values for the Right lens (OD R) 2051 and Left Len (OD L) 2052 and passes them to the Sync Unit 2050. If the Algorithm described in FIG. 8 is used then the values of Direction 2032 (Dir) of the lateral motion is read from the output of the Lateral Motion Determining circuitry 2020, the Luminance 2033 (Lum) value stored in volatile memory 2012 and the Algorithm parameters 2003 stored in non volatile memory 2010. With these input values the Optical Density Calc Unit 2040 circuitry calculates the optimal optical values for the Right Lens (OD R) 2051 and the Left Len (OD L) 2052 and passes them to the Sync Unit 2050.

The Sync Unit 2050 synchronizes the output of the Video Frame 2061 with the output of the calculated values of the Right Lens OD 2063, and the Left Lens OD 2064. Along with a sync signal 2062, the unit also outputs the frame on the A/V Frame-Out 2061, and the calculated values of the Optical Density for the right lens (Right Lens OD) 2063 and the left lens (Left Lens OD) 2064).

While the Optical Density Calc Unit 2040 has circuitry to implement the Optical Density algorithms described in accompanying FIG. 5 and FIG. 6, and FIG. 8, other embodiments may include other algorithms to calculate the optical density of the Right 2063 and Left lenses 2064 of the Continuous Adjustable 3Deeps Filter Spectacle 101.

Also, while the Lateral Motion Determining Unit 2020 only uses the Algorithm described in FIG. 5 and FIG. 6 to characterize the lateral motion (direction and speed) in a frame of a motion picture, other embodiments may alternatively use algorithms such as that described in FIG. 7 to characterize the lateral motion in a frame of a motion picture.

The IC chip 2001 has separate outputs for the optimal Left Len OD 2063 and Right Len OD 2064. Rather than use these values to control Continuous Alternating 3Deeps Filter Spectacles, the values can alternatively be used to determine the frames of a dual image 3D viewing systems as is also described below.

The preferred embodiment of the chip has Input 2002 and Output 2061 ports for the A/V frame of the movie and the chip is able to synchronize 2062 the output frame with the output of the calculated value of the Right 2063 and Left Len 2064 optical densities. Other embodiments may use other means to synchronize the Continuous Adjustable 3Deeps Filter Spectacles 101 to the frame of the motion picture without input of the picture frame A/V Frame Inm 2002.

While FIG. 20 shows the Calculation of the Optimum Optical Density Signals for Each Individual Lens Of A Continuous Adjustable 3Deeps Filter Spectacles 101 embodied as a chip coupled with other chips such as video format conversion chips, the circuitry could have been included within the circuitry of such a chip. Also the circuitry of FIG. 20 may connect to other IC chips on an IC board.

FIG. 21 2100 is a block diagram 2101 of an alternate embodiment of an IC chip 2101 generating the change in optical density signals 2140 for each individual lens of a Continuous Adjustable 3Deeps Filter Spectacle 101. This alternate embodiment of an IC chip 2101 implements the optical density calculation algorithm of FIG. 8, and has the benefits that (1) it only requires direction and not speed of lateral motion, and (2) it can be implemented directly on the a Continuous Adjustable 3Deeps Filter Spectacle 101 using a photodiode 920 to provide a measure of luminance. Power 2085 is provided to the IC chip 2101. Since the algorithm of FIG. 8 requires the refresh rate and pixel resolution of the viewing monitor, these values are provided through the circuitry of the Algorithm Parms 2003 and stored in Non-Volatile memory 2110. Once updated, there is no necessity to refresh the values until there is a change of viewing monitor. A chip on the projection or viewing device such as a video format chip calculates and provides the Direction Values 2105, and the Luminance Values 2005. Note that the speed of lateral motion is not required for the algorithm described in FIG. 8, and is not input.

The Direction Value 2105, and the Luminance Values 2005 are read and stored in Volatile memory 2120. In this embodiment, rather than calculate and output values for the Left Lens OD and the Right Lens OD, only a single Delta Difference value 2140 is calculated and output. This will allow the alternate embodiment chip to have fewer output legs and thus a smaller package with lessened power requirements. To indicate whether the Delta change is to be applied to the Left lens, or the Right Lens, a Lens Change Indicator 2142 is also output. If the Value of the Lens Change Indicator is '0' then both lenses are set back to a default clear state. If the Value of the Lens change Indicator is '1' then only the Left Lens is affected and it is set from its last state ($OD_{Last}$) to a new state ($OD_{current}$) by adding the Delta Lens Change value 2140 (a value of $OD_{current}-OD_{Last}$) to the last value of the Left Lens ($OD_{Last}$). If the Value of the Lens change Indicator is '2' then only the Right Lens is affected and it is set from its last state ($OD_{Last}$) to a new state ($OD_{current}$) by adding the Delta Lens Change value 2140 (a value of $OD_{current}-OD_{Last}$) to the last value of the Right Lens ($OD_{Last}$)

The Value of Delta Change Lens OD 2140 and the Lens Change Indicator 2142 are calculated by the Optical Density Calc Unit 2130 that implements the Algorithm of FIG. 8 2131. It reads the algorithm parameters 2003 stored in Non Volatile Memory 2110, the Direction Value 2105 stored in Volatile memory 2122, and the Luminance Value 2005 stored Volatile memory 2121. The Unit 2130 performs the calculations and stores the Calculated OD values in Volatile memory as 'OD Current' 2123, keeping track of the last calculated OD values. The Unit 2130 output the Delta Len OD 2140 and the Lens Change Indicator 2142 as previously described.

FIG. 22 2200 shows Continuous Adjustable 3Deeps Filter Spectacles 101 that include an IC chip 2101 generating the change in optical density signals for each individual lens of a Continuous Adjustable 3Deeps Filter Spectacle. It shows the same perspective view of Continuous Alternating 3Deeps Filter Spectacles 101 shown in FIG. 9, but with the addition of the IC Chip 2101 of FIG. 21 and a connector 2202 between the IC Chip 2101 and the Control Unit 103. The receiver 102 labeled 'Rx' is coupled to the IC chip 2101. The receiver 102 outputs the Algorithm parameters 2003, and the direction value 2105 to the IC chip 2101 that performs the calculations and outputs the Delta change ($\Delta\square\square$ lens OD 2140 to the IC chip 2101 (labeled 'ODIC'), along with a Lens Change Indicator 2142 as to whether it is the Right Lens 105 or the Left Lens 106 of the Continuous Alternating 3Deeps Filter Spectacles 101 that is to be change to a new state. The Control Unit 103 and the IC Chip 2101 are connected 2202, that is used to output the calculations from the IC chip 2101 to the Control Unit 103. The IC Chip 2101 performs the calculations as described in FIG. 21. The advantage of this embodiment, as previously indicated, is that the Luminous Reading from the Photodiode 102, can be used for the calculations, and since the photodiode 920 is on the frame of the spectacles, it will have the best surrogate value for luminance reaching the frames of the spectacles.

Other Embodiments

Other embodiments may develop other means to optimally set the transmissivity of the neutral density filter lens. For instance for special venues it may be desirable to have lenses that optimize the darker and lighter filters for different light wavelengths.

Also, other factors, not part of the retinal reaction curve may be considered to compute an optimal value of the neutral density filter. In the teaching example of the preferred embodiment, luminance is the only factor determining the retinal reaction time. However, research has found other less important factors that affect retinal reaction time including, but not limited to, prolonged readiness, certain common drugs, temperature, and sleep conditions. Knowledge of factors may be advantageously used. Alternately, the Continuous Adjustable 3Deeps Filter Spectacles may have controls allowing customization of values used by the algorithms such as thresholds, parameters of the retinal reaction curve, etc, so that the Continuous Adjustable 3Deeps Filter Spectacles may be customized to individual use.

While the preferred embodiment uses a fixed distance of 2½ inches to lag the delayed image, other embodiments may preferably use other fixed distances. Specifically and advantageously some alternate embodiment may also use the distance between the viewer and the viewing device—that is a preferred distance from the screen. Rather than the exact distance, surrogate distances may be employed. For instance for viewing with an IPOD like personal movie device a distance of about 1 foot may be used. When Continuous Adjustable 3Deeps Filter spectacles are used with a personal computer or a personal DVD player, a distance of 1½ feet between the viewer and display screen may be assumed. When viewing on a large-screen digital or projection TV, a distance based on the size of the display monitor may be used. In a movie theater venue the distance may be set to 50 feet.

The preferred embodiment, and 2 alternate embodiments are for teaching purposes. Other more sophisticated algorithms may be used to calculate the setting of the filter lens. These algorithms may not only have speed of motion, direction or motion, and luminance as input parameters, but may also allow for input of other values, or for the setting of constants such as inter-ocular distance, in their calculations.

Continuous Adjustable 3 Deeps Filter Spectacles can benefit from the inclusion of controls that would allow the viewer to customize the specs to individual differences. For instance, while the average inter-ocular distance is 2.5 inches, there is a lot of variation between individuals in this value. Alternate embodiments of Continuous Adjustable 3Deeps Filter Spectacles can beneficially account for individual differences by allowing customized control for this value, either through a physical thumbwheel type setting, or input parameters to the 3Deeps Filter Spectacles controller. For instance, there may be a 3-position manually controlled switch that allows the viewer to change the inter-ocular distance used in the lens calculations to 2¼ inches (small), 2½ inches (average), or 2¾ inches (large). In other embodiments, a computer connects to a master computing appliance to set the Continuous Adjustable 3Deeps Filter Spectacle customization parameters.

In another alternate embodiment, it has been shown that the degree of the depth effect of the Pulfrich illusion is due to the difference in retinal reaction time between the two eyes. That means that there are innumerable settings of the Continuous Adjustable 3Deeps Filter Spectacle lenses that will provide the same depth illusion. For instance FIG. 5 shows an optimal setting of the lenses has one lens clear with a retinal reaction time of 120 msec (input luminance of 0.52) and the neutral lens is chosen with an optical density producing a luminance of −0.6 so the difference in retinal reaction time is 42 msec or 162 msec. Another setting with the same depth perception is if the 0.42 msec retinal reaction time difference is from one lens that is darkened so that the eye receive a luminance of 0.0 corresponding to a retinal reaction time of 150 msec and the other eye has a retinal reaction time of 192 msec (150+ 42=192 msec), that corresponds to a lens with optical density so the eye receives −0.95 on the luminance scale. The first case is optimal in that we have a clear and dark lens and the eyes receive the maximum amount of light for the desired depth effect. In the second case both lenses obstruct light, though the 'clear' lens obstructs less light than the darker lens. In some instances however, this approach may be beneficial, as for example, to better control the response time of the lenses.

While some electro-optical materials change state seemingly instantaneously (e.g. LCD materials), other materials may have a slow response time. In these cases the Continuous Adjustable 3Deeps Filter Spectacles may be more responsive by taking lens states that have the desired difference in retinal illumination for the two eyes, but may use a 'gray' clear state that is lighter than the darker lens in order to achieve a threshold responsiveness when the lenses change state. That is, if achieving the 'clearest' state takes too long, it may be preferable to have more responsive Continuous Adjustable 3Deeps Filter Spectacles with a 'clear' lens that obstructs some light, and a 'dark' lens chosen to provide the desired difference in retinal reaction time.

In another embodiment, rather than fix the distance 'd' between an object in different frames on the screen, it may be desirable to choose an optical density so the degree of depth illusion remains a constant throughout all frames of the movie that exhibit motion.

In another embodiment, the motion vectors of multiple objects are used to provide an estimate of parallax that is then used to select criteria for the optimization of the optical density of the neutral density lens.

In other embodiments, the viewer may control the degree of darkening allowed. For instance, rather slow movement from left-to-right may require that the neutral density filter be considerably darkened. For some viewers this may be problematical or undesirable and for such viewers allowing them a degree of control over the darkening of the lenses is reasonable. One such control would allow the user to specify an upper limit on the degree of darkening allowed, with exemplary options allowing 5 settings corresponding to a maximum darkening of 50%, 60%, 70%, 80% and 90%.

Any of the algorithmic embodiments may also include the judicious use of heuristics to achieve a best 3D presentation for the viewer. For instance, in a darkened theater and with a dark scene exhibiting motion, the optimal setting for the neutral density lens may take a value that is deemed either 'too dark' for the best 3D presentation for the viewer. Or, the optimal setting for the neutral density lens may take a value that is deemed to take too long to transition to such a dark state for the best 3D presentation. In either of these cases threshold values may be incorporated to override the 'optimal' settings so that the neutral density filter cannot take values outside a specific range. These are exemplary and other heuristics may be incorporated for beneficial purposes.

Heuristics may also be required to address other issues. For instance, it has been observed that the Pulfrich illusion will turn off when lateral motion is 'too fast'. This phenomenon is not entirely understood—but to address it a heuristic rule may be used in any of the algorithms that determine the optical density of the neutral density filter so that when the lateral motion is 'too fast' the Continuous Adjustable 3Deeps Filter Spectacles take their clear-clear state. This is exemplary and other heuristics may be incorporated for beneficial purposes. We note that cinematographers have long recognized that action that is 'too fast' does not record well, and so movies generally will not exhibit this problem.

The preferred embodiment provides an example for when such heuristics may be used. The goal of the preferred embodiment is to provide constant depth perception that is normal in the sense that it is in accordance with an individual's normal inter-ocular distance. As previously described this is achieved by optimally controlling the optical density of the neutral density filter. However, if the viewer is in a darkened venue, viewing a darkened movie and/or lateral screen motion is too slow, it may not be possible to maintain this constant depth perception and heuristic rules may be used to slowly degrade the degree of depth perceived. As noted before, few observers will notice this anymore than they are bothered by the spatial changes resulting from use of telephoto or wide-angle lens in filming scenes.

In still another embodiment, the algorithm to calculate the optical density to optimize the single image 3Deeps Filter Spectacles may be advantageously used in a dual image system. Dual image systems require two images (or frames) for each frame of a traditional movie. One of the two images is a left eye image and the other is a right eye image. Dual image systems have twice as many frames of video as in a single image system, require special format, projectors, and except in the case of lenticular viewing screens, special viewing devices.

Using the preferred embodiment of this invention, based on luminosity and direction and speed of motion, we have described how to determine the optimal optical density of a neutral density filter. Rather than use this calculation to control and synchronize Continuous Adjustable 3Deeps Filter Spectacles, we can use the value to generate a second frame of video for a dual image systems. For clarity the result of the calculation is referred to as 'OD-optimal' and has a value that provides the optimal optical density of the neutral density filter of the Continuous Adjustable 3Deeps Filter Spectacles.

In this dual image system embodiment, rather than use the OD-optimal value for the Continuous Adjustable 3Deeps Filter Spectacles, the result is used to generate a second frame of a dual image 3D motion picture. If the result of the algorithm is that there is no lateral movement in the single frame of the motion picture, then the frame image is duplicated resulting in two frame images, and the frame images is then used as both the right eye image and the left eye image. If the result of the algorithm is that the direction of lateral motion is left to right, then the second frame will be duplicated but with the added shading of 'OD-optimal'. The duplicated shaded image will be used as the right eye image, and the unchanged frame used as the left eye image. If the result of the algorithm is that the direction of lateral motion is right to left, then the second frame will be duplicated but with the added shading of 'OD-optimal'. The duplicated shaded image will be used as the left eye image, and the unchanged frame used as the right eye image.

Since this alternate embodiment is for a dual image system, the right eye image and the left eye image must be directed to the appropriate eye, and this can be done using any of the dual image viewing systems including shutter glasses, head mounted displays, Polaroid or lenticular screens. Since this embodiment is for a dual image system it cannot be used if the viewer is wearing Continuous Adjustable 3Deeps Filter spectacles.

Some 3D viewing systems have darkened lenses and so the calculation of 'OD-optimal' will be slightly different for such systems. While lenticular and head mounted display will work as previously described, shutter glass and polaroid 3D viewing systems have darkened lenses, and this additional reduction in luminosity must be accounted for in the input to the algorithm.

In still another embodiment, 3D Viewing spectacles are manufactured that may be switched between electronic (1) single image Continuous Alternating 3Deeps Viewing Spectacles, and (2) dual image viewing spectacles. As an example consider an anaglyph dual image system, and two electrochromic materials, one that is either clear or darkens to red, and another that is either clear or darkens to blue. Such materials can be used to build electronically operated anaglyph spectacles. If the Continuous Alternating 3Deeps Viewing Spectacles are manufactured with a second layer of such color changing electrochromic materials then the spectacles may be switched to operate as either Continuous Alternating 3Deeps Viewing Spectacles or anaglyph 3D viewing spectacles. In yet another embodiment, a connector for earphones is included on the Continuous Alternating 3Deeps Viewing Spectacles allowing an audio signal to be played through earphones.

The preferred embodiment of the invention may implement the Video and 3Deeps Processing directly on a video format conversion semiconductor chip. Alternatively the output from such a video format conversion semiconductor may be used as input to a semiconductor chip dedicated to the Video and 3Deeps Processing. Also the dual image alternate embodiment can similarly use the video image processing of a video conversion chip described in such embodiments to generate the value 'OD-optimal' to generate the second image for this dual image embodiment, and assign the image to the correct eye.

While preferred and alternate embodiments of the invention have been described and illustrated, it should be apparent that many modifications to the embodiments and implementations of the invention could be made without departing from the spirit or scope of the invention.

The present invention can be defined as follows:

Item 1.
  A method of displaying video content to a viewer, comprising:
  obtaining source video content comprised of 2D frames of video;
  transmitting the source video to a receiver;
  analyzing the 2D frames of the source video content to measure parameters for direction of motion, velocity of motion and luminance;
  calculating a deformation value using an algorithm that uses at least two of the measured parameters in combination with values for display resolution and video frame speed;
  processing the source video content using the deformation value; and
  displaying the processed video content to a viewer.

Item 2.
  A system for displaying modified video content to a viewer, comprising:
  a receiver which receives a 2D video signal comprised of 2D frames;
  a video signal processor which processes the 2D video signal; and
  a display unit which displays the processed video signal to a user;
  wherein the processing step comprises using an algorithm to calculate parameters for direction of motion, velocity of motion and luminance for the 2D frames in said video signal;
  calculating a deformation value using at least two of said calculated parameters in combination with values for display resolution and video frame speed; and
  modifying the 2D video signal using the deformation value.

Item 3.
  A method according to item 1, wherein the direction of motion and velocity of motion parameters in the analysis step are calculated only from motion vectors in the source video content.

Item 4.
  A method according to item 1, wherein the luminance parameter in the analysis step is calculated only from luminance values in the source video content.

Item 5.
  A method according to item 1, wherein the processed video content in the displaying step is presented to a viewer through spectacles.

Item 6.
  A method of displaying video content to a viewer, comprising:
  obtaining a source video signal comprised of 2D frames;
  analyzing 2D frames from said source video signal to measure direction of motion, velocity of motion and luminance parameters;
  calculating a deformation value using an algorithm that includes at least two of said measured parameters in combination with values for display resolution and video frame speed;
  processing the video source signal using the deformation value; and
  displaying the processed video signal to a viewer.

Item 7.
  A display apparatus comprising:
  a receiver which receives a source video signal comprised of 2D frames;
  a video signal processor which processes the source video signal; and
  a display unit which displays the processed video signal to a user;
  wherein said processing step comprises analyzing 2D frames from the video signal to measure direction of motion, velocity of motion and luminance parameters; and
  calculating a deformation value using an algorithm that includes at least two of the measured parameters in combination with values for display resolution and video frame speed.

Item 8.
  A method according to item 6, wherein the direction of motion and velocity of motion parameters in the analysis step are calculated only from motion vectors in the source video content.

Item 9.
  A method according to item 6, wherein the luminance parameter in the analysis step is calculated only from luminance values in the source video content.

Item 10.
  A method according to item 6, wherein in the processed video content in the displaying step is presented to a viewer through spectacles.

Item 11.
  A method for generating modified video, comprising:
  acquiring a source video comprised of a sequence of 2D frames;
  calculating parameters for direction of motion, velocity of motion and luminance of the source video;
  determining factors for display resolution and video frame speed;
  generating a deformation value by applying an algorithm that uses at least two of the parameters and both of the factors;
  applying the deformation value to the source video to produce a modified video; and
  displaying the modified video to a viewer.

Item 12.
  An apparatus which transforms a 2D source video signal, comprising:
  a video processing means for performing the transformation on the 2D source video signal; and
  a display means for displaying the transformed video to a viewer,
  wherein the transformation comprises analyzing the source video signal to generate parameters for direction of motion, velocity of motion and luminance;
  calculating a deformation value using an algorithm that includes at least two of the parameters in combination with factors for both display resolution and video frame speed;
  modifying the source video signal using the deformation value; and
  outputting the transformed video to the display means.

Item 13.
A method according to item 11, wherein the direction of motion and velocity of motion parameters in the calculation step are calculated only from motion vectors in said source video.

Item 14.
A method according to item 11, wherein the luminance parameter in the calculation step is calculated only from luminance values in the source video.

Item 15.
A method according to item 11, wherein in the modified video in the displaying step is presented to a viewer through spectacles.

What is claimed is:

1. A method for generating modified video, comprising:
   (1) acquiring a source video comprised of a sequence 2D image frames;
   (2) determining a value for an inter-ocular distance of the viewer and factors for a display resolution and a video frame speed;
   (3) obtaining an image frame from the source video that includes two or more motion vectors that describe motion in the image frame where each of the motion vectors is associated with a region of the image frame;
   (4) calculating a single parameter for each of the following:
      (a) a lateral speed of the image frame, using the two or more motion vectors; and
      (b) a direction of motion of the image frame, using the two or more motion vectors;
   (5) generating a deformation value by applying an algorithm that uses the inter-ocular distance, both of the factors, and both of the parameters;
   (6) applying the deformation value to the image frame to identify a modified image frame, the modified image frame being a different image frame from the sequence of 2D image frames; and
   (7) displaying the modified image frame to a viewer;
   wherein the direction of motion and velocity of motion parameters in the calculation step are calculated only from the motion vectors input along with the image frame.

2. The method of claim 1, wherein the modified video has a plurality of frames, and the method further comprising:
   adding a bridging frame between the plurality of frame, the bridging frame being dissimilar from the modified image frame.

3. The method of claim 1 wherein a view views the modified video through spectacles.

4. The method of claim 3, wherein the spectacles have a left and right lens and both the left and right lens are in a darkened state.

* * * * *